United States Patent [19]
Ziarno

[11] Patent Number: 5,895,902
[45] Date of Patent: Apr. 20, 1999

[54] METHOD OF CONTRIBUTIONS MANAGEMENT, AND DEVICE AND NETWORKS THEREFOR

[76] Inventor: Witold A. Ziarno, 4517 S. St. Louis Ave., Chicago, Ill. 60632

[21] Appl. No.: 08/555,506

[22] Filed: Nov. 8, 1995

Related U.S. Application Data

[63] Continuation of application No. 08/127,770, Sep. 28, 1993, abandoned, which is a continuation-in-part of application No. 08/117,909, Sep. 7, 1993, abandoned.

[51] Int. Cl.[6] ................................................. G06K 5/00
[52] U.S. Cl. ........................................ 235/380; 364/401
[58] Field of Search .................................. 235/380, 379, 235/462, 472

[56] References Cited

U.S. PATENT DOCUMENTS

| | | | |
|---|---|---|---|
| 4,341,951 | 7/1982 | Benton | 235/379 |
| 4,454,414 | 6/1984 | Benton | 235/379 |
| 4,588,292 | 5/1986 | Collins | 356/71 |
| 4,736,096 | 4/1988 | Ushikubo | 235/472 |
| 4,821,332 | 4/1989 | Durham | 382/7 |
| 4,881,268 | 11/1989 | Uchida et al. | 382/7 |
| 4,893,115 | 1/1990 | Blanchard | 340/712 |
| 4,967,366 | 10/1990 | Kaehler | 364/479 |
| 4,973,851 | 11/1990 | Lee | 250/556 |
| 4,984,280 | 1/1991 | Abe | 382/7 |
| 5,012,077 | 4/1991 | Takano | 235/380 |
| 5,025,373 | 6/1991 | Keyser, Jr. et al. | 364/408 |
| 5,038,022 | 8/1991 | Lucero | 235/380 |
| 5,040,223 | 8/1991 | Kamiya et al. | 382/4 |
| 5,050,207 | 9/1991 | Hitchcock | 379/96 |
| 5,055,660 | 10/1991 | Bertagna | 235/462 X |
| 5,071,168 | 12/1991 | Shamos | 283/117 |
| 5,091,975 | 2/1992 | Berger et al. | 382/56 |
| 5,095,194 | 3/1992 | Barbanell | 235/379 |
| 5,111,395 | 5/1992 | Smith et al. | 364/408 |
| 5,177,802 | 1/1993 | Fujimoto et al. | 382/4 |
| 5,187,748 | 2/1993 | Lee | 382/4 |

(List continued on next page.)

FOREIGN PATENT DOCUMENTS 2 088 051  6/1982  United Kingdom .

OTHER PUBLICATIONS

International Verifact, Inc., Annual Report 1993, product information pertaining to to the C2000 family of electronics. "Month is missing".
Verifact, C2000—Phantom, product brochure. "Month & Year" Missing.
Verifact, C2000—Protege, product brochure. "Month & Year" Missing.
Verifact, C2000—Pospad, product brochure. "Month & Year" Missing.

(List continued on next page.)

*Primary Examiner*—Donald T. Hajec
*Assistant Examiner*—Michael G. Lee
*Attorney, Agent, or Firm*—Witold A. Ziarno

[57] ABSTRACT

A method, apparatus and network for successively making contribution data inputs by a multiplicity of individual contributors in sequence is provided. The apparatus includes a portable, self-powered, contributor data input dependant, non-contributor external data source independent, electronic donations management terminal sized and weighted for manual passing thereof between successive contributors. The terminal has contribution input entry keypads, a routine for accepting and recording a plurality of successive contribution inputs free of any information unrelated to the contributions or contributors, and microprocessor for making of the successive contribution inputs uninterrupted by requests for verification of contributor credit, validation or approval of a successive individual contribution input for batch off-loading of a plurality of contributions from an electronic donations management terminal whereby recordation of each of the contributions is uninterrupted by verification of validation and/or authorization. The method includes provision and passing of the apparatus for entry of the contributions thereon.

85 Claims, 34 Drawing Sheets

U.S. PATENT DOCUMENTS

| | | | |
|---|---|---|---|
| 5,189,482 | 2/1993 | Yang | 356/73 |
| 5,206,488 | 4/1993 | Teicher | 235/380 |
| 5,208,446 | 5/1993 | Martinez | 235/380 |
| 5,210,588 | 5/1993 | Lee | 356/71 |
| 5,210,797 | 5/1993 | Usui et al. | 382/4 |
| 5,220,501 | 6/1993 | Lawlor et al. | 364/408 |
| 5,221,838 | 6/1993 | Gutman et al. | 235/379 |
| 5,222,152 | 6/1993 | Fishbine et al. | 382/2 |
| 5,294,782 | 3/1994 | Kumar | 235/462 |
| 5,303,149 | 4/1994 | Janigian | 364/408 |
| 5,466,919 | 11/1995 | Hovakimian | 235/380 |
| 5,546,303 | 8/1996 | Helbling | 364/401 |
| 5,555,497 | 9/1996 | Helbling | 364/401 |

OTHER PUBLICATIONS

Verifact, Secure Retail Pad, product brochure. "Month & Year" Missing.

Verifact, Pinpad, product brochure. "Month & Year" Missing.

Verifact, V2000, product brochure. "Month & Year" Missing.

Hypercom, Model T7E and P7E, product brochure. "Sep. 1993".

Hypercom, Model T7–GE, product brochure. "Month & Year" Missing.

Hypercom, S7 Secure Pinpad, product brochure. "Month & Year" Missing.

Postal Church Service, *Sunday Envelope Selection Layout Guide*. "Month & Year" Missing.

Postal Church Service Mailing Systems Brochure. "Month & Year" Missing.

Two Sample Collection Envelopes from St. John of God Parish, McKees Rocks, PA.

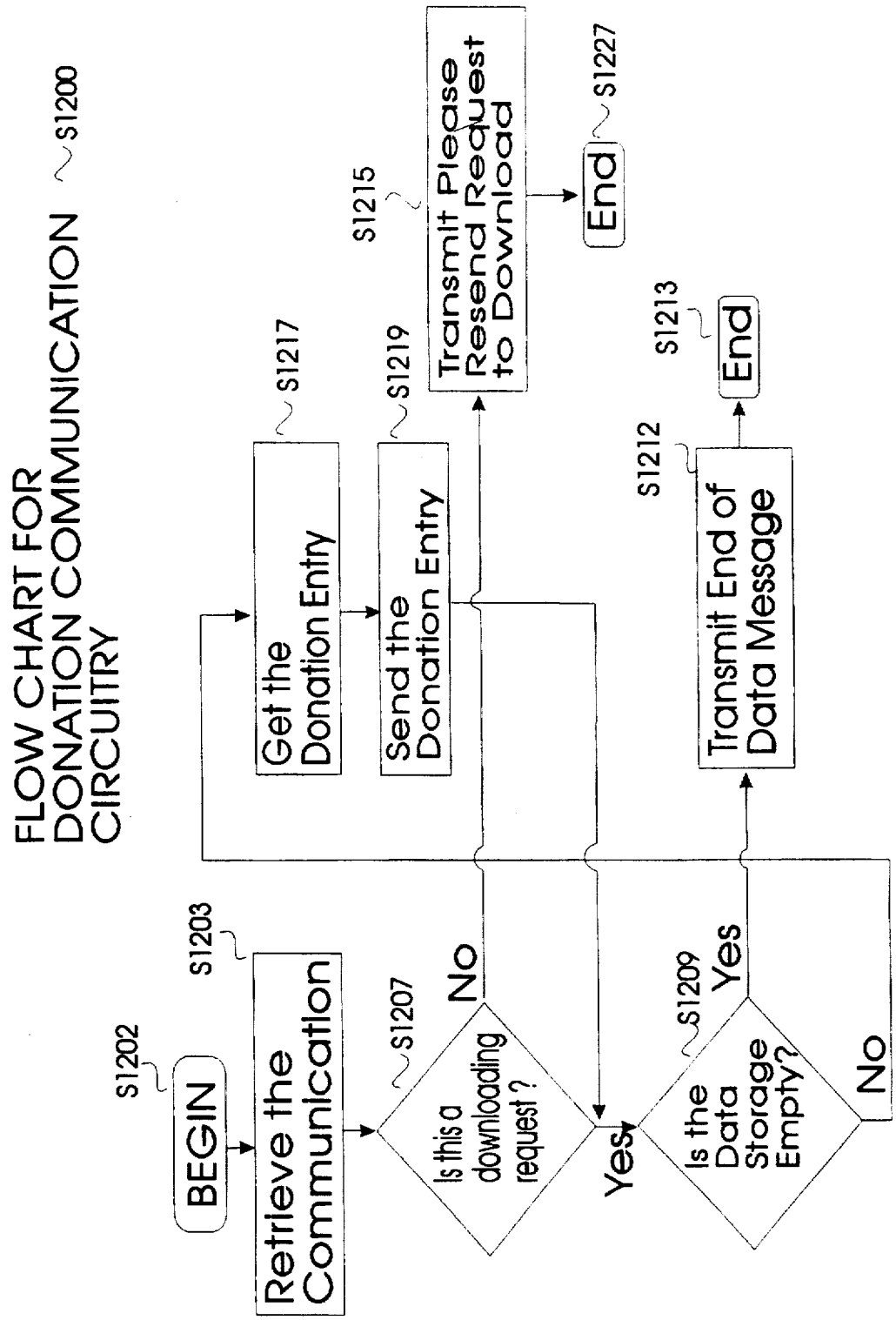

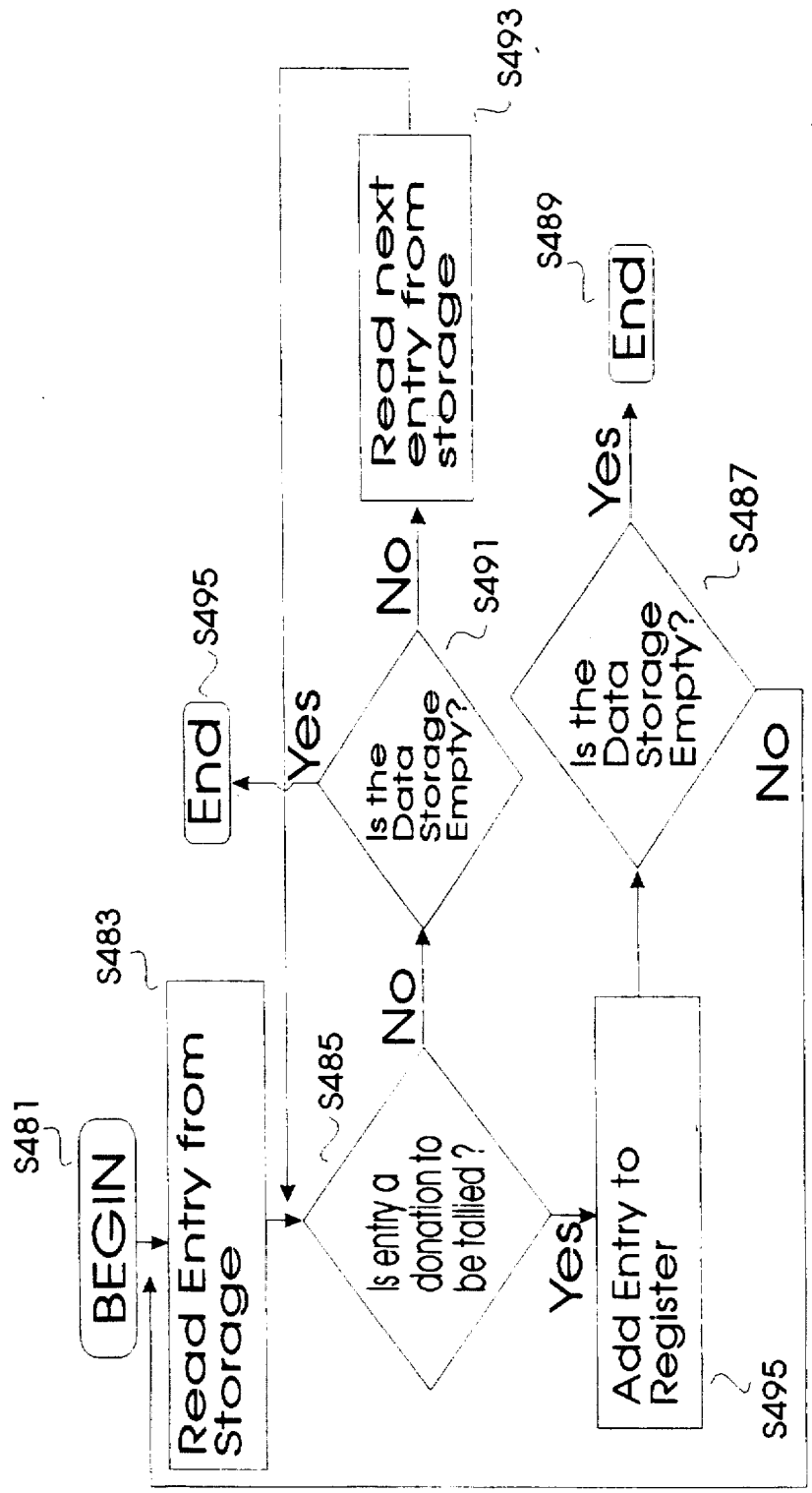

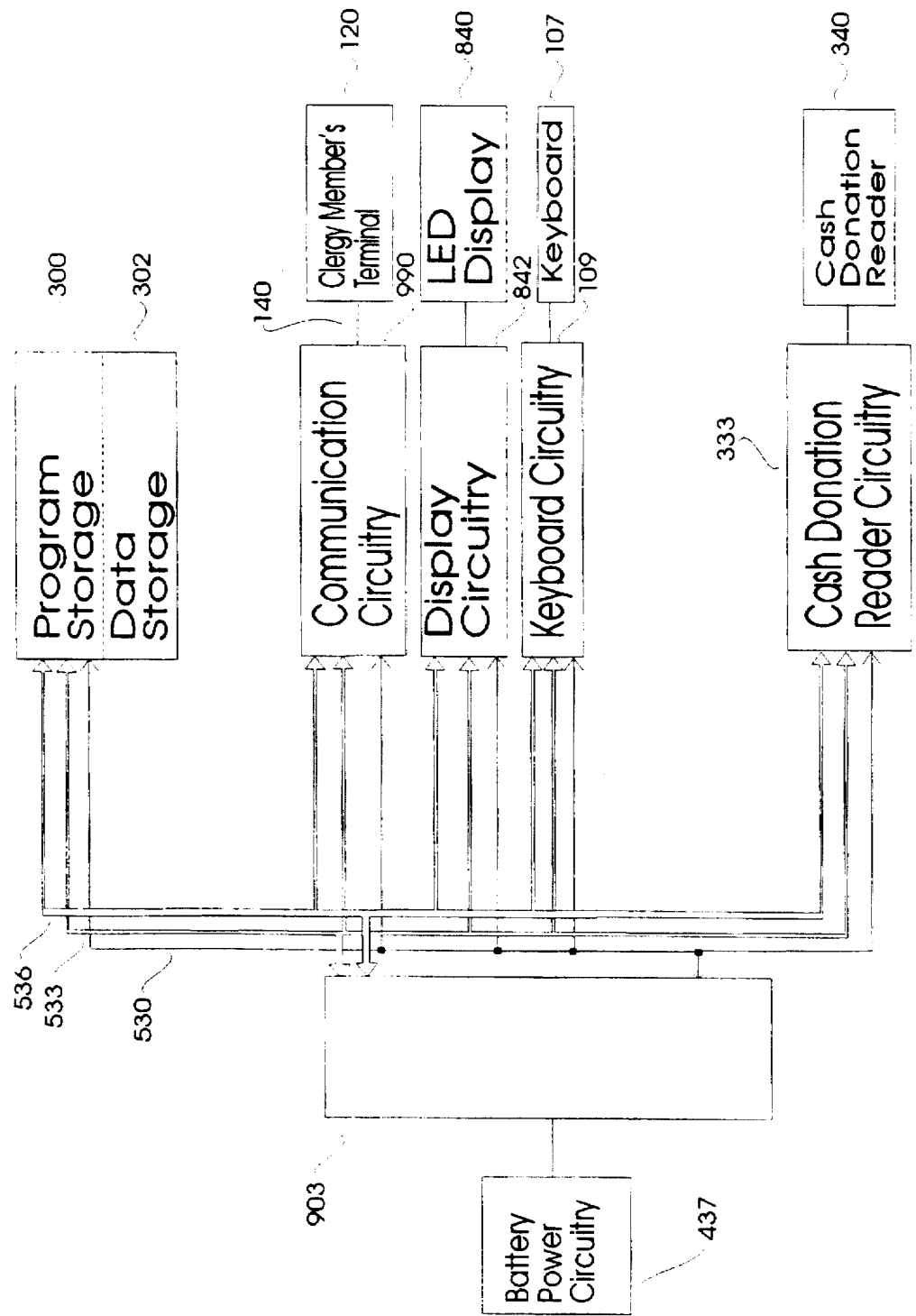

FLOW CHART FOR SMALL DONATION SERVICE ROUTINE

METHOD OF CONTRIBUTIONS MANAGEMENT, AND DEVICE AND NETWORKS THEREFOR

This application is a continuation of application Ser. No. 08/127,770 filed on Sep. 28, 1993 now abandoned, which is a continuation in part of Ser. No. 08/117,909, filed on Sep. 7, 1993, now abandoned.

BACKGROUND OF THE INVENTION

This invention relates to an offering plate for gathering a donation at a religious service; and, more particularly, it relates to an offering plate that gathers a credit card donation, a debit card donation, a cash donation, and an envelope donation, and accepts, stores, and displays information regarding the donation.

As is well known, a religious leader is typically assisted in the gathering of a donation and a member of a religious organization in the making of a donation at a religious service through the use of an offering plate.

Older versions of offering plates include woven baskets and plates made of ceramic, precious metal, such as silver, gold or platinum, wood, or other material appropriate to construct a container into which an donation can be deposited. Offering plates made of woven baskets are often referred to as collection baskets.

An offering plate is brought to a member during a religious service by an usher or circulated among members of a congregation. A member of the congregation then drops a donation onto the offering plate. A donation is most often in the form of cash or check. Frequently, donations contained within an offering plate are then deposited into a larger donation container. The larger container is then taken from the religious service for off-site processing. Off-site processing includes tallying individual donations, and crediting an individual donation to the account of a particular member of the congregation for tax purposes or for determining if the member is meeting a personal donation quota or a donation quota for the congregation. A donation quota is generally required if a member has a child attending a school affiliated with the religious organization, a financial pledge to the organization, or the like, and consists of a minimum donation amount during a specified period. This type of oblation is herein called "manual, post-processed cash oblation."

A major problem of manual, post-processed cash oblation exists if the member only has with him a bill that is smaller than the bill the member prefers to donate. The member may choose to donate the smaller bill, i.e. one dollar, even though the member's preference would have been to donate a larger bill, i.e. a five, ten or twenty dollar bill. Consequently, the religious organization loses the difference between the preferred donation and the donation actually made.

A second problem exists if the member has a bill larger than he prefers to donate, i.e. a one hundred dollar bill. The member may choose not to donate the larger bill since his preference would have been to donate a smaller bill, i.e. a five, ten, or twenty dollar bill. There is virtually no convenient way for a member to get change for a larger bill during a religious service.

A third problem is that a member, and at times his entire family, finds himself searching for a bill that is his donation preference prior to a religious service. Many times the member does not find the bill he wishes to donate. In one scenario, the member may choose to donate a bill that is larger than his donation preference. However, more often than not, the member may choose to donate a bill that is smaller than his bill of choice. The religious organization again looses the difference between the preferred donation and the donation actually made.

Regardless of whether the bill is larger or smaller than the bill the member prefers to donate, a secondary shortcoming of manual, post-processed cash oblation is that a member's account cannot be credited properly since there is no way to associate a particular cash donation with the member who made it. The member may choose not to donate either the larger or smaller bill since the donation does not carry a tax benefit or help satisfy his donation quota. Consequently, there exists a need for an offering plate that accommodates a member's donation preference, allows the member to obtain a tax benefit, and properly credits a member's account so that the member can meet a donation quota.

A newer version of manual, post-processed cash oblation has been developed that utilizes a donation envelope into which a cash or check donation is deposited. The donation envelope is generally a paper envelope that contains printed material including a member code, a space for marking the amount of the donation, and the date of the service attended. These features of the envelope allow for the member's account to be properly credited. This type of oblation is herein called "envelope assisted manual, post-processed cash oblation."

A shortcoming of envelope assisted, manual, post-processed cash oblation occurs if a member forgets to bring his donation envelope with him to a service. If the member forgets to bring his donation envelope and instead donates cash, his account, as previously discussed, cannot be properly credited. Moreover, even if envelope assisted manual, post-processed cash oblation is utilized, a shortcoming of this type of oblation is that crediting the donation to a member's account is labor intensive. The religious organization must manually process each envelope to properly credit the particular member's account. This processing generally includes a clerical staff member or group of volunteers who must open each envelope to determine the size of the cash donation within the envelope, and/or record the information located on the cover of the envelope, to properly credit the donation to an account of a member. If the congregation contains several thousand members, this form of oblation might involve several days of processing. Hence, there exists a need for an offering plate that automatically credits a member's account.

A serious problem with both manual, post-processed cash oblation and envelope assisted manual, post-processed cash oblation occurs if a member has with him no cash but has either a debit card or credit card. In this scenario, the member is foreclosed from contributing a donation since an offering plate cannot accept a debit card donation or credit card donation. Hence, there exists a need for an offering plate that allows a member to make a debit card donation or credit card donation and thereby increases the number of donations received by a religious organization by accepting debit card or credit card donations rather than simply cash or check donations.

As is well known, a further problem with manual, post-processed cash oblation and envelope assisted manual, post-processed cash oblation is that it requires manual off-site tallying of individual donations. As such there is a need for an offering plate that tallies an individual member's donations and a plurality of donations made by different members.

Moreover, another shortcoming of both types of oblation is that there is no offering plate system that can collect, analyze, and display statistical information associated with an individual donation or a tally of individual donations. Various types of statistical information can be associated with a donation. By way of example, one measure of the effectiveness of a particular sermon or the performance of a particular minister might be the amount of donations generated at a service. By way of further example, the particular donation habits of a member or group of members might be an indicator of the particular member, sub-group, or group of members a religious organization must target in order to maximize donations.

A current method of collecting, analyzing, and displaying this type of statistical information has a variety of shortcomings including a need to process information. This method is referred to herein as "manually obtaining statistical information." More particularly, manually obtaining statistical information requires recording information obtained from envelope assisted manual, post-processed cash oblation into a ledger or database, and then processing it. As such, few, if any, religious organizations undertake the added effort needed to compile this type of statistical data into useful form.

Rather than being based on statistical data, a judgment, i.e. whether to discontinue or add a service or sermon, is made based on qualitative factors. These qualitative factors include a rough approximation of the total amount of donations generated at a particular service, number of attenders, and the like. Consequently, there exists a need for an offering plate and offering plate system that collects, analyzes, and displays statistical information associated with an individual donation or a tally of individual donations and provides useful quantitative data on which a judgement can be based.

Issuance of credit and debit cards has exploded during the past decade. In 1982, there were an estimated 127.7 million credit cards issued in the United States, and an estimated 189.1 million credit cards issued worldwide. In 1991, there were an estimated 299 million credit cards issued in the United States, and an estimated 530.6 million cards issued worldwide. Source: Credit Industry 1993 Directory.

Concurrent with the increase in the number of cards issued has been an increase in global charge and transaction volume which has been even more dramatic: In 1982, there was a total of 131.9 billion dollars charged; in 1991, there was a total of 725.4 billion dollars charged. Annual Automatic Teller Machine ("ATM") volume has been increasing yearly up from a level of 2.4 billion transactions in 1983 to a level of 7.3 billion transactions in 1992. Furthermore, annual Point of Sale ("POS") volume has increased from 14.4 million transactions in 1985 to over 245.5 million transactions in 1992. Source: Credit Industry 1993 Directory. All of the trends indicate that consumers are preferring to use credit and debit cards.

It would be highly desirable to solve the variety of problems enumerated above facing members of the clergy, and members of religious organizations in gathering a cash donation, an envelope containing a cash donation, a credit card donation, and a debit card donation through the use of an offering plate and offering plate system which accommodates a variety of donation preferences, and collects, stores, analyzes, and displays information regarding a donation.

The present invention targets cardholders who currently possess upwards of 299 million credit cards issued in the United States, and cardholders who possess an estimated 530.6 million cards issued worldwide who are members of religious organizations. Moreover, the present invention contemplates a market that covers 120 million plus members of religious organizations in the United States. (Source: Yearbook of American and Canadian Churches, 1992 Edition), hundreds of millions of members worldwide, and well over 380,000 religious organizations in the United States and Canada, and an even more substantial number of religious organizations worldwide.

The present invention serves this market by providing an offering plate and offering plate system that offers convenience of use and ease of operation.

It is therefore an object of the present invention to provide an offering plate which will accept a cash donation.

It is another object of the present invention to provide an offering plate which will associate a cash donation with an account of a member of a religious organization and credit that member's account accordingly.

It is yet another object of the present invention to provide an offering plate which will accept an envelope containing a cash donation.

It is a further object of the present invention to provide an offering plate which will automatically credit a donation within an envelope containing a cash donation to a member's account.

It is yet a further object of the present invention to provide an offering plate which will accommodate a member's donation preference and thereby increase the number of donations received by a religious organization.

It is still a further object of the present invention to provide an offering plate which will accept a credit card donation and debit card donation and thereby increase the number of donations received by a religious organization.

It is another object of the present invention to provide an offering plate which will tally cash donations, cash donations contained within an envelope, credit card donations, and debit card donations.

It is yet another object of the present invention to provide an offering plate and offering plate system that can collect, analyze, and display statistical information associated with an individual donation or a plurality of individual donations and provide useful quantitative data. It is believed that the present invention will facilitate both free will offerings and tithes.

SUMMARY OF THE INVENTION

These and other objects of the present invention are achieved in an offering plate and an offering plate network.

The present invention provides an offering plate and offering plate network containing a credit card donation processor and/or a debit card donation processor, tallying the amount of card donations accepted, and collecting, analyzing, and displaying statistical information regarding the donation for batch off-loading of a plurality of contributions from an electronic donations management terminal whereby recordation of each of the contributions is uninterrupted by verification of validation and/or authorization.

The present invention further provides an offering plate and offering plate network for accepting a cash donation, crediting an account of a member for the cash donation, tallying a plurality of cash donations accepted, and collecting, analyzing, and displaying statistical information regarding the donation.

The present invention also provides an offering plate and offering plate network for accepting an envelope containing a cash donation, tallying the cash donation within the envelope and within a plurality of envelopes, crediting a member's account, and collecting, analyzing, and displaying statistical information regarding the donation.

The present invention also provides a method of associating a donation with an account of a member at a religious organization. These and other objects will become apparent in the course of a detailed description of the invention.

BRIEF DESCRIPTION OF THE DRAWINGS

FIG. 1b is a flow chart illustrating the functionality of the donation communication servicing software and associated hardware of an offering plate of the present invention.

FIG. 1c is a flow chart illustrating the functionality of the tallier servicing software and associated hardware of an offering plate of the present invention.

FIG. 3a is a schematic block diagram of an embodiment of an offering plate with a cash donation acceptor, a display, and a keyboard.

DETAILED DESCRIPTION OF THE INVENTION

Figure 1:
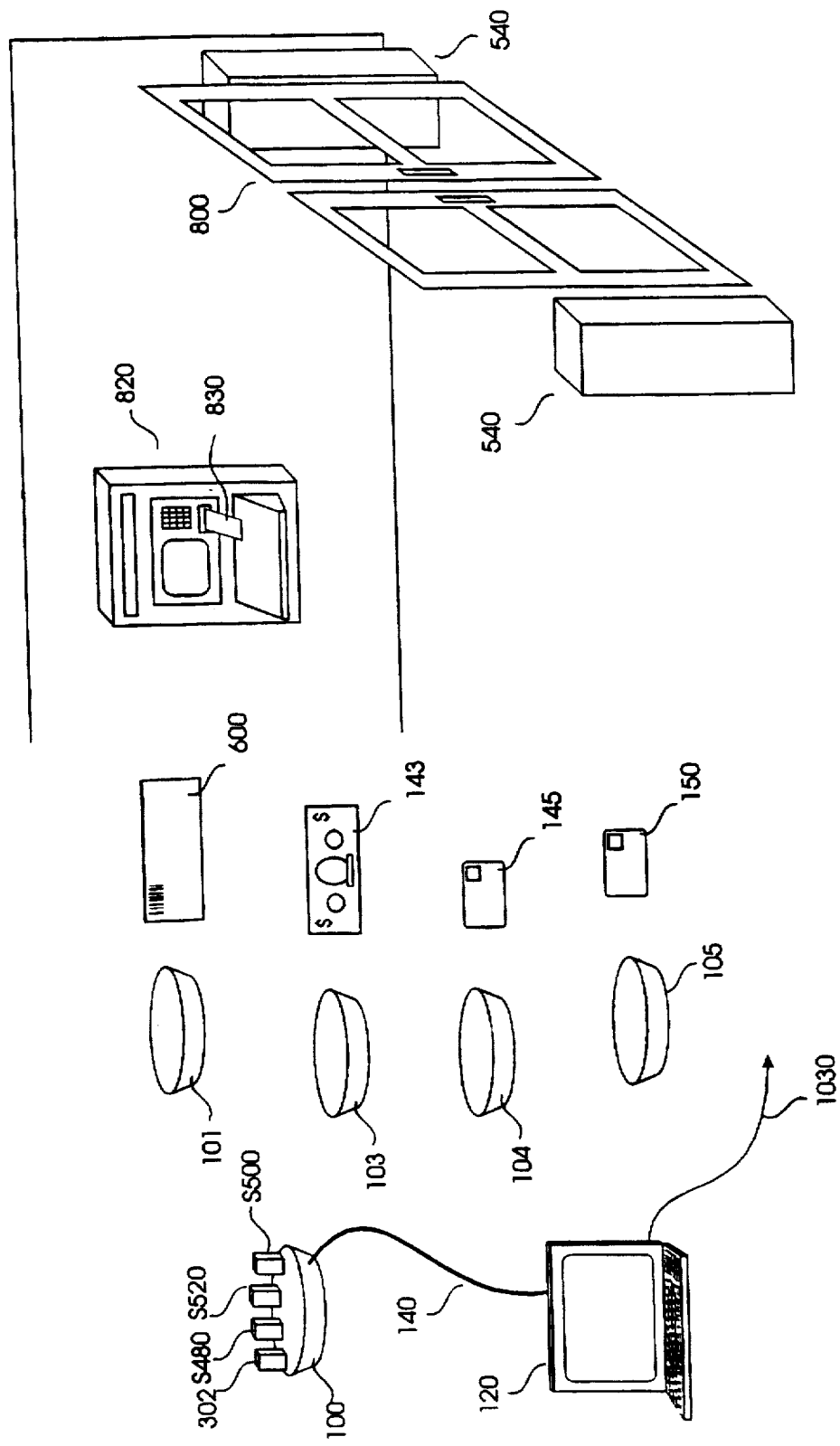
FIG. 1 is an overall system configuration of an offering plate network according to the present invention.

FIG. 1 is an overall configuration of an offering plate network according to the present invention. An offering plate 100 is used by a member of the clergy at a religious service, and the like, to gather a donation. As used herein, the term "offering plate" means a device that is used to gather a donation at a religious service, and which may be passed from one member or attender of the congregation to another during a service. As used herein, the term "member" also refers to an "attender."

In one embodiment, offering plate 101 gathers an envelope 600 donation. In a second embodiment, offering plate 103 gathers a cash donation 143. In a third embodiment, offering plate 104 gathers a credit card 145 donation. In a fourth embodiment, offering plate 105 gathers a debit card 150 donation. Offering plate 100 generically refers to offering plates 101–105.

As used herein, the term "credit card" refers to all forms of credit cards including, by way of example, VISA, Mastercard, and Discover. Exemplary issuers of credit cards include Citicorp, Greenwood Trust Co./Discover Card, The Chase Manhattan Corp., Bank of America, MNBA America, American Express Centurion Bank, First Chicago Corp., Chemical Bank Retail Card Services, Banc One Corp., and Nationsbank of Delaware NA. As used herein, the term "credit card" also refers to an American Express card. Moreover, as used herein, the term "debit card" refers to all forms of debit cards including, by way of example, a Cirrus card, a Plus card, a Maestro card, an Interlink card, and any other type of card that can be used for an electronic fund transfer. The term "card" when used without the descriptors "credit" or "debit" refers to both a credit card and a debit card. The term "card" also contemplates a private label card issued or maintained by a religious organization or an affiliate of a religious organization, and a prepaid card that can be purchased by cash, check, credit, or debit cards. Exemplary debit card issuers include BankAmerica, First Interstate Bancorp, Citicorp, NationsBank Corporation, and Wells Fargo Bank.

Generally, offering plate 100 accepts a cash donation 143, an envelope 600 containing a cash donation, a credit card 145 donation, and/or a debit card 150 donation. Offering plate 100 collects and provides information about a member and a donation. Using a communication link 140, preferably an RF (radio frequency) communication link, an infra-red or communication link or other free-propagating electromagnetic energy communication link, offering plate 100 automatically communicates the information about the member and the donation to a clergy member's terminal 120 in one embodiment. As used herein, the term, "clergy member's terminal," refers to a terminal that can be used by anyone including but not limited to a clergy member, as for example, a secretary, clerk, volunteer, or an accountant.

Figure 1A:
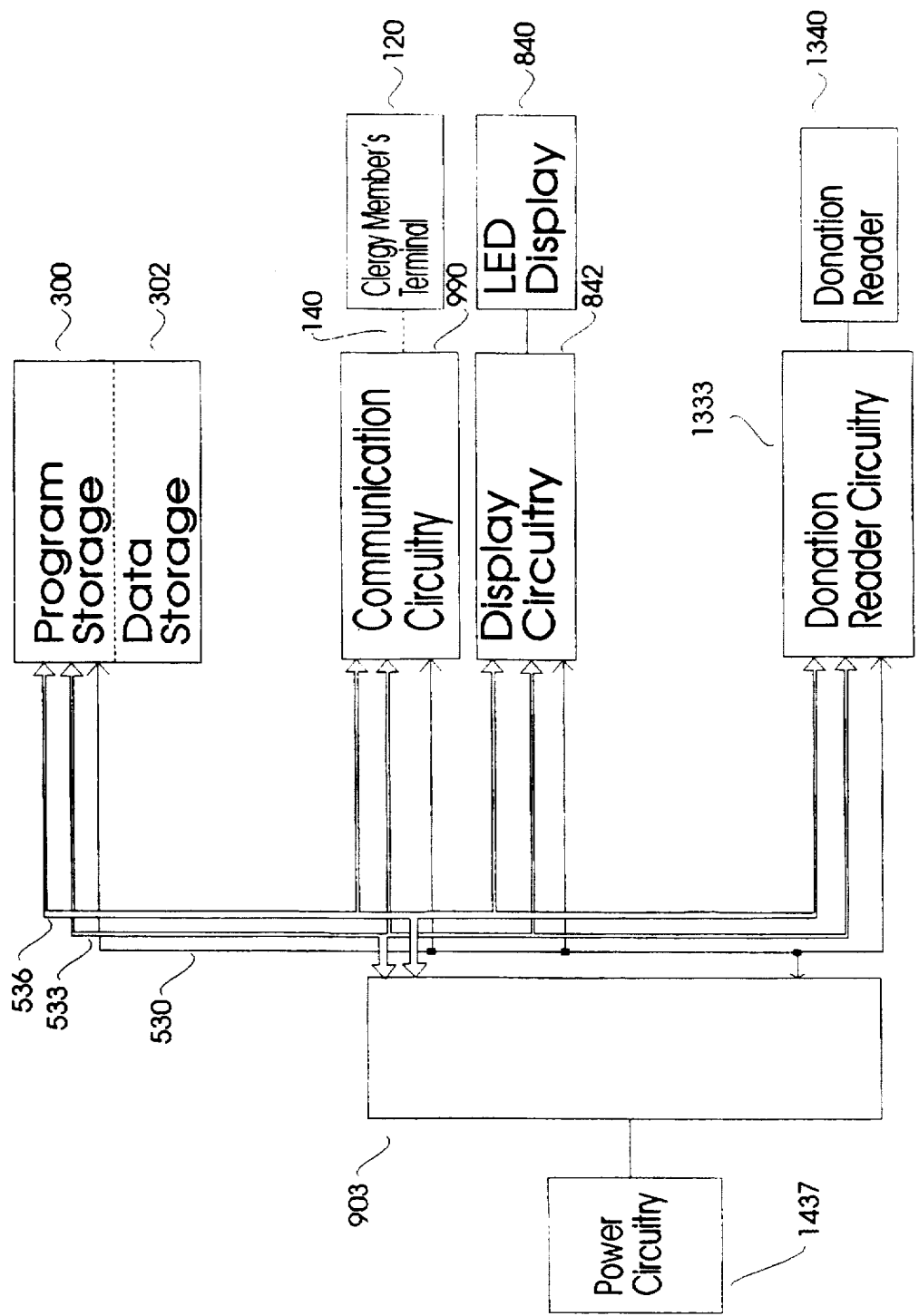
FIG. 1a is a general schematic block diagram of an embodiment of an offering plate with a donation reader and associated circuitry, a display and associated circuitry, communication circuitry, and a clergy member's terminal.
Figure 2:
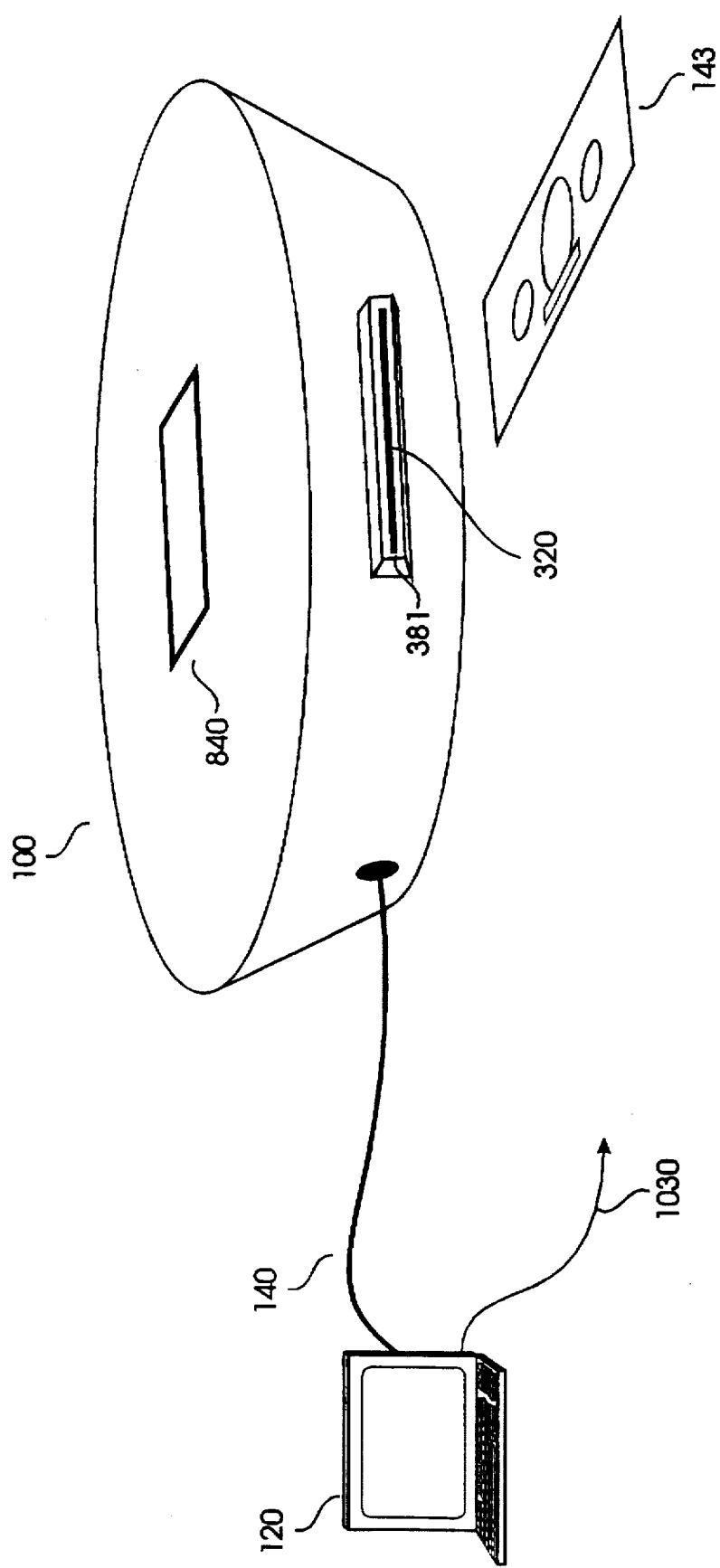
FIG. 2 is a perspective view of a cash donation, an embodiment of an offering plate with a cash donation acceptor, and a clergy member's terminal.
Figure 2A:
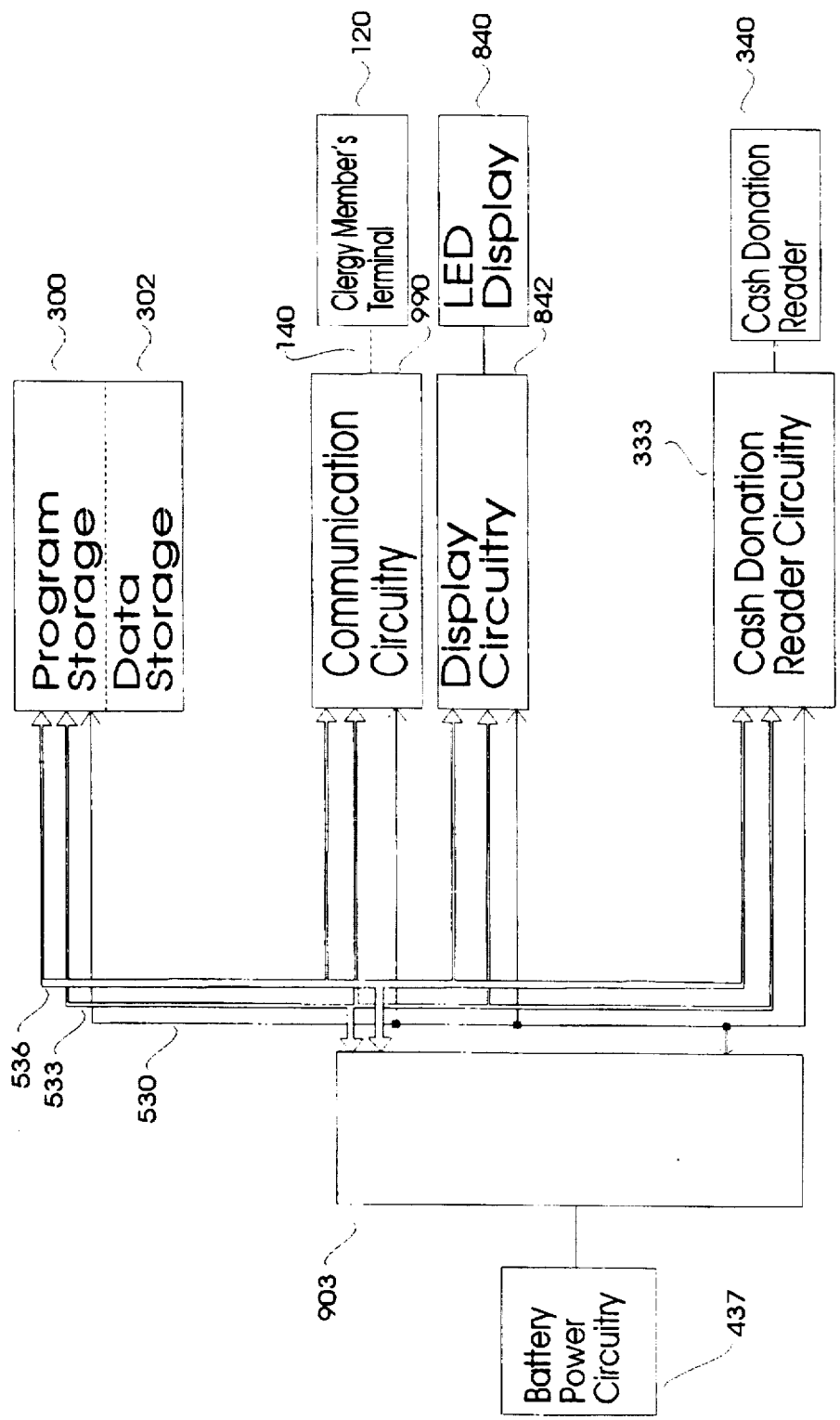
FIG. 2a is a schematic block diagram of one embodiment of an offering plate with a cash donation acceptor and a display.

In an alternate embodiment, the offering plate 100 first stores the information about the member and the donation it has accepted in a data storage 302, and then at a latter time communicates it to the clergy member's terminal 120 via communication circuitry 990 (FIG. 1a) and a communication link 140, e.g. after a single service or after a full day of services, as described in FIG. 2a. The clergy member's terminal 120 might be located on-site or at some remote location. The clergy member's terminal 120 then communicates the information about the member and the donation via a communication link 1030, which by way of example, might include a telephone hookup, with a card account processor, or the like.

In another embodiment, the offering plate 100 communicates information about the member and the donation directly via communication link 1030, by way of example, a telephone hookup, thereby bypassing clergy member's terminal 120 to a funds processing database, and the like. The card account of the member of the religious organization is appropriately charged the amount of the donation, or debited for the donation, as appropriate, and the account of the religious organization is augmented respectively.

Figure 6:
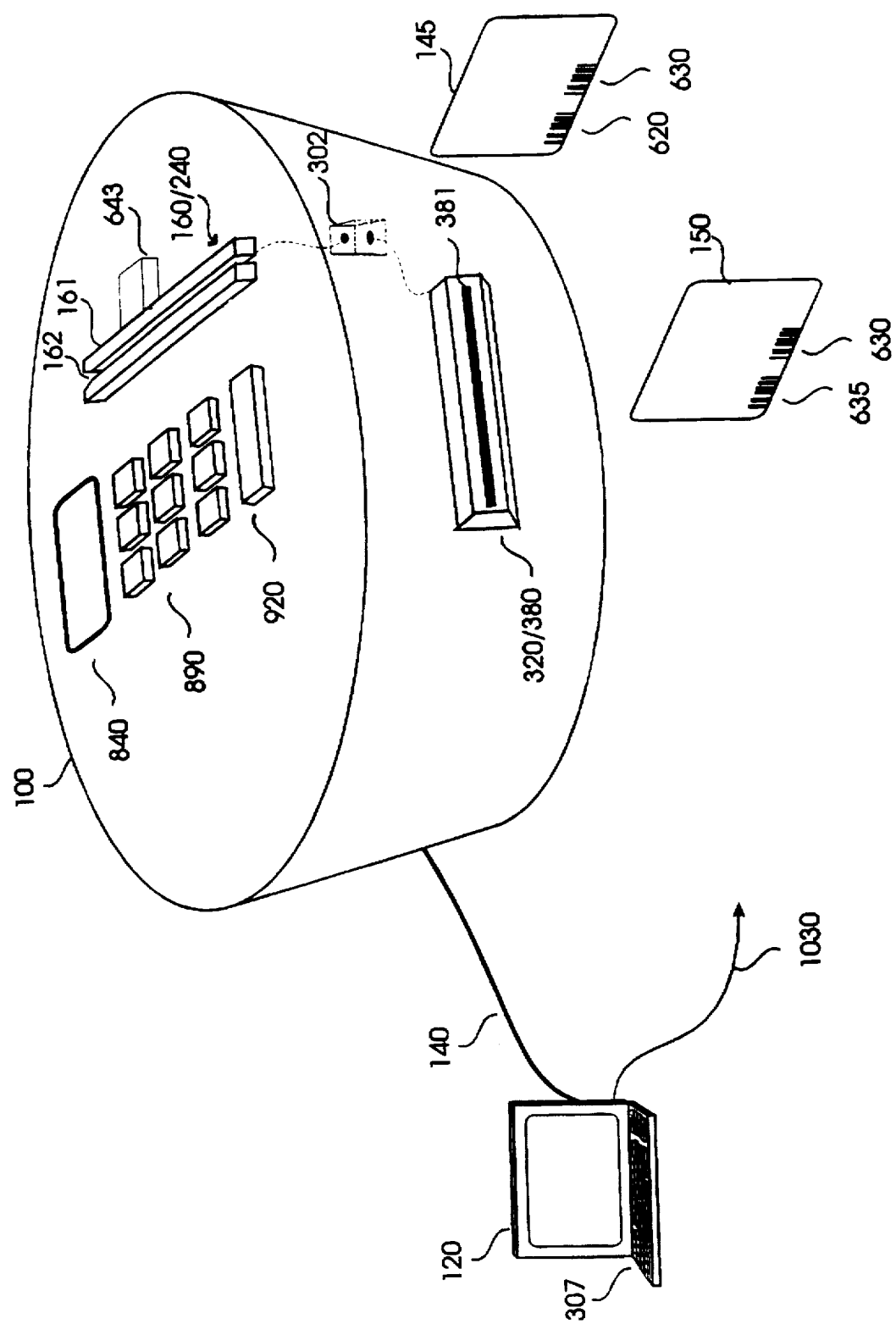
FIG. 6 is a perspective view of a credit card with a bar code label, a debit card with a bar code label, and an embodiment of an offering plate with a credit card donation processor, a debit card donation processor, a cash donation acceptor, an envelope donation acceptor, a key pad for associating a credit card donation, a debit card donation or envelope donation with a cash denomination, and a clergy member's terminal.

By way of further example, offering plate 100 contains a credit card donation processor 160, and/or a debit card donation processor 240 (FIG. 6). Such a processor directly utilizes a cellular communication link, or other standard telephone hookup. Offering plate 100 stores a member's card account and donation information in data storage 302. After the religious service or a day of services, communication link 1030 is connected directly to the processor 160/240 and/or data storage 302, and communication circuitry 990 via communication link 1030 transfers the member and donation information to a third party card processor 1031, and the like. The card account of the member of the religious organization is appropriately charged or debited the amount of the donation and the account of the religious organization is augmented respectively.

Preferably, at or near an entrance or exit of a place of worship 800 is located a receipt generator 820 for the donation. The receipt generator 820 produces a receipt for a single donation or a plurality of donations. In one embodiment, offering plate 100 communicates, via a communication link, preferably an RF (radio frequency) communication link or an infra-red communication link, with the receipt generator 820. In another embodiment, offering plate 100 communicates donation and member information, via a communication link to clergy member's terminal 120. Clergy member's terminal 120 then communicates the member and donation information to receipt generator 820. The communication consists of information about the member, the donation, the date, the collection for which the donation was given, and the like. Upon receipt of the communication, the receipt generator 820 processes the information about the member and the donation to generate a receipt 830. The receipt 830 may be generated automatically by the receipt generator 820 to be picked up by the member or attender after the service, or may be generated at the request of the member or attender after the service as the member is leaving the place of worship, or may be generated for mailing or faxing to the member or attender. A member of a religious organization may desire the receipt 830 for tax purposes or for determining if the member is meeting a donation quota. The present invention also contemplates locating the receipt generator 820 in the offering plate 100, and generating receipt 830 at offering plate 100.

In one embodiment, theft deterrent 540 is located at or near an entrance or exit of a place of worship 800 to deter the theft of offering plate 100. Many theft deterrents are well known in the art. By way of example, systems frequently used in retail stores might be used. The present invention contemplates that offering plate 100 contains a device that can be detected by theft deterrent 540. As such, if someone attempts to unlawfully take offering plate 100 through the entrance or exit of a place of worship 800, an alarm, or the like, might sound.

The present invention includes a tallier service routine S480, a set of software routines which run on offering plate 100 to tally a plurality of donations, in offering plate 100 in one embodiment. In an alternate embodiment, service routine S480 is located within clergy member's terminal 120. The service routine S480 tallies a credit card 145 donation, a debit card 150 donation, a cash donation 143, an envelope 600 containing a cash donation, and combinations thereof. Moreover, service routine S480 performs a number of arithmetic functions including but not limited to, by way of example, addition, subtraction, multiplication, division, as well as a statistical calculation. Service routine S480 is connected to commercially available accounting programs in one embodiment.

In conjunction with a printer, offering plate 100 and/or clergy member's terminal 120 may be used to generate a report commonly used for accounting purposes via service routine S480, including but not limited to a summary of total donations generated, a monthly statement, a histogram, a donation average per member, sub-group of members, or group of members.

The offering plate network of the present invention, which includes the offering plate 100 and the clergy members's terminal 120, collects, analyzes, and displays statistical information associated with an individual donation or a tally of individual donations. Offering plate 100 contains a statistical information collecting routine S500, a set of software routines which run on processing circuitry 903 (FIG. 1a). In an alternate embodiment, the statistical information collecting routine S500 is located in the clergy member's terminal 120. The statistical information collecting routine S500 via processor 903 collects donation data from the donation reader 1340 and associated circuitry 1333 (FIG. 1a), and communicates it to storage 302 (FIG. 1a). A statistical information analyzing routine S520, a set of software routines which run on offering plate 100 located within the offering plate 100 in one embodiment, or in the clergy member's terminal 120 in an alternate embodiment, then retrieves donation data from data storage 302 and performs arithmetic and statistical calculations thereon.

There are various types of statistical information that can be associated with a donation, and analyzed by statistical information analyzing routine S520. By way of example, one measure of the effectiveness of a particular sermon or the performance of a particular minister might be the amount of donations generated at a single service or a plurality of services. By way of further example, the particular donation habits of a member or group of members might be an indicator of the particular member, sub-group, or group of members a religious organization must target in order to maximize donations. Offering plate 100, in one embodiment, or the clergy member's terminal 120, in another embodiment, generates a report measuring the effectiveness of a sermon or a minister, the donation habits of a member or a group of members, and the number of members as measured by the number of donations given, via the above described statistical information analyzing routine S520, and associated hardware. Routine S520 might also include an interface with a commercially available computer program, a customized accounting computer program, and/or a statistics computer program.

FIG. 1a is a general schematic block diagram of the offering plate of one embodiment of the present invention which includes a donation reader 1340, donation reader circuitry 1333, power source 1437, and communication circuitry 990. Although display circuitry 842 is shown in this general embodiment of the invention, display 842 need not be included in specific embodiments of the invention.

In the present embodiment, processing circuitry 903 includes a microprocessor. However, multiple microprocessors, or a plurality of dedicated microprocessors may also be used. Processing circuitry 903 and associated circuitry are powered through power source 1437. Processing circuitry 903 interfaces with associated circuitry via an address bus 536, data bus 533, and control bus 530. Specifically, upon detection by the donation reader 1340 that a donation is being made, donation reader circuitry 1333 interrupts processing circuitry 903. Circuitry 903 responds to the interrupt by reading the buffered donation information. Circuitry 903 then stores the donation information in storage 302. In one embodiment, circuitry 903 also adds the new donation information to a running total of donation information stored in storage 302.

A variety of links and associated circuitry are used in the present invention. By way of example, link 140 is a serial link and associated circuitry in one embodiment, an RS-232 link and associated circuitry in another embodiment, modem circuitry in communication with circuitry 990 in yet another embodiment, or an RF or infra-red link and associated circuitry in another embodiment.

A variety of additions, can be added to the embodiment of processing circuitry 903 illustrated in FIG. 1a. By way of example, a cash donation reader and associated circuitry, a keyboard and associated circuitry, a touch sensitive screen and associated circuitry, a bar code reader and associated circuitry, an optical character recognition reader and associated circuitry, an electronic signature line and associated circuitry, a fingerprint scanner and associated circuitry, a card reader and associated circuitry, a coin reader and associated currency, and a bill dispenser and associated currency, and combinations thereof can be added. Exemplary embodiments containing combinations of the above listed additions are further described in FIGS. 2a, 3a, 4d, and 5a–12a.

The clergy member's terminal 120 drives a printer in one embodiment to produce a hard copy of a report representing data sent to terminal 120 via communication circuitry 990 located in offering plate 100. In another embodiment, service routine S1200 (FIG. 1b), runs on processing circuitry 903 located in offering plate 100. Processing circuitry 903 communicates member and donation information to communication circuitry 990 which drives a printer to print out data via a wired link, for example, an RS-232 cable. Similarly, offering plate 100 can use a serial link to drive a printer directly via communication circuitry 990.

Display circuitry 842 includes a buffer and LED drive circuitry which processing circuitry 903 can write information into. Display circuitry 842 responds to data written into the buffer by displaying that information via control bus 530.

Donation reader 1340 includes a card reader 307 (FIG. 6a), a cash donation reader 340, an OCR reader 637 (FIG. 4d), a bar code reader 640 (FIG. 4d), a fingerprint scanner 1040 (FIG. 10), a keyboard 107 (FIG. 3a), a coin donation reader 1102 (FIG. 12a), or combinations thereof. The present invention further contemplates that reader 1340 can read coded envelopes and/or coded cards.

Donation reader 1340 and associated circuitry 1333 includes a credit card processor, a debit card processor, a currency validator, a currency discriminator, a currency acceptor, a coin discriminator, a coin validator, a bar code scanner, or combinations thereof.

Moreover, power source 1437 is a battery power source in one embodiment. Preferably, the battery is a rechargeable source, and is located on the offering plate 100 so as to be easily accessible during replacement or recharging thereof. In another embodiment, power source 1437 includes a hardwired power supply.

FIG. 1b is a flow chart illustrating the functionality of the donation communication servicing software and associated hardware of an offering plate of the present invention. Donation communication circuitry servicing routine S1200 is a set of software programs which run on offering plate 100.

In one embodiment, routine S1200 is entered when a communication is received by communication circuitry 990. Upon entering this routine (S1202), communication circuitry 990 enters a retrieve the communication routine S1203 to retrieve the communication.

The communication consists of a request for donation information in one embodiment. By way of example, the request includes a request for a cash donation entry, an envelope donation entry, a bar code data entry, a card entry, a donation entry, or combinations thereof. In yet a further embodiment, the request might include a request for a fingerprint entry, a donation entry, or a combination thereof.

In another embodiment, the communication is a request to download. The circuitry 990 then tests to determine if this is a request to download by executing routine S1207. If yes, then a test to determine if the data storage is empty using routine S1209 is conducted. If yes, an end of data message using routine S1212 is sent, and routine S1200 is concluded (S1213).

If there was a no in response to routine S1207, routine S1215 is executed. Routine S1215 transmits a please resend request to download message, and then ends (S1227) routine S1200.

In one embodiment, the request to download may include a security code or other security information. Furthermore, the circuitry 990 may test to see if the proper security code is present within the request to download before downloading any information.

If there was a no in response to routine S1209, routine S1217 is executed to obtain the donation entry. The donation entry can come from the cash donation acceptor 320 (FIG. 2), the envelope donation acceptor 380 (FIG. 4a), card donation processor 160,240 (FIG. 6), or coin donation acceptor 1100 (FIG. 12), or storage 302. Routine S1219 to send the donation entry is entered. Routine S1219 loops around to routine S1209 until there is no more data to be communicated.

Routine S1200 is entered when there is communication between offering plate 100 and clergy member's terminal 120 in one embodiment. In an alternate embodiment, routine S1200 is entered when there is communication between offering plate 100 and a printer. In yet another embodiment, routine S1200 is entered when there is communication with a third party card processor, and the like.

FIG. 1c is a flow chart illustrating the functionality of the tallier servicing routine S480 and associated hardware of an offering plate of the present invention. In one embodiment, routine S480 is entered (S481) in order to tally a plurality of donations, which may be stored in the data storage 302 along with associated member information. An entry is read from storage 302 via routine S483. The entry is then tested to determine if the entry is a donation to be tallied by routine S485. By way of example, donations that are tallied include cash donations 143, envelope donations 600, credit card 145, and debit card 150 donations. If a yes is given in response to routine S485, then the entry is added to a register by routine S495. In one embodiment, routine S495 contains subroutines that pigeon hole a cash donation 145 entry into one register, an envelope 600 donation entry into another register, a credit card 145 donation entry into yet another register, and a debit card 150 donation entry into yet another register. Each respective register has a particular type of entry added, or a combination thereof, and then routine S487 is executed in one embodiment. In another embodiment, there is only one register to which each type of entry is added, then routine S487 is executed.

Routine S487 tests to determine if the data storage is empty or if the last data entry has been read. If yes, routine S480 ends (S489). If no, there is a loop back and routine S483 reads the next entry.

If no is the answer to routine S485, routine S491 tests to see if the data storage is empty. If yes, routine S480 is concluded (S497). If no, routine S493 reads the next entry in data storage 302 and loops back to routine S485.

Figure 1D:
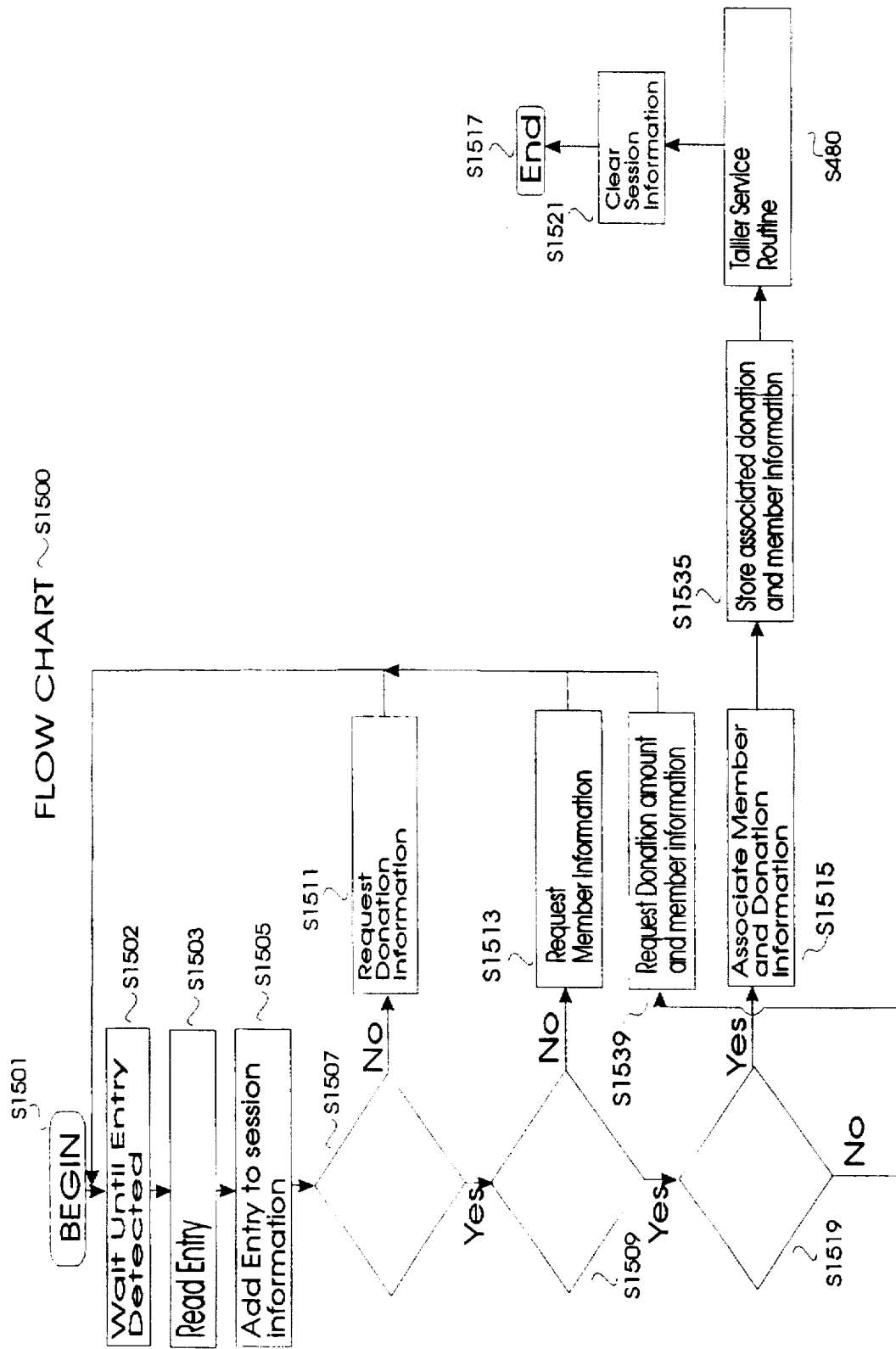
FIG. 1d is a flow chart illustrating the functionality of software and associated hardware for executing a donation session of the present invention.

FIG. 1d is a flow chart illustrating the functionality of software and associated hardware for executing a donation session of the present invention.

In one embodiment, routine S1500 is entered (S1501) whenever a donation, or member information, is detected by donation reader 1340 (FIG. 1a) by any other addition, e.g. keyboard 107 or a touch sensitive screen, or combinations thereof. Routine S1502 waits until an entry is detected by a reader or addition. Routine S1503 reads the entry. Routine S1505 adds the entry to session information. Routine S1507 tests to determine if the session information contains a donation amount. Exemplary donation amounts are a cash donation 143 entry indicating the denomination of a bill, keyboard 107 entry indicating a donation amount, a bar code 630 (FIG. 4a) entry indicating a donation amount, a coded envelope entry indicating a donation amount, a coded card entry indicating a donation amount, or a combination thereof. If no, routine S1511 requests a donation amount and S1511 loops around to Routine S1502. In one embodiment, routine S1511 displays a message for a time out period. Routine S1511 can involve a single screen or multiple screen display depending on the type of entry device used.

If the test of routine S1507 results in a yes, routine S1509 is executed. Routine S1509 determines if the session information contains member information. By way of example member information includes a member bar code 620 (FIG. 4a), a code associated with a member entered via keyboard 107, member information on a coded envelope, member information on a card, a fingerprint of a member, or a combination thereof. If no, routine S1513 requests member information and loops back to routine S1502.

If yes, Routine S1519 is executed and determines if the session information contains both member and donation information. If yes, routine S1515 associates the member and donation information. In one embodiment, Routine S1535 stores the associated member and donation information. In another embodiment, optional tallier service routine S480 is executed. Routine S1521 clears the session information. Routine S1500 ends (S1517).

If the result of routine S1519 is no, routine S1539 requests donation amount and member information and loops back to before Routine S1502. Again, this routine may involve single or multiple screens depending on the input device.

FIG. 2 is a perspective view of one embodiment of offering plate 100 with a cash donation acceptor 320. A member of religious organization feeds a cash donation 143 into a slot 381 which forms part of the cash donation acceptor 320. Slot 381 is an opening formed in the side or top of offering plate 100 which provides a channel to a center retaining area of plate 100. The cash donation acceptor 320 determines the denomination of cash donation 143 via a cash donation reader 340 and related circuitry 333 (FIG. 2a) which is disposed relative to slot 381 in one embodiment.

Cash donation acceptor 320 includes a mechanical bill transport mechanism in one embodiment. Further, the present invention contemplates that the cash donation acceptor 320 might also include a device for arranging bills of different denominations in different stacks. In an alternate embodiment, a member simply manually inserts cash donation 143 through slot 381. As the member inserts the cash donation 143, optical or magnetic sensors read the denomination of the bill as will be discussed below in more detail. It will be appreciated that manually inserting a cash donation 143 into cash donation acceptor 320 will decrease the weight of the offering plate since a transport mechanism is eliminated.

It will also be appreciated that in one embodiment the cash donation reader 340 (FIG. 2a), associated circuitry 333 (FIG. 2a), and related mechanism can have a simplified construction in that it need not contain a mechanism for rejecting cash donation 143. Rather, an optical and/or magnetic sensor need only determine the denomination of the cash donation 143 accepted by the cash donation acceptor 320.

FIG. 2a is a schematic block diagram of one embodiment of offering plate 100 with a cash donation reader 340 and associated circuitry 333, display circuitry 842, an LED display 840, communication circuitry 990, link 140, and a clergy member's terminal 120. This embodiment has the features described generally in FIG. 1a above as well as other features that will be described below.

A cash donation reader 340 and related cash donation reader circuitry 333 determine the denomination of cash donation 143, and communicate this information to processing circuitry 903 via a set of software routines that run on processing circuitry 903.

A currency discriminator, a currency validator, or a currency acceptor, or combination thereof, is disposed relative to slot 381 to determine the denomination of the cash donation and communicate this information to processing circuitry 903. Numerous types of currency acceptors, validators, and discriminators are known in the art and will be generally described here. Exemplary types of currency acceptors are disclosed in U.S. Pat. No. 4,588,292, British Patent Specification No. 2,088,051, U.S. Pat. No. 4,973,851, U.S. Pat. No. 4,881,268, and U.S. Pat. No. 4,984,280, and will be briefly described below.

Typically, such cash donation readers and related circuitry move an article of currency past a magnetic or optical sensor to obtain a set of successive sample values indicating the magnetic permeability or optical reflectance of an article of currency along a strip portion. The sample values are compared with a set of reference values indicating the same property of a genuine article of currency along that strip. An indication of genuineness of the currency is generated as a function of the comparison. In multiple denomination validators, sample values are compared with a plurality of sets of reference values, one set for each denomination, to assign a denomination on the basis of the best match. By way of further example, the specification directs attention to U.S. Pat. No. 4,881,268 incorporated by reference as if fully set forth herein.

In the present embodiment, processing circuitry 903 includes a microprocessor. However, a dedicated microprocessor may also be used. Processing circuitry 903, and the cash donation reader 340 and associated circuitry 333 are powered through power source 437 in this embodiment. Power source 437 is a battery power source. In another embodiment, if a cash donation reader 340 and associated circuitry 333 so requires, power source 437 might be a hardwired power supply.

Processing circuitry 903 interfaces with cash donation reader 340 and associated circuitry 333 via an address bus 536, data bus 533, and control bus 530. Specifically, upon detection by the cash donation reader 340 that a cash donation 143 (FIG. 2) is being made, cash donation reader circuitry 333 interrupts processing circuitry 903. Circuitry 903 responds to the interrupt by reading the buffered donation information which includes the denomination of cash donation 143. Circuitry 903 then stores the donation information, which may include donation amount, the type of payment and member information, in storage 302. In one embodiment, circuitry 903 also adds the new donation information to a running total of donation information stored in storage 302.

In another embodiment, tallier routine S480 is executed. The denomination of the cash donation is read by cash donation reader 340 and related circuitry 333, and communicated to processor 903 in order to allow service routine S480 (FIG. 1 and FIG. 1c) to retrieve an entry from storage 302 to sum up the total amount of cash donations 143 gathered.

In an alternate embodiment, offering plate 100 communicates the cash donation information to clergy member's terminal 120 via communication circuitry 990 and communication link 140. Clergy member's terminal 120 communicates donation information via communication link 1030 (FIG. 1) to a display for viewing by a member of a religious organization, i.e. a big screen television or projection television located at the religious service or some remote location. The display might be useful to determine if a donation goal is being attained by the congregation as donations are collected. In another embodiment, the present invention also contemplates that offering plate 100 might communicate with the display directly via communication link 140, thereby bypassing clergy member's terminal 120. As such, a member of a religious congregation might be able to monitor the donations being given in real time.

In one embodiment, service routine S480 communicates information regarding the total amount of cash donations 143 gathered via communication link 140, preferably an RF (radio frequency) communication link or an infra-red communication link, to the clergy member's terminal 120 for further processing as will be discussed below.

Figure 3:
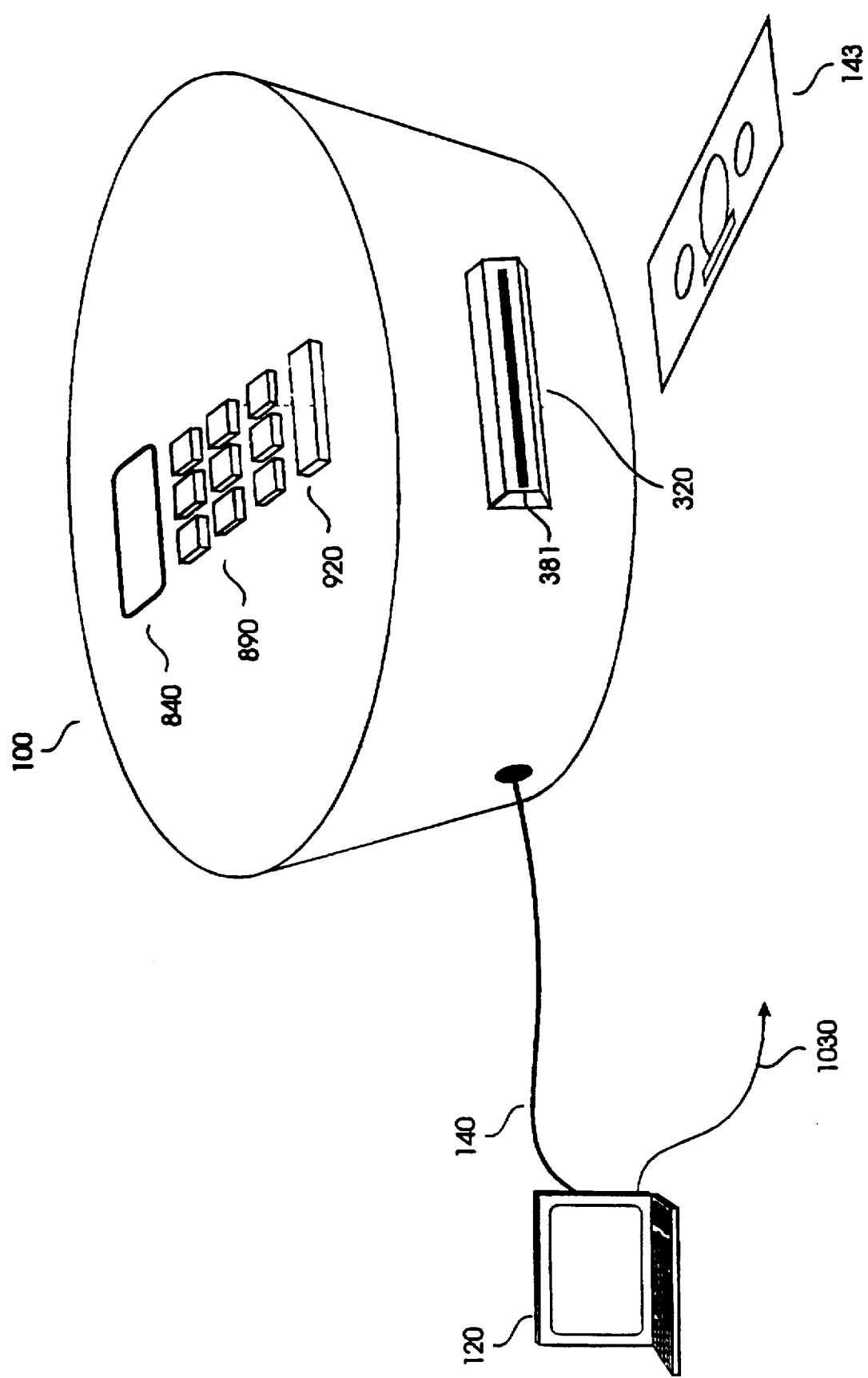
FIG. 3 is a perspective view of a cash donation, an embodiment of an offering plate with a cash donation acceptor, a key pad, a display, and a clergy member's terminal.

FIG. 3 is a perspective view of another embodiment of offering plate 100 with a cash donation acceptor 320. In this embodiment, the cash donation acceptor has the features and advantages previously described in FIGS. 1a, 2, and 2a with the addition of key pad 890 and entry key 920.

A member of a religious organization feeds in a cash donation 143 into slot 381. The cash donation acceptor 320 takes in the cash donation 143.

The member of the religious organization then utilizes a donation associator and routine S1500 in order to properly credit his religious organization account for cash donation 143. As used herein, the term "donation associator" refers to a device a member can use to associate a donation with himself or his religious organization account. The donation may include a cash donation 143, an envelope 600 (FIG. 1), or a card 145,150 donation (FIG. 1).

By way of further example, a donation associator is a key pad 890 with alpha-numeric text. The member of a religious organization punches in a code associated with his account using key pad 890 before, during, or after inserting the cash denomination 143 into the cash donation acceptor 320, and then punches an entry key 920. The religious member's code is associated with the cash donation 143 and the account of the member of a religious organization receives credit for the cash donation 143. Additionally, although not shown, the donation associator might include a pen based or touch sensitive screen input as described below. Upon receiving the religious member's code and the cash donation 143, the offering plate generates a message consisting of alphabetic and/or numeric text in a LED display 840 and credits the member's account appropriately. By way of example, the message may thank the member of the religious organization for the donation, or may display a quote from a religious text. The present invention also contemplates that the text in the LED display might be multi-lingual to accommodate the language preference used at the religious service. Although preferred, neither the entry key 920 or the LED display 840 are necessary for associating a cash donation with an account of a member, as will be described below.

In an alternate embodiment, key pad 890 and the cash donation acceptor 320 communicates information regarding the member's account and the donation to the clergy member's terminal 120, via communication link 140. The clergy member's terminal 120 then accordingly credits the member's church account, and might also be connected to a larger religious denomination database network via communication link 1030 to share member and donation information. In fact, the present invention contemplates that a member attending a church service located in a part of the country other than his regularly attended church service might have his religious organization account credited in his regularly attended church. The advantage of this feature will be readily apparent to members who frequently travel on business or pleasure.

FIG. 3a is a schematic block diagram of an embodiment of offering plate 100 with the features previously described with the addition of a keyboard 107 and keyboard circuitry 109.

Generally in all embodiments where a keyboard is present, keyboard circuitry 109 scans keyboard 107 to determine if a key has been hit. Keyboard 107 refers to both keypad 890 and entry key 920. Key board 107 might include a cancel key, and keys with other alpha-numeric text. In another embodiment, keyboard 107 might contain a key that represents a specific denomination amount, e.g. five dollars ($5) or ten dollars ($10). Processing circuitry 903 interfaces with keyboard 107 and associated circuitry 109 via an address bus 536, data bus 533, and control bus 530. Once a key has been hit on keyboard 107, that key information is moved into a buffer and interrupts processing circuitry 903 to communicate that the key is ready. Circuitry 903 responds to the interrupt by reading the buffered keyboard information. Circuitry 903 then stores the keyboard information in storage 302 if necessary. By way of further example, the keyboard information may consist of a donation amount, an account number of a member, an authorization code, and the like.

Figure 4A:
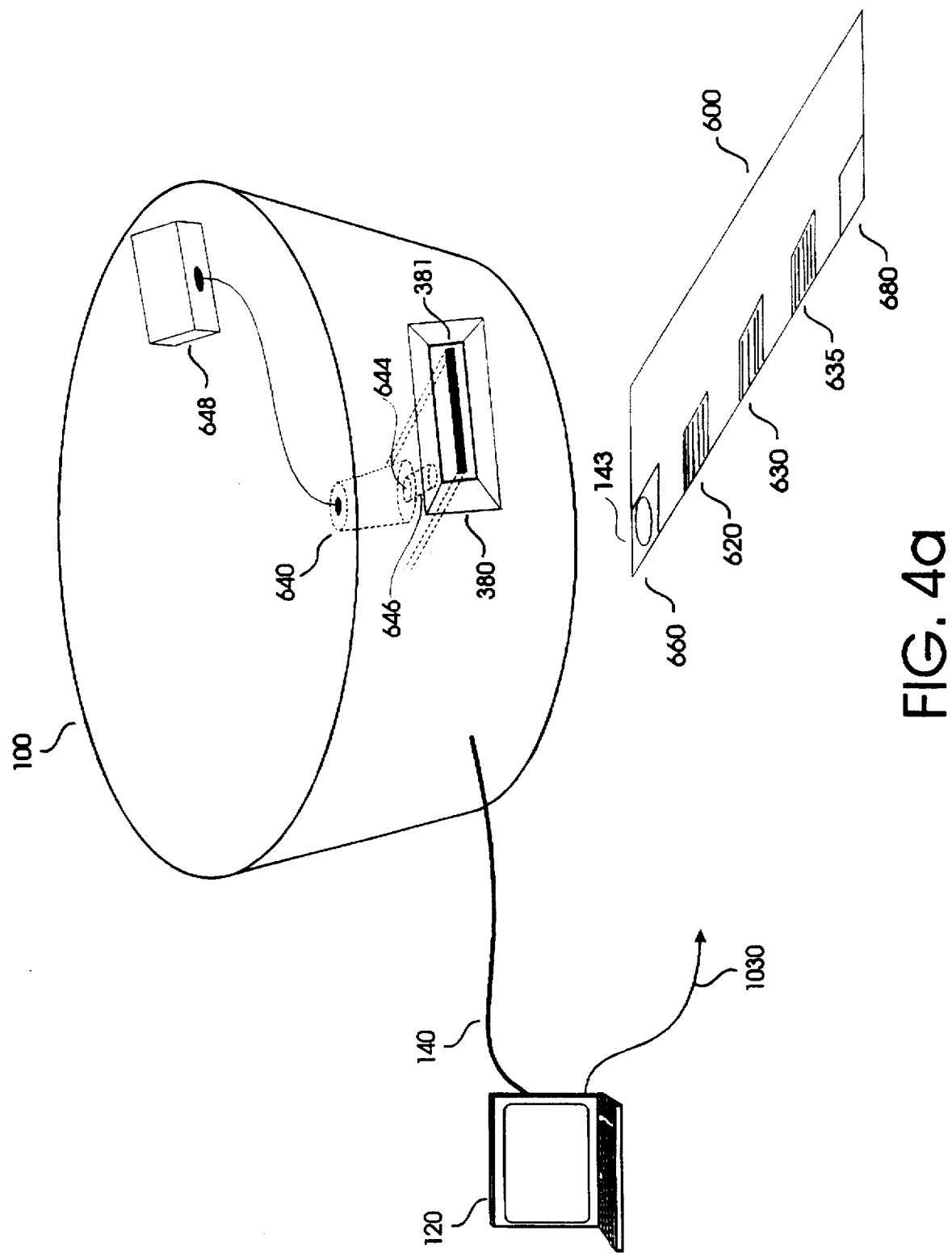
FIG. 4a is a perspective view of a bar coded envelope containing a cash donation, an embodiment of an offering plate with an envelope donation acceptor, and a clergy member's terminal.

FIG. 4a is a perspective view of an embodiment of an offering plate with an envelope donation acceptor 380. A member of a religious organization feeds an envelope 600 containing a cash donation into slot 381 forming part of the envelope donation acceptor 380. As used in relation to this figure the term "cash donation" also includes a donation by check. The envelope donation acceptor 380 takes in the envelope 600 containing a cash donation. This can be accomplished by pulling in envelope 600 containing a cash donation in by a transport mechanism such as that commonly encountered in vending machines, and as previously described. Alternatively, a member may manually insert the envelope 600 containing a cash donation through slot 381.

A donation associator allows a member's account to be properly credited for the donation. By way of example, the present invention contemplates that a donation associator for associating an envelope containing a cash donation with an account of a member may take on several forms, including but not limited to a bar code and bar code reader 640 and associated circuitry, an optical character recognition reader 637 and associated circuitry (FIG. 4d), or a combination thereof. The present invention further contemplates using a reader that reads a coded envelope.

In one embodiment, the envelope 600 containing a cash donation may contain a member bar code 620 that is associated with information about a member's account. The envelope 600 containing a cash donation may also contain a bar code representing a cash denomination 630, and/or a collection bar code 635. By way of example, a collection bar code 635 is used to designate the specific collection to which a donation is made if there are multiple collections during the same religious service. By way of further example, the member bar code 620 may be associated with the member's account.

In one embodiment, the religious organization may choose to give a member an envelope containing only a member bar code 620 imprinted on envelope 600. The present invention contemplates that the member can then add an adhesive label containing a bar code representing a cash denomination 630 to envelope 600. Moreover, on the occasion of a special collection, a member can add an adhesive label containing a collection bar code 635 which can be affixed onto envelope 600. The present invention also contemplates that other information can be associated with a bar code which can be affixed on envelope 600. By way of example, a bar code can be associated with a special religious prayer request, and the like, or associate with a donation in memory of a deceased individual.

Figure 4B:
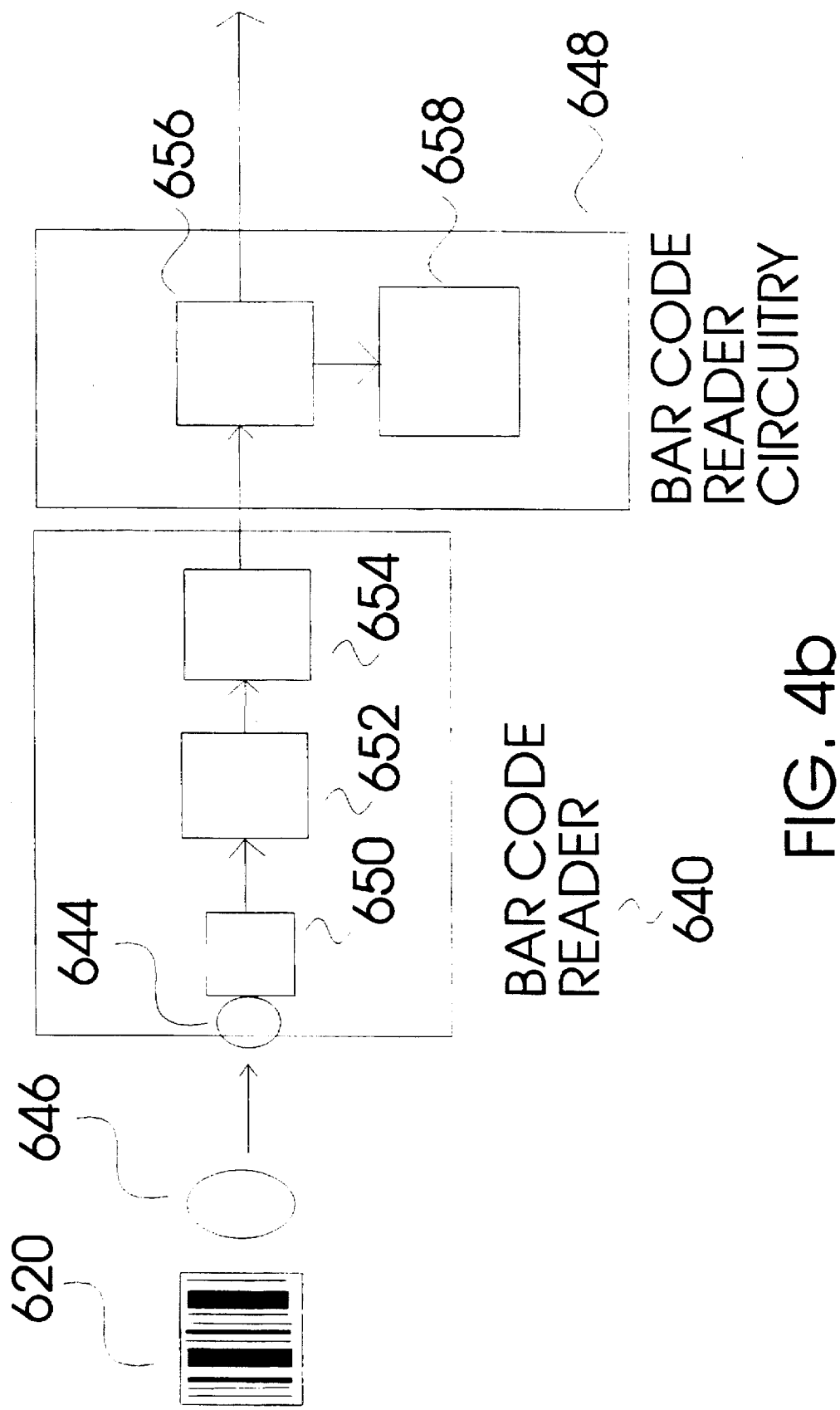
FIG. 4b is a schematic block diagram of a bar code reader and bar code reader circuitry which embodies the present invention.

If bar codes are used on envelope 600, a bar code reader 640 reads, by way of example, the member bar code 620, and communicates information to bar code reader circuitry 648 where it is stored (FIG. 4b). The present invention also contemplates that a bar code reader 640 reads information from a collection bar code 635 and a bar code associated with a cash denomination 630. In one embodiment, bar code reader 640 and bar code reader circuitry 648 communicates this information to the clergy member's terminal 120 via communication circuitry 990 and communication link 140 (FIG. 4d) or to processor 903 (FIG. 4d) for processing via service routine S480. In another embodiment, the clergy member's terminal 120 communicates this information via communication link 1030 to a central database where a plurality of donations might be processed from individual religious organizations, e.g. 50 individual churches belonging to one religious denomination.

The present invention contemplates that clergy member's terminal 120, and communication link 1030 might not be necessary. In yet another embodiment, bar code reader 640 and related circuitry 648 has a printer connection and printer circuitry so that a report might be printed directly from offering plate 100.

Numerous bar code readers are commercially available from vendors at a comparatively low price. By way of further example, a bar code reader might be an ordinary pen-type bar code reader. The pen type bar code reader emits a light beam through a lens 644, the light reflected from the member bar code 620 is gathered by the bar code reader 640 through lens 644. The reflected light is then converted into an electric signal by a photoelectric conversion element in the bar code reader 640. Since the construction and operation of this type of bar code reader are well known, a detailed description is omitted.

For collecting information from an envelope 600 containing a cash donation, the lens 644 of bar code reader 640 is disposed near or faces a light emitting section 646. Alternatively, light emitting section 646 might be omitted. Optical signals (from the light emitting section 646 if present) are collected in the bar code reader 640 through lens 644 and are converted to electrical signals by the photoelectric conversion element in the bar code reader 640. The bar code reader 640 recovers the information represented by the optical signals emitted by light emitting section 646 or emitted through the lens 644 and reflected from the envelope 600 back through the lens 644. The reflected light might create noise that can mask the optical signals emitted by light-emitting section 646. Consequently, the distance between the light emitting section 646 and the lens 644 is selected so that reflected light is weakened sufficiently before it reaches the lens 644. Moreover, other known techniques for reducing noise created by the light emitting section 646 can be used.

By way of further example, the envelope 600 containing a cash donation might also contain a member's handwriting or other symbols concerning a member's account. In this scenario, the donation associator utilizes optical character recognition technology (OCR) to read the handwriting on the envelope 600 and associate the handwriting with a member and/or his account. Devices for reading handwriting utilizing OCR are commercially available from a number of vendors. Moreover, OCR devices are disclosed in U.S. Pat. No. 4,821,332. By way of example, the handwriting may memorialize information that includes a member's name, a member code, a denomination of the cash donation 143, and the collection for which the donation is given. In yet another embodiment, information retrieved from bar code reader 640 and associated circuitry 648 is utilized by accounting software routines.

The present invention also contemplates that the envelope 600 containing a cash donation may have spaces on it that can be blackened with a pencil, i.e. a number two pencil. In this scenario, the donation associator, utilizes technology that allows the blackened spaces to be detected. The spaces might represent information that includes a member name, a member code, the denomination of the cash donation 143, the collection for which the donation, and the like.

In yet a further embodiment, envelope 600 containing a cash donation can have opening 660 through which the denomination or other distinguishing feature of the cash donation 143 within the envelope can be read by the donation associator incorporating OCR, or by the cash donation acceptor 320. The envelope donation acceptor 380 might share a common functionality with the cash donation acceptor 320, if both utilize OCR, so that only one device is required to determine the denomination of a cash donation 143, the denomination of the cash donation 143 within an envelope 600 containing a cash donation, and other information on envelope 600, including by way of example, a member's name. It is preferred that the envelope 600 containing a cash donation have only slightly larger dimensions than a cash donation 143 to aid in inserting the envelope 600 containing a cash donation into slot 381.

The denomination of the cash donation 143 within the envelope 600 is read in order to allow service routine S480 to total the amount of cash donations 143 gathered and also to associate the size of the cash donation 143 with other information on the envelope 600 containing a cash donation including the account of the member making the donation.

Additionally, a transparent film 680 might cover opening 660. As used herein, the term "transparent film" refers to any material through which a denomination or other distinguishing feature of a bill can be recognized, including a translucent material. The present invention further contemplates that the envelope 600 containing a cash donation may be entirely made out of a material that is transparent.

Figure 4C:
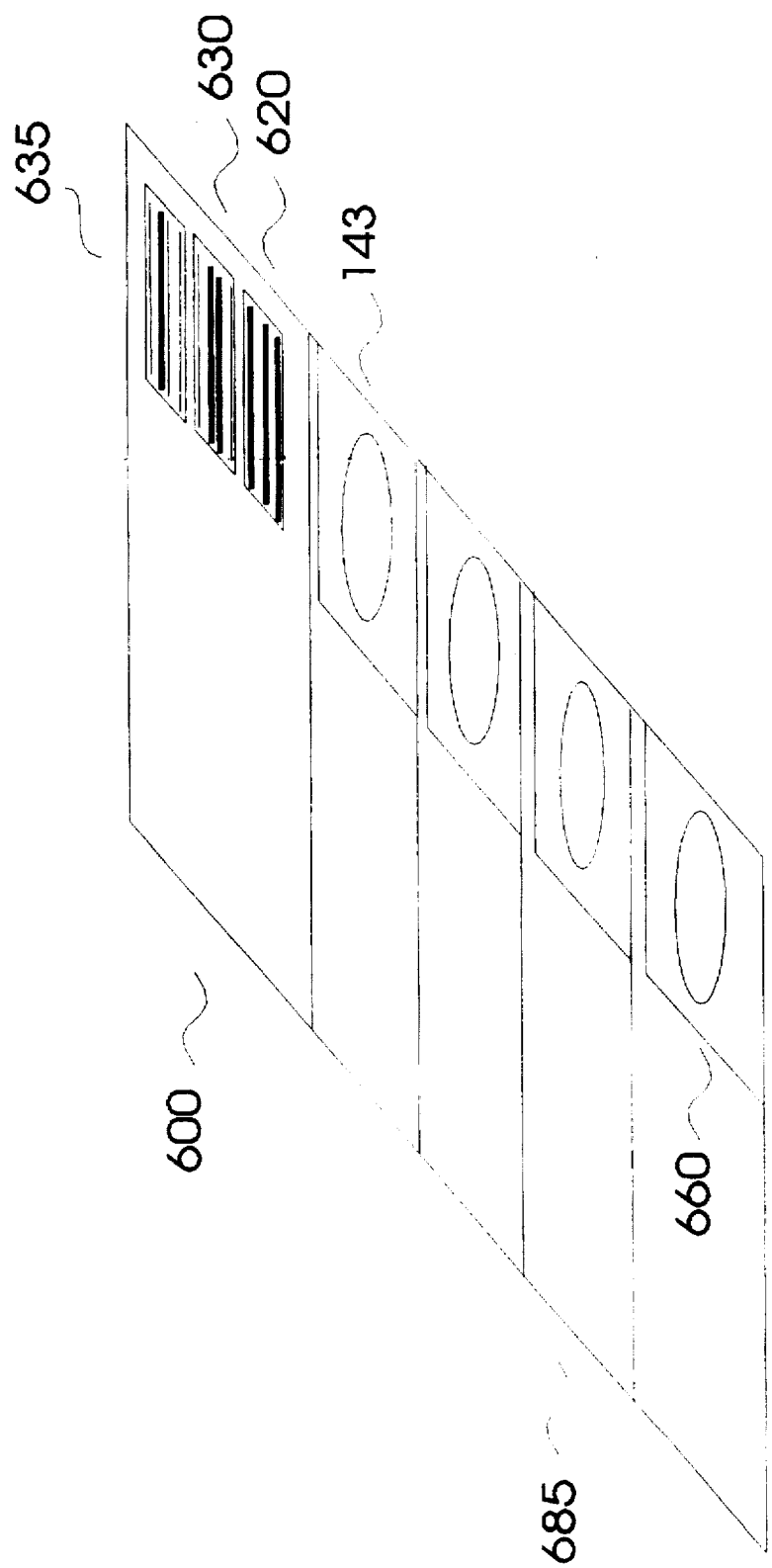
FIG. 4c is a perspective view of an embodiment of a bar coded envelope that accepts a cash donation consisting of one or more bills.

FIG. 4b is a schematic block diagram of a bar code reader 640 and associated circuitry 648, and an exemplary bar code, a member bar code 620. Light emitted from the light emitting section 646 reflects from the bar code 620 on the envelope 600 and, thereby, represents the information on bar code 620. This reflected light is focused by lens 644 onto the photoelectric conversion element 650 so that it is converted into electric signals by the element 650. The electric signals are amplified by amplifier 652 and converted into digital signals by means of a digital circuit 654. The signal is read by dedicated microprocessor 656 and stored in memory 658. The memory accumulated in memory 658 are read and delivered to the clergy member's terminal 120 as required via communication link 140, or to storage 302 (FIG. 4c). The information in memory 658 might include a member's account information, the collection for which the donation is given if there are multiple collections, the time and date of the religious service, and the amount of the donation contained within envelope 600.

In one embodiment, bar code reader 640 and associated circuitry 648 produces member and donation information utilized by service routine S480. In an alternate embodiment, memory 658 communicates member and donation information to routine S500, S520, S1500, or combinations thereof. Service routine S480, S1500 properly credit a member's account and keep a running total of donations made by the member or a plurality of member's during a certain time period.

Bar code symbol standards regulate the number and arrangement of black and white bars, so that dedicated microprocessor 656 can read one item of information from, i.e. bar code 620. There are common bar code symbol standards such as UPC in the United States of America, EAN in Europe, and JAN in Japan, as well as other standards such as NW-7, Code 39, etc. Bar code readers and associated circuitry correspond to respective standards.

Although the exemplary described embodiment incorporates a pen type bar code reader, the offering plate 100 might incorporate any type of data gathering device equipped with a bar code reader.

FIG. 4c is a perspective view of an embodiment of an envelope 600 containing a cash donation with a plurality of openings 660. The present invention contemplates that a member may wish to make a donation that includes a plurality of cash donations 143. By way of example, a member may wish to donate $36. The member inserts a cash donation 143 including a one dollar, five dollar, ten dollar, and twenty dollar cash donation into compartments 685 within envelope 600.

The envelope donation acceptor 380 takes in the envelope 600 containing a cash donation. The denominations of the cash donations 143 within each compartment in the envelope 600 containing a cash donation are read for each cash donation 143 in order to allow service routine S480 to sum up the total amount of cash donations 143 gathered and also to associate the total of the cash donations 143 with other information on the envelope 600 containing a cash donation including the account of the member making the donation as previously described. A bar code reader 640 and associated circuitry 399 (FIG. 4d) reads bar code information, 620, 630, 635, or combinations thereof, and communicates this information to processor 903 (FIG. 4d).

Figure 4D:
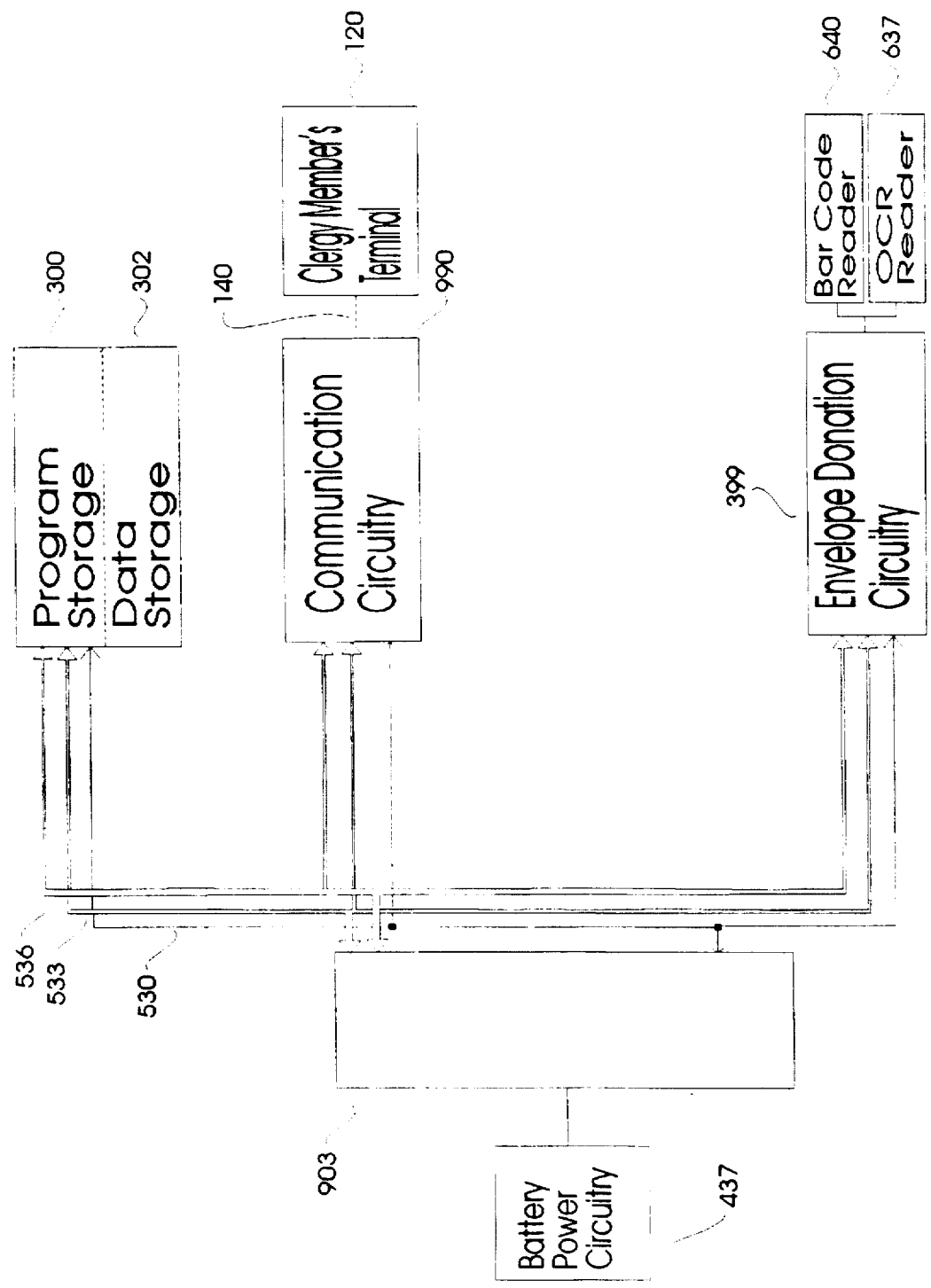
FIG. 4d is a schematic block diagram of an embodiment of an offering plate with a envelope donation acceptor.

FIG. 4d is a schematic block diagram of one embodiment of offering plate 100 with the addition of an envelope donation acceptor 380. In one embodiment the envelope donation acceptor includes, a bar code reader 640 and associated circuitry, an OCR reader 637 and associated circuitry, envelope donation circuitry 399, or combinations thereof. This embodiment has the features described generally in FIG. 1a above as well as other features that will be described below.

In the present embodiment, processing circuitry 903 includes a microprocessor. However, a dedicated microprocessor and associated circuitry might also be used.

Processing circuitry 903, bar code reader 640, OCR reader 637 and associated circuitry 399 are powered through power source 437 in this embodiment. Power source 437 is a battery power source. In another embodiment, if readers 640, 637 and associated circuitry 399 so require, power source 437 might be a hardwired power source.

Processing circuitry 903 interfaces with bar code reader 640, OCR reader 637, or a combination thereof, and associated circuitry 399 via an address bus 536, data bus 533, and control bus 530. Specifically, upon detection by bar code reader 640, OCR reader 637, or a combination thereof, that an envelope 600 donation (FIG. 4c) is being made, envelope donation reader circuitry 399 interrupts processing circuitry 903. Circuitry 903 responds to the interrupt by reading the buffered donation information and member information which includes, by way of example, the denomination of cash donation 143 within envelope 600, bar coded donation and member information, written donation and member information, or combinations thereof. Circuitry 903 then stores the donation and member information in storage 302. In one embodiment, circuitry 903 also adds the new donation information to a running total of donation information stored in storage 302.

In another embodiment, tallier routine S480 is executed. The donation and member information is read by readers 640, 637, or combinations thereof, and related circuitry 399, and communicated to processor 903. Service routine S480 (FIG. 1 and FIG. 1c) retrieves the entry from storage 302 to sum up the total amount of cash donations 143 gathered.

Figure 5:
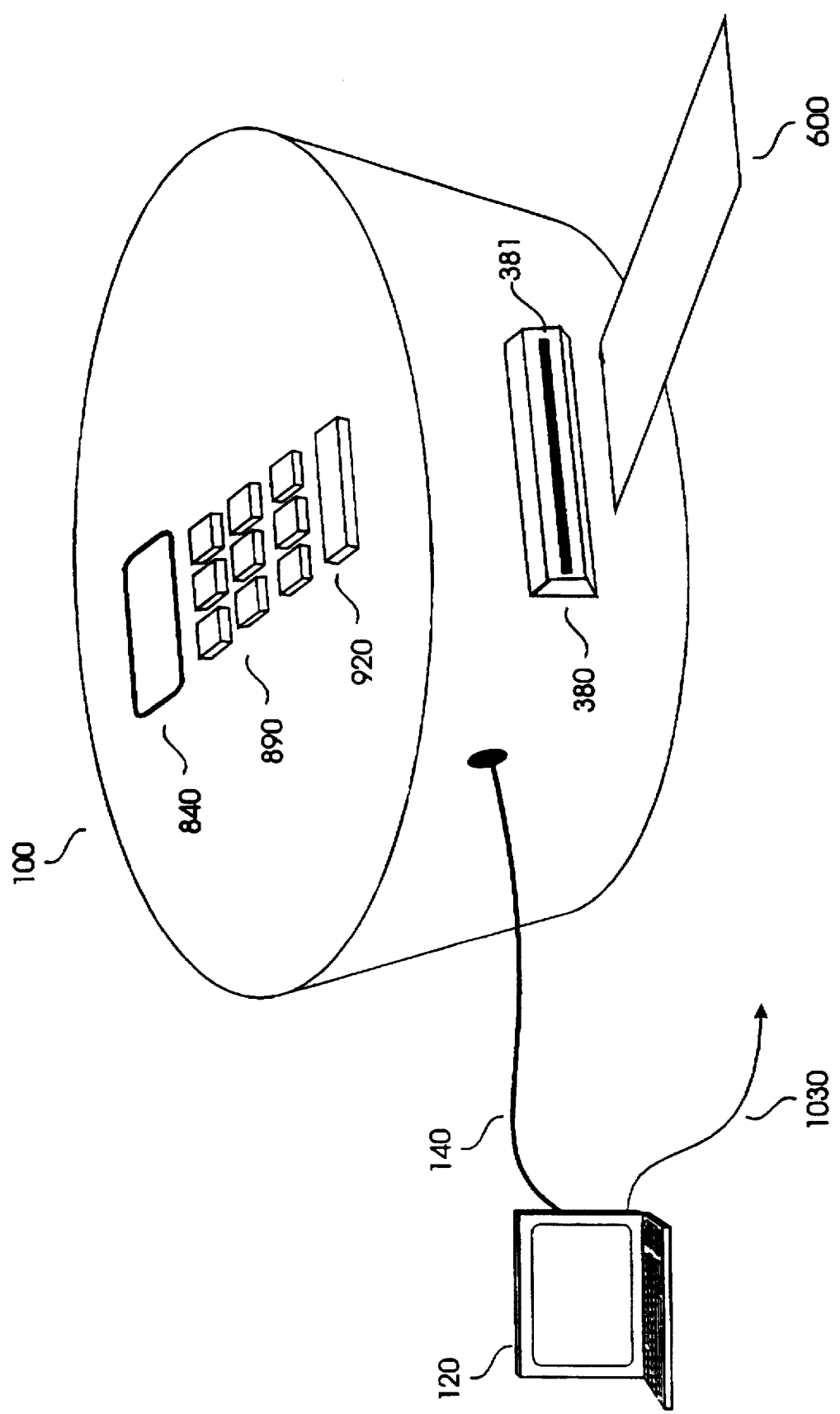
FIG. 5 is a perspective view of an envelope containing a cash or check donation, and an embodiment of an offering plate with an envelope donation acceptor, a key pad for associating the envelope containing a cash donation with an account of a member, and a clergy member's terminal.

FIG. 5 is a perspective view of an embodiment of an offering plate with an envelope donation acceptor 380. In this embodiment, the envelope donation acceptor 380 has the features and advantages previously described. A member of a religious organization feeds an envelope 600 containing a cash or check donation into slot 381 in the envelope donation acceptor 380. The envelope donation acceptor 380 takes in the envelope 600 containing a cash donation. The member of the religious organization then utilizes key pad 890 to associate the envelope 600 containing a cash donation with his account, and to properly credit the account.

By way of further example, the member of a religious organization punches in a code associated with his account using the key pad 890 before, during, or after inserting the envelope 600 containing a cash donation into the envelope donation acceptor 380, and then punches an entry key 920. The religious member's code is associated with envelope 600 and the account of the member of a religious organization receives credit for the envelope 600 containing a cash donation. Additionally, in this embodiment, the donation associator might include pen based or touch sensitive screen input as described below.

Upon receiving the religious member's code and the envelope 600 containing a cash donation, offering plate 100 generates a message consisting of alpha-numeric text in a LED display 840. By way of example, the message thanks the member of the religious organization for the donation, or displays a quote from a religious text.

In a preferred embodiment, the member may insert the envelope 600 containing a cash donation, punch in his member code using key pad 890, and punch the entry key 920. A cash donation acceptor 320 (FIGS. 2 and 2a) reads the denomination of the cash donation 143 within the envelope 600 containing a cash donation as described previously, and communicates information concerning the denomination of the cash bill to processor 903 (FIG. 1a).

Figure 5A:
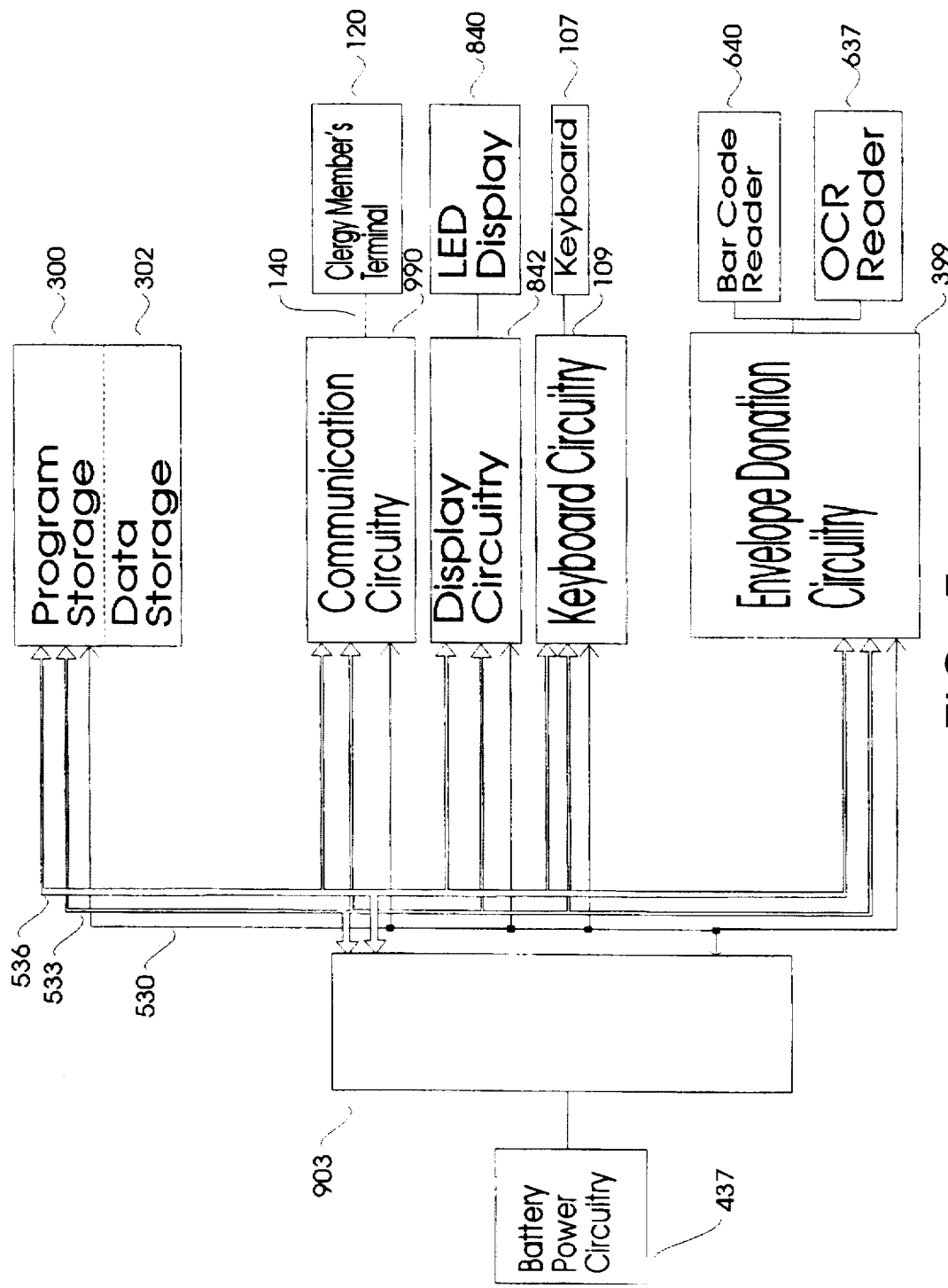
FIG. 5a is a schematic block diagram of an embodiment of an offering plate with an envelope donation acceptor, a display, and a keyboard.

FIG. 5a is a schematic block diagram of the embodiment of offering plate 100 as described in FIG. 4d and FIG. 5 with the addition of a keyboard 107 and associated circuitry 109 described in FIG. 3a and a display 840 and associated circuitry as previously described.

FIG. 6 is a perspective view of an embodiment of an offering plate 100 with a credit card donation processor 160 and a debit card donation processor 240, e.g. processor 160/240. The present invention contemplates that offering plate 100 might only contain a credit card donation processor 160. Alternatively, the present invention also contemplates that offering plate 100 might only contain a debit card donation processor 240. In yet a further embodiment, the present invention contemplates that both a credit card donation processor 160 and a debit card donation processor 240 might be located on offering plate 100 at different physical locations.

Card processor 160/240 includes a card slot defining member 161 which defines a card slot 162. A member swipes a credit card 145 through card slot 162 of a credit card donation processor 160. Alternatively, a member swipes a debit card 150 through card slot 162 of a debit card donation processor 240. Moreover, as used herein, the term "card donation processor" when used without the descriptors "credit" or "debit" refers to either a credit card processor, debit card processor, or both a credit and debit card processor.

In a preferred embodiment, offering plate 100 has both a credit card donation processor 160 and a debit card donation processor 240 utilizing a single processor that discriminates between the type of donation made. An exemplary credit and debit card processor 160/240 is disclosed in U.S. Pat. No. 5,012,077 which is incorporated herein by reference as if fully set forth.

In one embodiment, the card donation processor 160/240 communicates with key pad 890. Upon receiving the communication that a card donation is to be given, key pad 890 reveals a key associated with a cash denomination. By way of example, the key associated with a cash denomination might appear to disclose a one, five, ten or twenty dollar symbol as described below. The member presses the key associated with a cash denomination that is the preferred amount of his donation, and presses entry key 920.

It will be appreciated that most credit card 145 donation amounts will not require an authorization by signature or numeric code. Consequently, in one embodiment, the present invention contemplates that a member will simply need to swipe card 145/150 through card processor 160/240 and enter the amount of his donation by pressing a key associated with a cash denomination in making his donation on key pad 890. In an alternate embodiment, the present invention contemplates that a member will have pre-authorized the religious organization to collect a donation amount. Pre-authorization might include an agreement with the organization that a member authorizes the donation of a given amount once a certain action takes place, i.e. the member swipes card 145/150 through card processor 160/240 at offering plate 100.

In the case of a debit card 150 donation via offering plate 100, the member might authorize the religious organization to use a secret identification number associated with his debit card account in order to allow the organization to automatically obtain the donation without seeking subsequent authorization from the member. In this scenario, the member need only perform the action of swiping card 150 through processor 160/240 on offering plate 100 to make a donation.

The present invention also contemplates that a member might wish not to disclose a member's card 145/150 account authorization code to the religious organization for security reasons but still might wish to make a card 145/150 donation. In this case, the present invention contemplates that the clergy member's terminal 120 has an input 307 that allows for entry of the member's card 145/150 account authorization code so that it is encrypted and only decipherable and usable by the clergy member's terminal 120 or offering plate 100 for processing the card 145/150 donation. An advantage of this feature is added security for the member.

The present invention also contemplates using a touch sensitive screen to input, a member's name, credit card and/or debit account information, the collection for which the donation is made if there are multiple collections, and the like.

The present invention also contemplates that a member can attach an adhesive label containing a bar code to credit card 145 or debit card 150. The bar code may be a member 60 bar code 620, a bar code associated with a cash denomination 630, a collection bar code 635, or the like. Preferably the adhesive sticker is located on the opposite side of the magnetic strip on credit card 145 or debit card 150.

Figure 6A:
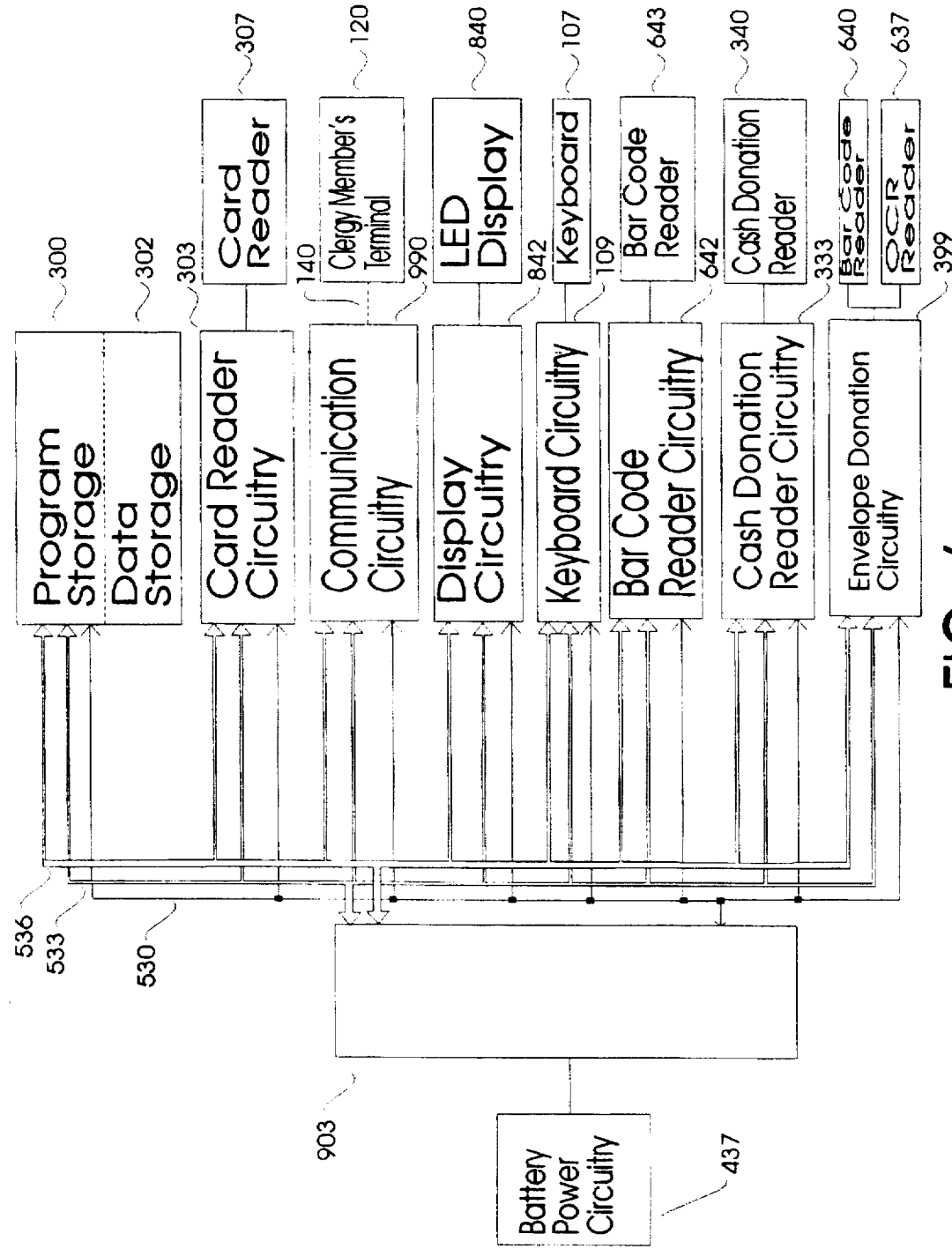
FIG. 6a is a schematic block diagram of an embodiment of an offering plate with a card donation processor, a cash donation acceptor, an envelope donation acceptor, a keyboard, a bar code reader, and a display.

Card processor 160/240 includes a magnetic stripe reader which reads the magnetic stripe when card 145, 150 moves through slot 162 and, a bar code reader 643 that reads, by way of example, bar code 620 as card 145, 150 moves through slot 162. Information including the name of the owner of the card and the card account number is transferred to data storage 302. In addition, the bar code reader 643 reads the bar code associated with a cash denomination 630 as either credit card 145 or debit card 150 is swiped through the card donation processor 160/240. Bar code reader 643 then communicates the information regarding the size of the donation from the bar code associated with a cash denomination 630 to processor 903 for storage in data storage 302 (FIG. 6a). Data storage 302, like memory storage 658 (FIG. 4b) may transfer its data to the clergy member's terminal 120 via link 140 for further processing.

An advantage of this adhesive label feature is that the member can donate his preferred donation amount at every religious service without the need to choose a donation amount during the service, i.e. touch a key associated with a donation. Alteratively, a member might also change the adhesive label with a bar code associated with a cash denomination for each service to accommodate his donation preference.

If the member chooses to donate a set donation amount utilizing a bar code associated with a cash denomination 630, there might be an increased probability that the amount of donation from a particular member will remain constant. The religious organization might also reap the added advantage of being able to forecast a budget based on a relatively constant stream of credit card 145 donations or debit card 150 donations.

FIG. 6a is a schematic block diagram of an embodiment of offering plate 100 with additions and features described in FIG.'S 1a, 2a, and 5a. The present embodiment further contains a card reader 307 and related circuitry 303 addition, and a bar code reader 643 and related circuitry 642 addition. Features of the card reader and bar code reader addition have been described in FIG. 6 above.

Card reader 307 and related circuitry 303 reads information on a swiped card 145, 150 and converts card information to a digital sequence of 1's and 0's which correspond to the card information thereon, and stores this information in a buffer. Card reader circuitry 303 interrupts processor 903 and communicates card information to processing circuitry 903. Processing circuitry 903 interfaces with card reader 307 and associated circuitry 303 via an address bus 536, data bus 533, and control bus 530. Specifically, upon detection by reader 307 that a card 145/150 donation is being made, card reader circuitry 303 interrupts processing circuitry 903. Circuitry 903 responds to the interrupt by reading the buffered card information. Buffered card information includes member and account information in one embodiment.

In one embodiment, keyboard circuitry 109 interrupts processing circuitry 903. Circuitry 903 responds to the interrupt by reading buffered keyboard information, which by way of example, includes donation information. Circuitry 903 then associates the donation and card information via a routine analogous to S1500 in one embodiment, and stores the donation information in storage 302. In another embodiment, circuitry 903 takes the associated donation and card information and transfers it from storage to a third party card processor.

In another embodiment, bar code reader circuitry 642 interrupts processing circuitry 903. Circuitry 903 responds to the interrupt by reading buffered bar code information, which by way of example, includes donation, collection, member information, or a combination thereof. Circuitry 903 then associates the information via a routine analogous to S1500 in one embodiment. Circuitry 903 stores the information in storage 302.

Figure 6B:
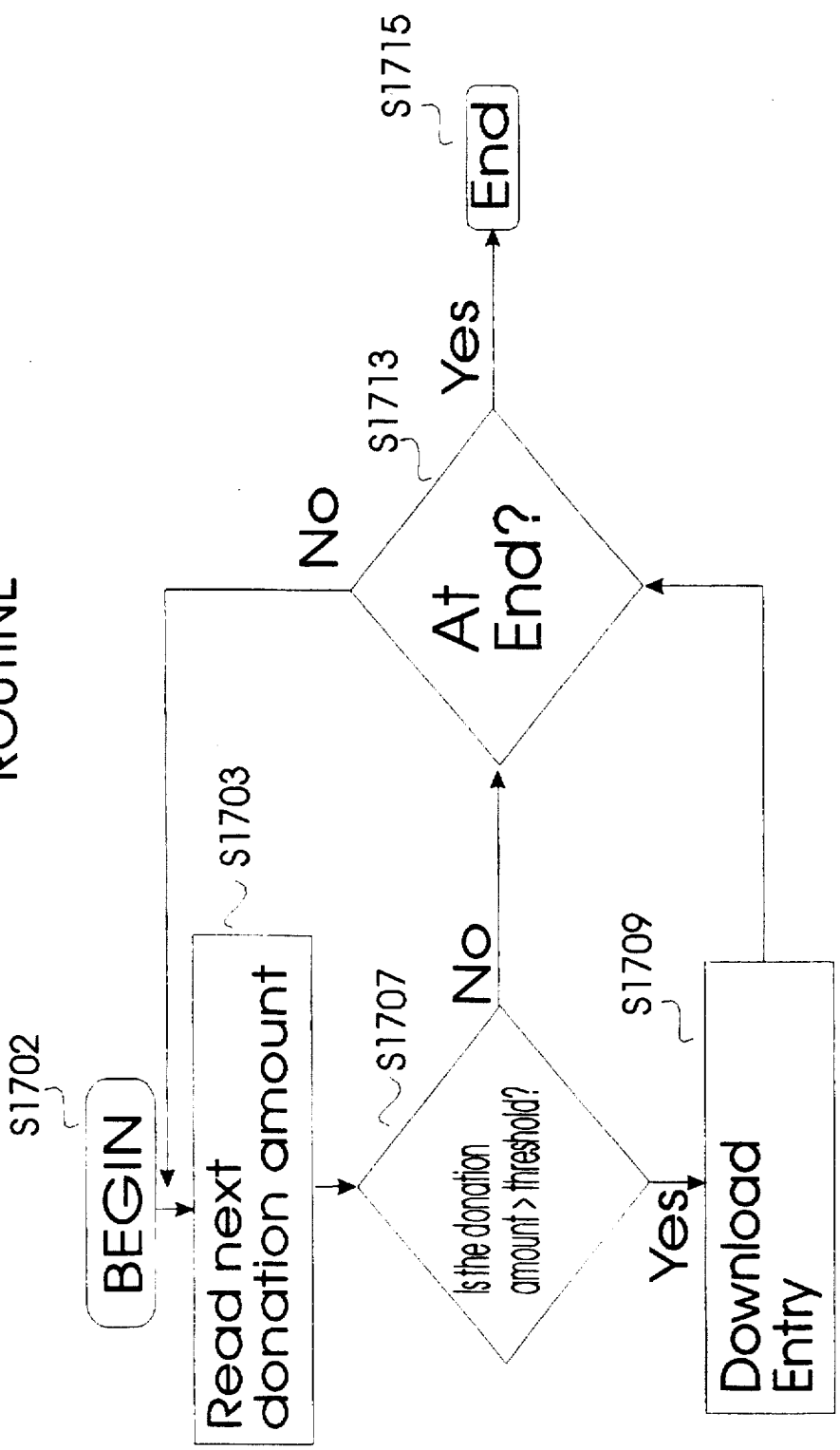
FIG. 6b is a flow chart representing a small donation service routine.

FIG. 6b is a flow chart representing the functionality of small donation service routine 1700 for card donations, a set of software routines that run on offering plate 100 or clergy member's terminal 120.

A single or a plurality of associated card 145,150 donations is stored in data storage 302 (FIG. 6a). A set of software routines has first associated a member's card account information with a donation. The member has made a number of card donations within a specified time period which are stored and tallied by a set of software routines. Small donation service routine S1700 downloads a plurality of a member's card donations once a card donation amount threshold is reached.

By way of example, a member may wish to make a card donation of two dollars weekly. However, a communication charge between an offering plate 100 and a central database card processor, i.e. First Data Resources, BT North America, MAAP, and National Data Corp, might be relatively expensive and as such would make the transaction cost of processing one two dollar weekly card donation prohibitive. However, once a number of two dollar weekly donations are received, i.e. over a period of two months (sixteen dollars), communication charges might be reasonable for the size of the transaction. Moreover, the longer the religious organization waits to process the donations, the greater the decrease in transaction costs relative to donation size.

Routine S1700 is entered (S1702) at a convenient interval, by way of example, every week, or every month. Routine S1703 reads the next card donation amount for one member from storage. Routine S1707 tests to determine if the donation amount is greater than a threshold amount. In one embodiment, a threshold amount is chosen to make the transaction costs of processing a card donation reasonable in comparison to the card donation amount. If yes, the entry is downloaded via Routine S1709. In one embodiment, the entry is downloaded via communication circuitry 990 to a third party card processor, and the like. Routine S1713 is then executed. Routine S1713 tests to determine if the end of the donation amount information in storage has been reached for a member. If yes, Routine S1700 is concluded (S1715). If no, routine S1703 is executed again. In one embodiment, S1703 reads a card donation amount for another member.

If the response to Routine S1707 is no, routine S1713 is executed. If the response to S1713 is yes, routine S1700 concludes (S1715). If no, there is a loop back to routine S1703.

Figure 7:
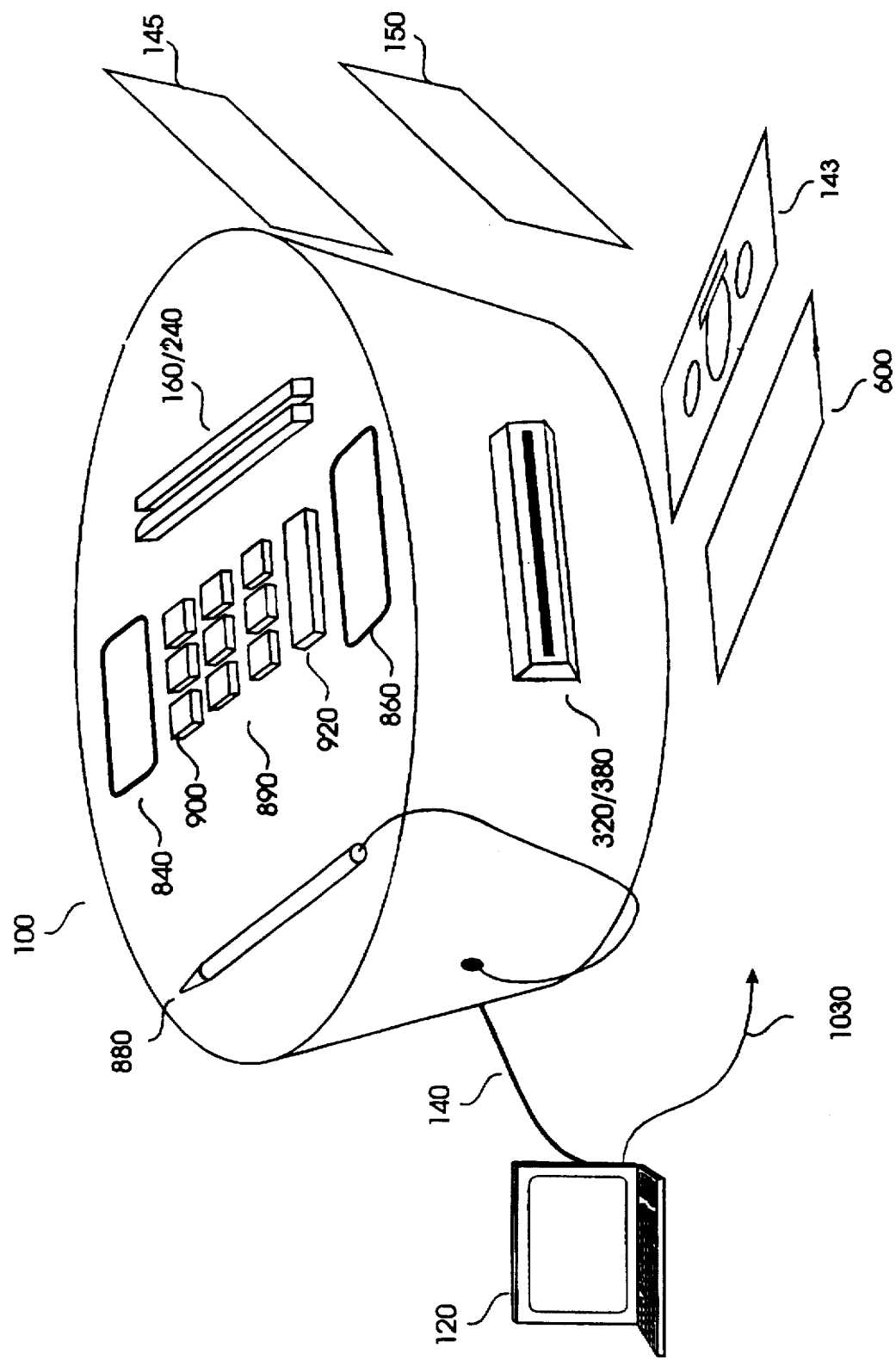
FIG. 7 is a perspective view of a cash donation, an envelope containing a cash or check donation, a credit card, a debit card, and an embodiment of an offering plate with a credit card donation processor, a debit card donation processor, a key pad, a cash donation acceptor, an envelope donation acceptor, an electronic signature line, and a clergy member's terminal.

FIG. 7 is a perspective view of an embodiment of an offering plate 100 with a credit card donation processor 160 and a debit card donation processor 240. Offering plate 100 can contain either a credit card donation processor 160 or a debit card donation processor 240, or may consist of both a credit card donation processor 160 and a debit card donation processor 240.

In one embodiment, key pad 890 can be used to associate a donation amount with an account of a member. As described above, the credit card donation processor 160 communicates with key pad 890. Upon receiving the communication that a card donation 145/150 is to be given through the card donation processor 160/240, or an envelope 600 containing a cash donation is to be given through the envelope donation acceptor 380, key pad 890 reveals a key associated with a cash denomination 900, e.g. a key associated with a cash denomination of five dollars. By way of further example, the key associated with a cash denomination appears to disclose a one, five, ten or twenty dollar symbol. The member presses the key associated with a cash denomination 900, and presses entry key 920.

In another embodiment, key pad 890 is used as a donation associator. Key pad 890 (including, by way of example, the key associated with a cash denomination 900) is linked to the cash donation acceptor 320, the envelope donation acceptor 380, and/or the card donation processor 160/240. Upon receiving the communication that a cash donation 143 is to be given through the cash donation acceptor 320, an envelope 600 containing a cash donation is to be given through the envelope donation acceptor 380, key pad 890 reveals a key associated with a member code. By way of example, the key associated with a member code may appear to disclose alphabetic or numeric text. The member presses the key(s) associated with a member code that corresponds to his member or family code, and presses entry key 920. The present invention also contemplates that key pad 890 may contain a key that is also associated with the number of the collection to which a donation is made, and the like.

In another embodiment, the offering plate 100 might adopt pen-based input or touch sensitive screen input. Pen 880 and screen 860 provide a member a substitute for key pad 890. By way of example, a member may use pen 880 to write in the amount of donation or other alpha-numeric text on screen 860. Alternatively, a symbolic key associated with a cash denomination might appear on screen 860. The member then uses his finger to touch the symbolic key associated with a cash denomination and designates the donation amount. If a member's signature is required, pen 880 can also be used with screen 860 as an electronic signature line. In one embodiment, the member's signature entered on screen 860 can be collected, stored, and/or transmitted by card processor 160/240 along with donation information to a third party card processor via a communication link 1030. Alternatively, this information might be sent to clergy member's terminal 120 via communication link 140 for further processing, storage, and/or transmittal via communication link 1030.

By way of example, a device for sending signature information is disclosed in U.S. Pat. No. 5,091,975 issued Feb. 25, 1992, and this disclosure is incorporated by reference as if fully set forth herein. The member signs his signature on screen 860 using pen 880, and then presses entry key 920 or a send command on screen 860. Moreover, if the religious organization wishes to obtain approval for a card donation, the present invention further contemplates the performance of local and central card transactions as disclosed in U.S. Pat. No. 5,206,488 issued on Apr. 27, 1993 incorporated herein as if fully set forth.

Figure 7A:
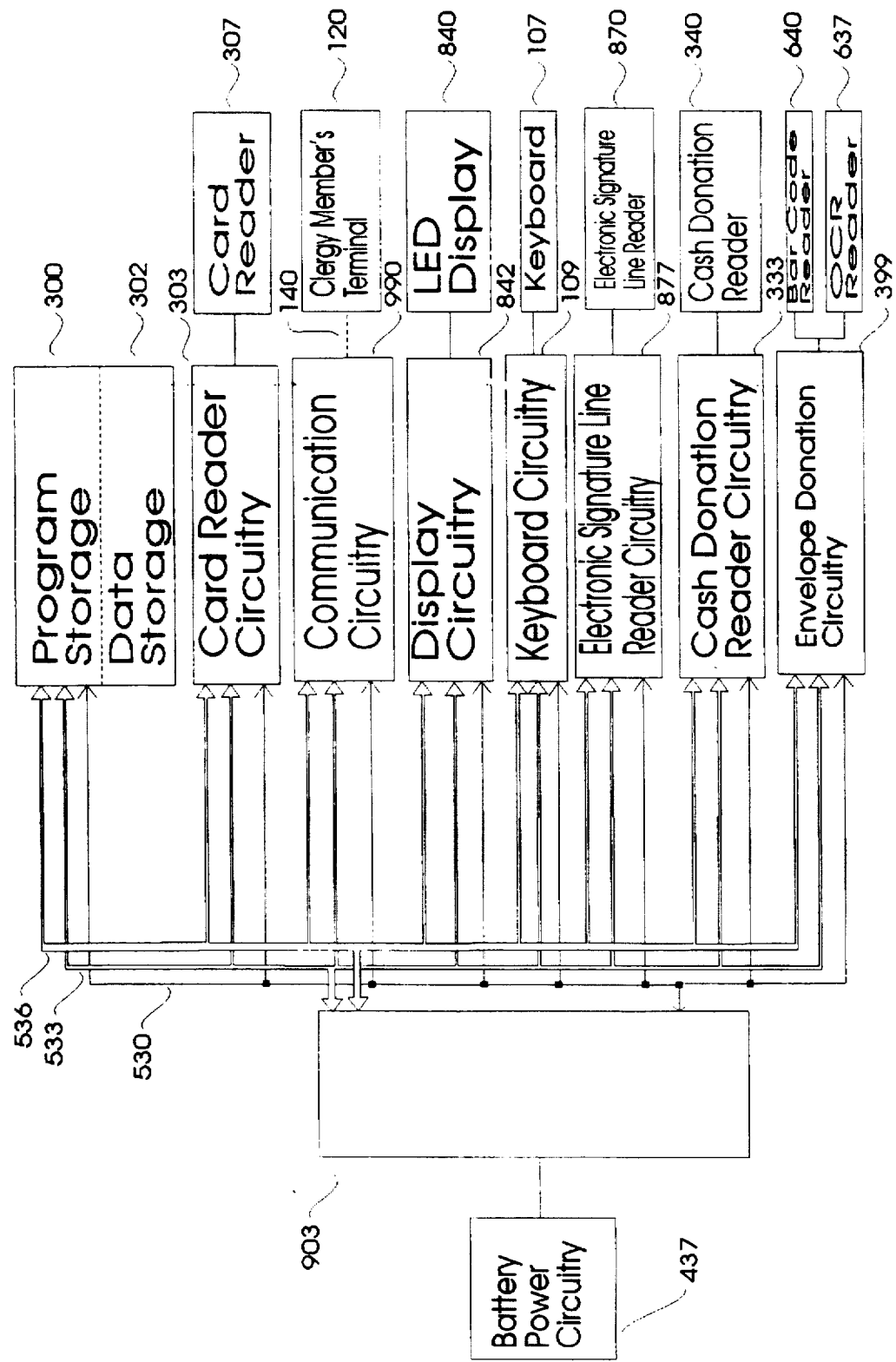
FIG. 7a is a schematic block diagram of an embodiment of an offering plate of the present invention with a card processor, a keyboard, an electronic signature line, a cash donation acceptor, and an envelope donation acceptor.

FIG. 7a is a schematic block diagram of an embodiment of offering plate 100 with features previously described above. In addition, this embodiment includes an electronic signature line reader 870 and associated circuitry 877.

Processing circuitry 903 interfaces with an electronic signature line reader 870 and associated circuitry 877 via an address bus 536, data bus 533, and control bus 530. Specifically, upon detection by the electronic signature line reader 870 that a member is signing his signature (FIG. 7), electronic signature line circuitry 877 interrupts processing circuitry 903. Circuitry 903 responds to the interrupt by reading the buffered signature line information. Circuitry 903 then stores the signature line information in storage 302. Circuitry 903 also associates the signature line information with a donation and card account information. The signature line information is downloaded via communication circuitry 990, and a link.

Figure 8:
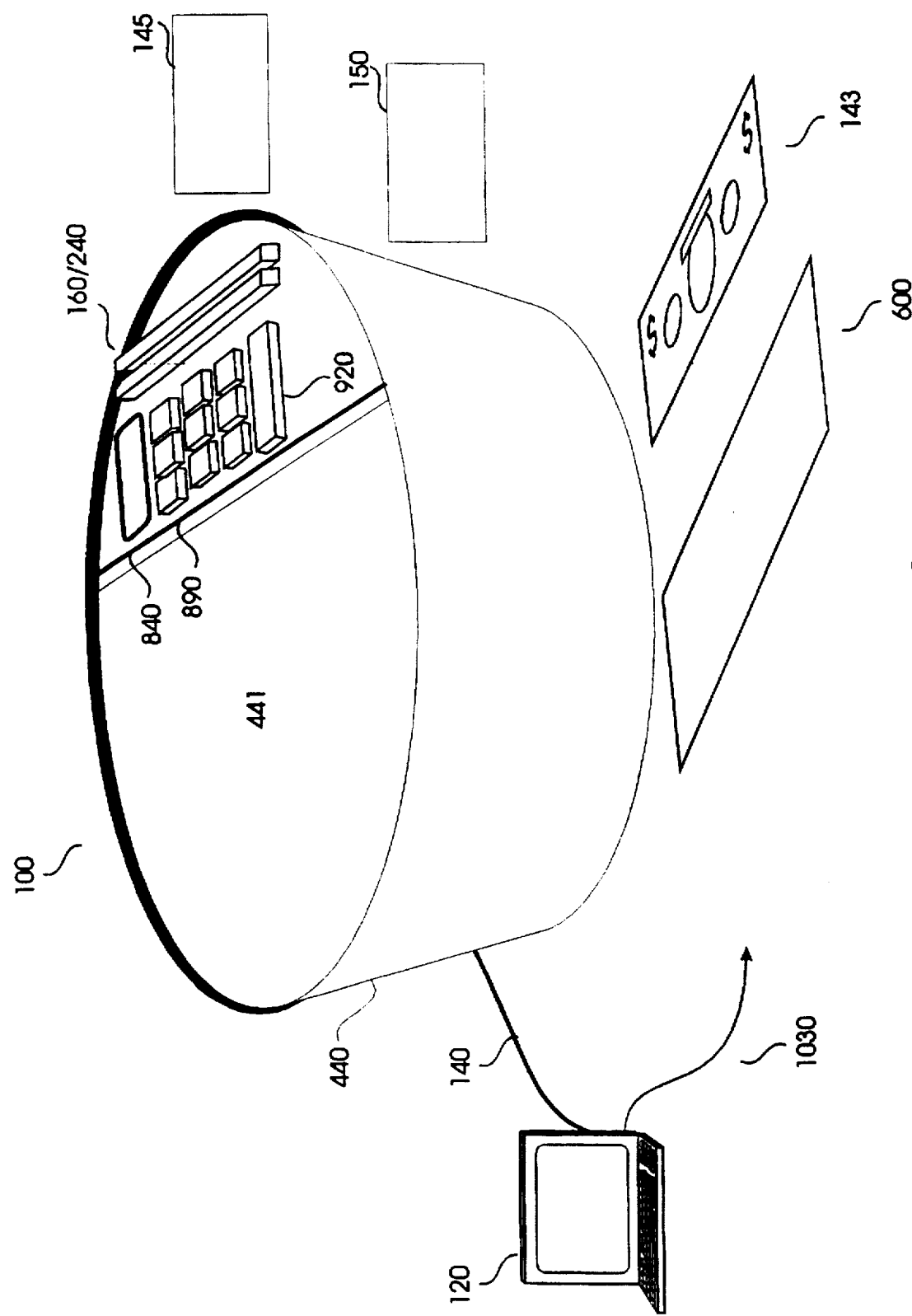
FIG. 8 is a perspective view of a cash donation, an envelope containing a cash or check donation, a clergy member's terminal, and an embodiment of an offering plate with a credit card donation processor, a debit card donation processor, a key pad for associating a cash, check, or envelope donation with an account of a member, and for associating either a credit card donation or a debit card donation with either an account of a member or a cash denomination, a surface for accepting cash, check, or envelope donations, or combinations thereof, a credit card, and a debit card.

FIG. 8 is a perspective view of an embodiment of an offering plate 100 with a card donation processor 160/240. In this embodiment, a container 440 is connected to a credit card donation processor 160 and a debit card donation processor 240. As described above, the present invention contemplates that offering plate 100 might only contain a credit card donation processor 160. Alternatively, the present invention also contemplates that offering plate 100 might only contain a debit card donation processor 240. In yet a further embodiment, the present invention contemplates that both a credit card donation processor 160 and a debit card donation processor 240 might be located on offering plate 100 at different physical locations.

A member drops a cash donation 143 or an envelope 600 containing a cash donation into container 440. Container 440 has an open area 441 on its top surface. Alternatively, open area 441 may be located on a side surface. Area 441 is of a size for receiving a cash donation 143 or envelope 600. The cash donation 143 or envelope 600 containing a cash donation might then be processed using manual post processed cash oblation. Alternatively, a member might make a donation using credit card 145 or a debit card 150 as previously described.

The present invention contemplates that container 440 may be constructed from any material suitable to collect cash donations or envelope donations. Preferably, container 440 is constructed from a woven material, or a metal. Container 440 is of a size and weight permitting an attender at a religious service to pass plate 100 to the attender sitting next to him in the same pew. In an alternate embodiment, container 440 might also be mounted to a pew as described below in FIG. 13. The present invention also contemplates using this embodiment in a religious funeral service.

Figure 8A:
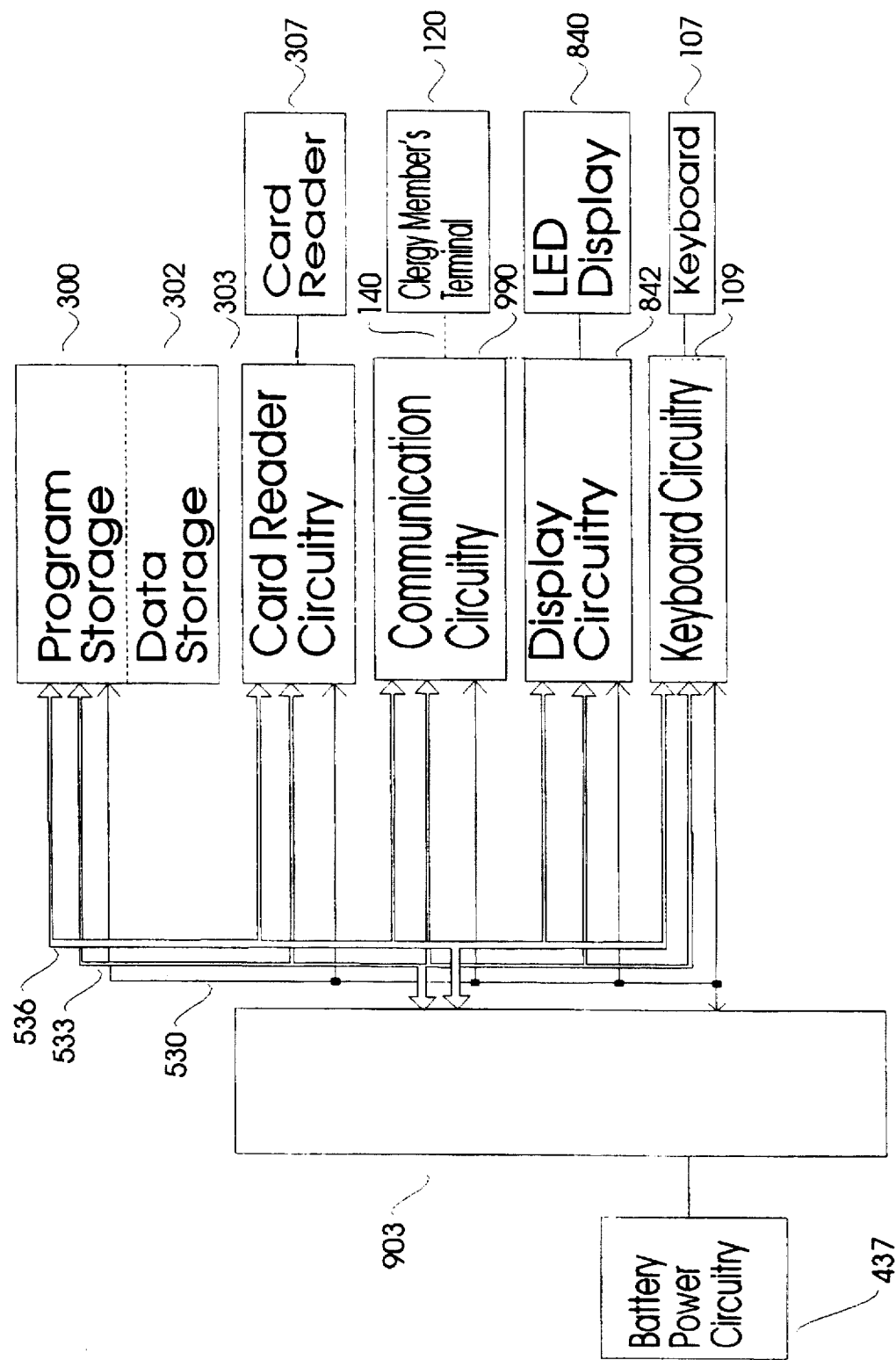
FIG. 8a is a schematic block diagram of an embodiment of an offering plate of the present invention with a card processor, a display, and a keyboard.

FIG. 8a is a schematic block diagram of an offering plate of the present invention, a card reader 307 and related circuitry 303 addition, and a key board 107 and related circuitry 109 addition. In this embodiment, offering plate 100 acts as a stand alone unit for accepting card 145, 150, cash 143, and envelope 600 donations (FIG. 8).

Figure 9:
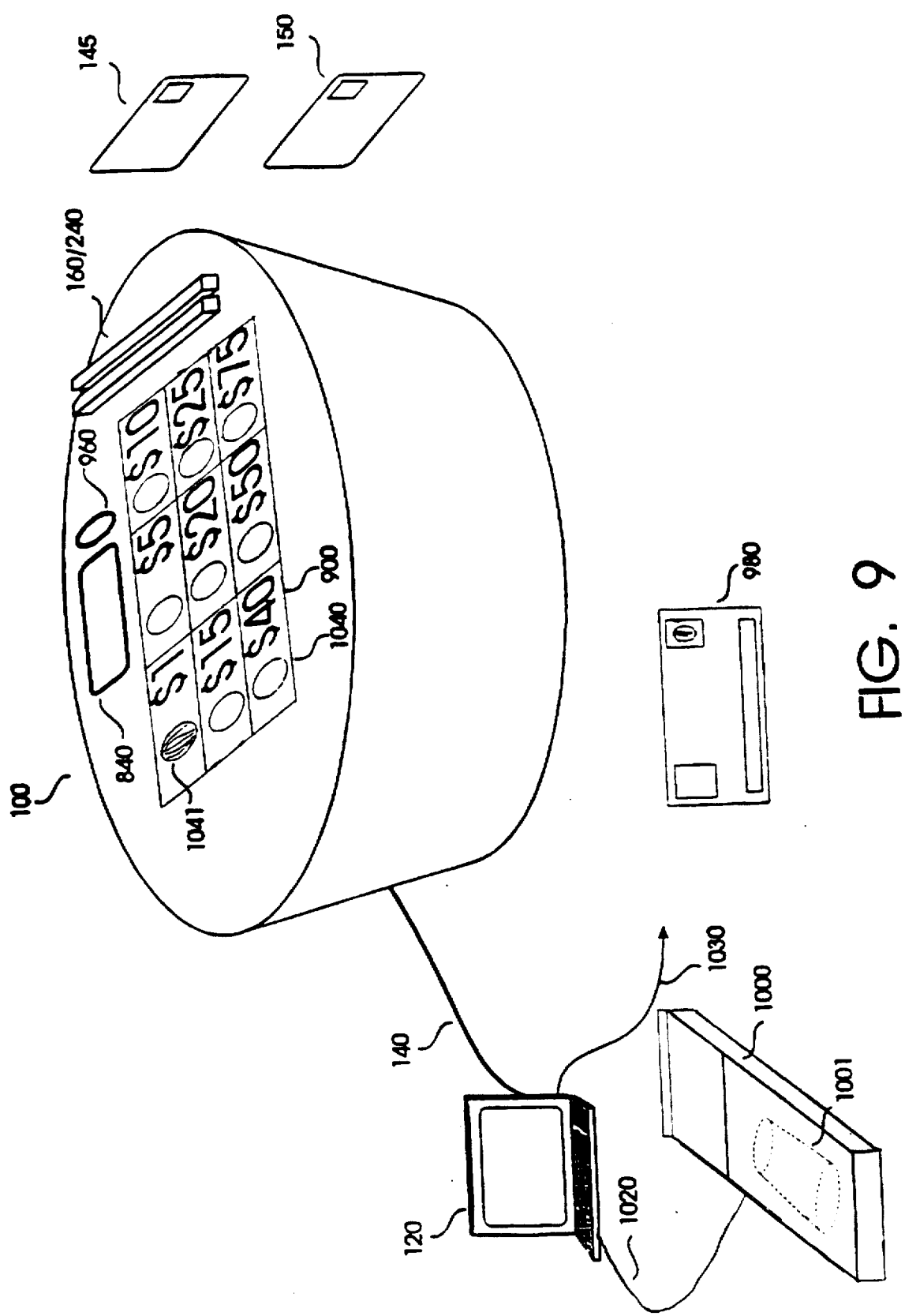
FIG. 9 is a perspective view illustrating an offering plate network containing a credit card, a debit card, a system fingerprint and cash, credit card, or debit card information entry card, an information entry card acceptor, a clergy member's terminal, and an offering plate containing a fingerprint scanner associated with a key representing a cash denomination.

FIG. 9 is a perspective view illustrating a system configuration containing a perspective view of offering plate 100 with a fingerprint scanner 1040, a card processor 160/240, a credit card 145, a debit card 150, a system fingerprint entry information card 980, a clergy member's terminal 120, and a fingerprint information entry card input 1000, which might include, by way of example, a finger print scanner and a scanner capable of scanning in alpha-numeric text.

In this embodiment, a member completes a system fingerprint entry information card 980. The system fingerprint entry information card 980 contains information such as a member's name, a member's credit card account information, an authorization to charge a donation to his credit card account or debit card account, the member's fingerprint, and the like. The system fingerprint entry information card 980 is entered via input 1000. Input 1000 communicates the information on the system fingerprint entry information card 980 via communication links 140, 1020 to finger print data storage 1001. Fingerprint data storage 1001 might be located in input 1000. Alternatively, fingerprint data storage 1001 might be located in clergy member's terminal 120. Fingerprint data storage 1001 stores the information contained on the system fingerprint entry information card 980.

Although preferred, a system fingerprint entry card 980 might not be required. Rather, the present invention contemplates that the information on a system fingerprint entry card 980 might be directly entered on input 1000 via a fingerprint scanner and a scanner for entering alpha-numeric text. Various types of commercially available apparatus can function as a fingerprint scanner. By way of example, such devices and methods are disclosed in U.S. Pat. No. 5,177,802, U.S. Pat. No. 5,189,482, U.S. Pat. No. 5,210,588, and U.S. Pat. No. 5,187,748. Of particular interest is the disclosure of U.S. Pat. No. 5,222,152 entitled Portable Fingerprint Scanning Apparatus, whose disclosure is incorporated herein as if fully set forth herein. Given the vast body of literature in the art of fingerprint identification systems, a general description will follow.

In general, the present invention contemplates a fingerprint data storage 1001 has stored therein one or more fingerprints, i.e. fingerprint patterns of members of a religious organization. The fingerprint data storage 1001 might be located in the clergy member's terminal 120, in input 1000, or at some other remote location. When a member makes a donation, a member's previously registered fingerprint pattern is read out from fingerprint data storage 1001 and is compared to the fingerprint pattern the member scans onto a fingerprint scanner 1040 located on offering plate 100. If the member fingerprint pattern is stored in memory at the clergy member's terminal 120 or other remote location, the processor 903 may communicate, via circuitry 990, with the clergy member's terminal to retrieve the desired member fingerprint information which is then stored temporarily in data storage 302. Alternatively, the scanned member fingerprint information may be stored in data storage 302 on the offering plate 100 and downloaded to the clergy member's terminal at a later time to be compared to the stored member fingerprint information in fingerprint data storage 1001.

A processing circuitry 903 (FIG. 9a), or a similar processor located on the clergy member's terminal, matches the member's fingerprint in fingerprint data storage 1001 with the fingerprint entered by the member 1041 on the fingerprint scanner 1040. Fingerprint 1041 is a symbolic representation of a fingerprint on a finger of a living member. When the fingerprint scanner 1040 is coupled to a key symbolizing a cash denomination 900 and pressed by a member, a donation is made by the member for the cash denomination, i.e. a one dollar, five dollar, or ten dollar donation.

Figure 9A:
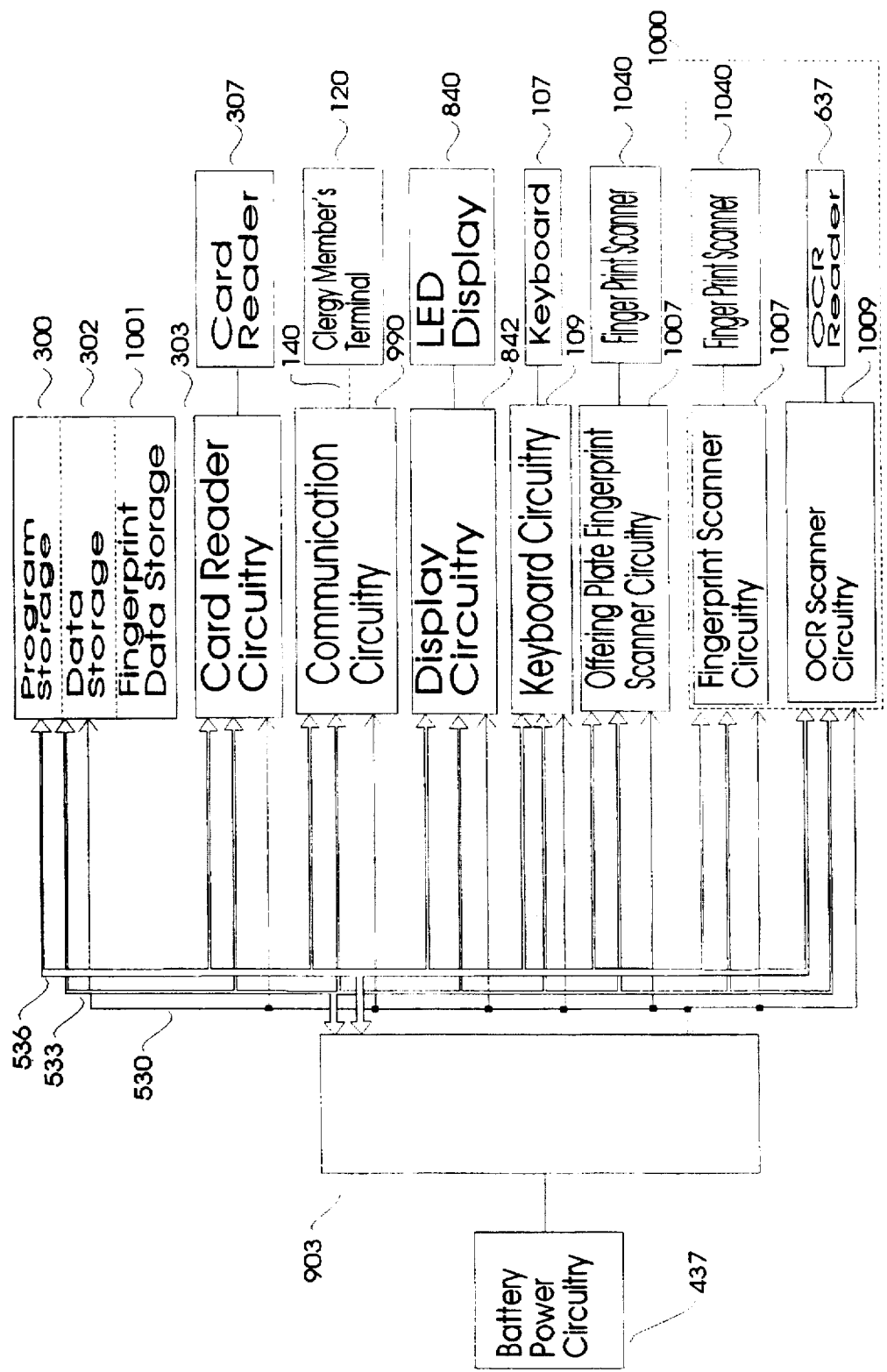
FIG. 9a is a schematic block diagram of an embodiment of an offering plate network of the present invention including a card processor, a display, and a keyboard, a fingerprint scanner, and a fingerprint information entry card input.

By way of further example, a member might make a card donation by swiping card 145/150 through card processor 160/240. The member touches fingerprint scanner 1040. Preferably, the fingerprint scanner 1040 is linked to a key associated with a cash denomination 900 (FIG. 9a). In this way, the member makes a donation equal to the size of the cash denomination and, if required, provides authorization for the credit card or debit card financial transaction.

The present invention also contemplates that in other embodiments swiping a credit card 145 or debit card 150 might not be required. As used herein, the term "swiping" refers to any method for communicating information on a card to a card reader 307. Rather, a member may simply touch the fingerprint scanner 1040 associated with a key associated with a cash denomination 900 to make a donation. By way of example, a member may wish to donate one dollar. The member touches the fingerprint scanner 1040 associated with the donation of one dollar. Authorization for the transaction has already been given by the member when he completed the system fingerprint entry information card 980. Consequently, the entry of the member's fingerprint 1041 results in the card donation of one dollar.

It will be appreciated that the system described above has application anywhere an authorization for a credit card or debit card transaction is required. Moreover, the system has the added advantage that lost or stolen credit cards can no longer be used since the fingerprint of the individual possessing the card will not match that of the owner. As such, authorization for a charge or debit cannot be obtained by the person illegally attempting to use the card.

After the fingerprint scanner 1040 has successfully scanned fingerprint 1041, scanner 1040 communicates with a successful entry indicator 960 and the successful entry indicator 960 is illuminated. The fingerprint scanner 1040 also communicates with LED display 840. LED display 840 reveals a thank you message or some other appropriate message. The present invention also contemplates that a member might lay his entire hand on the scanner while only a portion of the hand or fingers is sensed.

In one embodiment, the fingerprint scanner 1040 communicates information regarding a member's fingerprint 1041 via communication link 140 to the clergy member's terminal 120. A comparison of a scanned finger print 1041 via the fingerprint scanner 1040 with a member's fingerprint image stored in fingerprint data storage 1001 takes place either in clergy member's terminal 120, in one embodiment. The software controls processing circuitry 903, compares finger print 1041 with fingerprints in fingerprint data storage 1001, and searches for a match.

Software need not locate a complete match between a member's fingerprint impression stored in fingerprint data storage 1001 and the fingerprint 1041 scanned by fingerprint scanner 1040, but only a partial match that allows fingerprint 1041 to be differentiated from other fingerprints stored fingerprint data storage 1001.

As described above the fingerprint entering process allows for the member's card account to be properly debited and/or charged and the religious organization account to be properly credited.

FIG. 9a is a schematic block diagram of an embodiment of an offering plate network of the present invention including a card reader 307 and associated circuitry 303, a display 840 and associated circuitry 842, and a keyboard 107 and associated circuitry 109, a fingerprint scanner 1040 and associated circuitry 1007, and a fingerprint information entry card input 100 including a fingerprint scanner 1040 and associated circuitry 1007 and an OCR reader 637 and associated circuitry 1009. Some of the above additions have been previously described above and are described below. The new additions in this embodiment include a fingerprint scanner 1040 and associated circuitry 1007, and a fingerprint information entry card input 1000 including a fingerprint scanner 1040 and associated circuitry 1007 and an OCR reader 637 and associated circuitry 1009.

In the present embodiment, processing circuitry 903 includes a microprocessor. However, a dedicated microprocessor may also be used in conjunction with fingerprint scanner 1040 and associated circuitry 1007. Processing circuitry 903 and the associated circuitry additions are powered through power source 437 in this embodiment. Power source 437 is a battery power source. In another embodiment, where an alternate power source is required due to the power demands of the circuitry, power source 437 might be a hardwired power source, and the like.

Processing circuitry 903 interfaces with fingerprint scanner 1040 and associated circuitry 1007 via an address bus 536, data bus 533, and control bus 530. Specifically, upon detection by the fingerprint scanner 1040 that a fingerprint (FIG. 9) is being entered, fingerprint scanner circuitry 1007 interrupts processing circuitry 903. Circuitry 903 responds to the interrupt by reading the buffered fingerprint information. Circuitry 903 then stores the fingerprint information in storage 302. Upon detection by keyboard 107 that a key associated with a cash denomination (FIG. 9) is being entered, keyboard circuitry 107 interrupts processing circuitry 903. Circuitry 903 responds to the interrupt by reading the buffered keyboard information and associating the keyboard information with the fingerprint information.

Figure 10:
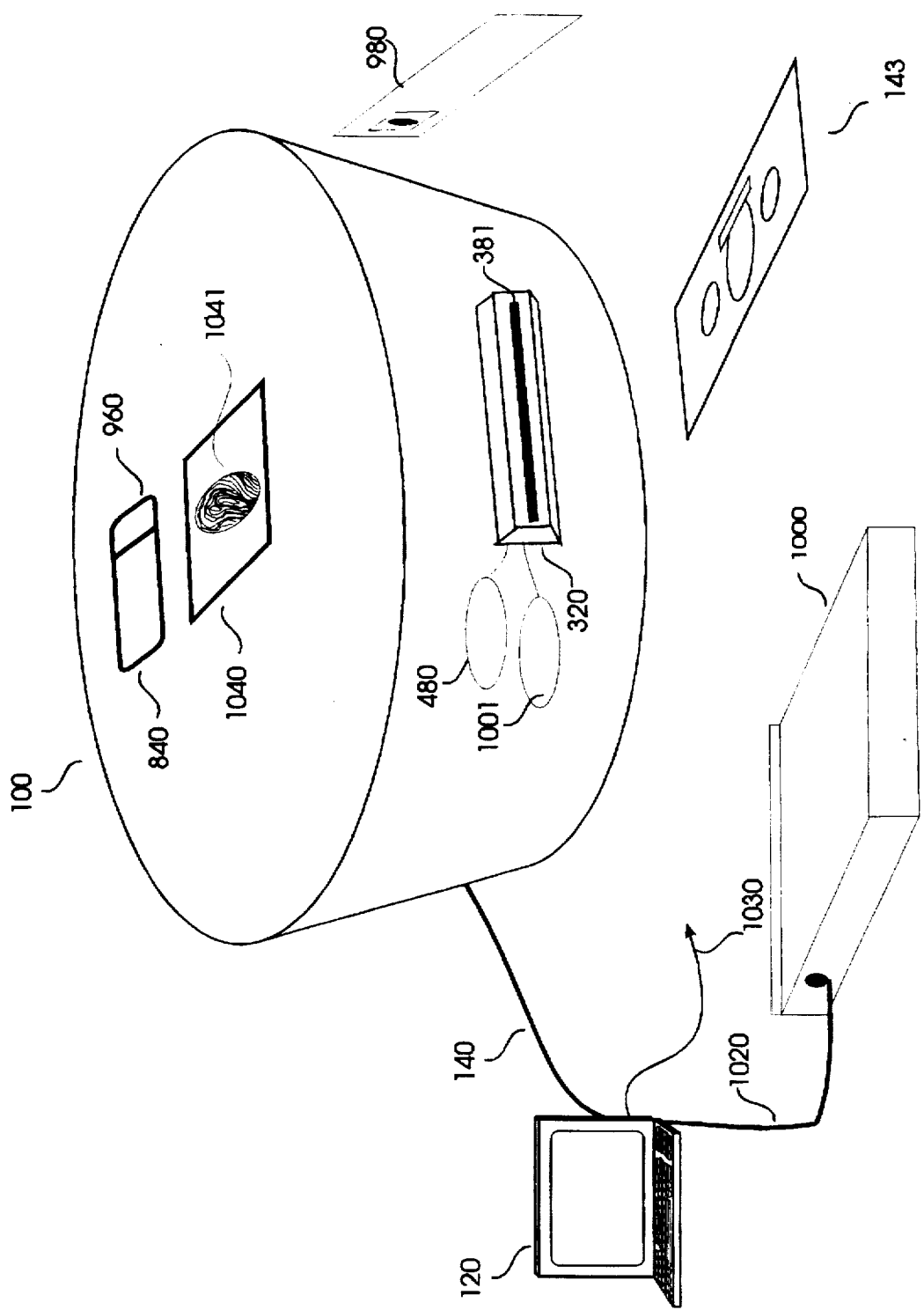
FIG. 10 is a perspective view illustrating an offering plate network containing a cash donation acceptor, a cash donation, a system fingerprint and cash, credit card, or debit card information entry card, an information entry card input, a clergy member's terminal, and an offering plate containing a fingerprint scanner.

FIG. 10 is a perspective view of a system configuration of an offering plate network with offering plate 100 containing a cash donation acceptor 320. In an alternate embodiment, offering plate 100 might also contain an envelope donation acceptor.

In this embodiment, a member completes a system fingerprint entry information card 980. The system fingerprint entry information card 980 contains information such as a member's name, a member's account information, the member's fingerprint, and the like.

A member makes a cash donation 143 by inserting a cash donation 143 into slot 381 in the cash donation acceptor 320. The member touches fingerprint scanner 1040. After the fingerprint scanner 1040 has successfully scanned fingerprint 1041 it communicates with a successful entry indicator 960 and the successful entry indicator 960 is illuminated. The fingerprint scanner 1040 also communicates with LED display 840. LED display 840 reveals a thank you message including the member's name or some other appropriate message. The fingerprint scanner 1040 also communicates the fingerprint image to a fingerprint data storage 1001 as described in FIGS. 9 and 9a above.

The fingerprint scanner 1040 communicates member information to processing circuitry 903. The cash donation acceptor 320 communicates donation information to processing circuitry 903. Processing circuitry 903 associates the member and donation information and stores it in data storage 302. Similarly, an envelope donation acceptor 380 might communicate information regarding the size of the cash donation 143 within the envelope 600 containing a cash donation to processing circuitry 903.

Figure 10A:
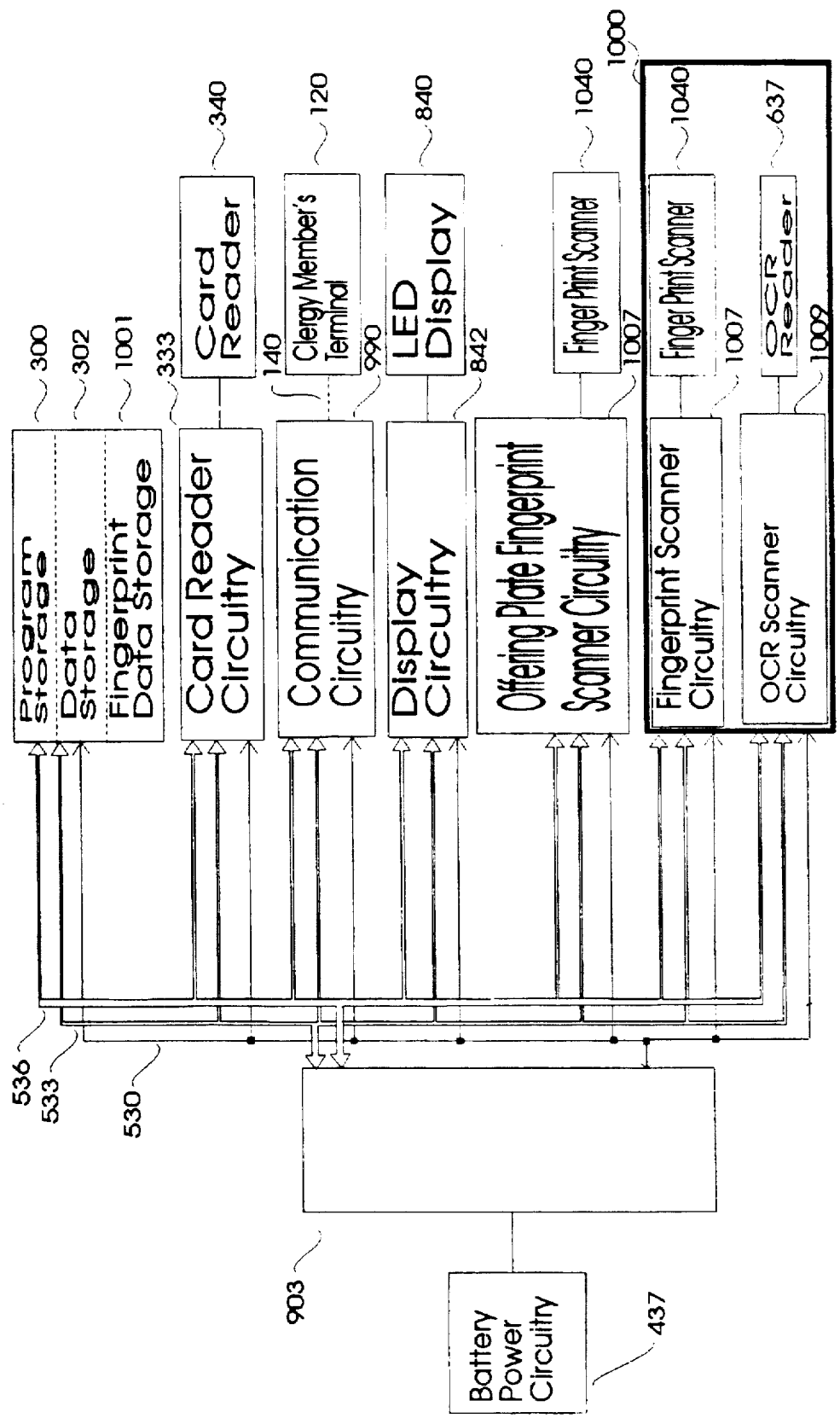
FIG. 10a is a schematic block diagram of an embodiment of an offering plate network of the present invention with an offering plate including a cash donation acceptor, a display, and a keyboard, a fingerprint scanner, and a fingerprint information entry card input.

FIG. 10a is a schematic block diagram of an embodiment of an offering plate network of the present invention with an offering plate including additions previously described. In this embodiment fingerprint data storage is located in offering plate 100. In an alternate embodiment, fingerprint data storage is located at a remote location.

Input 1000 is also located at a remote location in this embodiment. Processing circuitry 903 interfaces with OCR scanner reader 637 and associated circuitry 1009 and fingerprint scanner 1040 and associated circuitry 1007 via a port that includes a connection to address bus 536, data bus 533, and control bus 530. Specifically, upon detection by the fingerprint scanner 1040 that a fingerprint (FIG. 9) is being entered from card 980, fingerprint scanner circuitry 1007 interrupts processing circuitry 903. Circuitry 903 responds to the interrupt by reading the buffered fingerprint information. Circuitry 903 then stores the fingerprint information in storage 1001. Upon detection by OCR reader 637 that textual information (FIG. 10) is being entered, circuitry 1009 interrupts processing circuitry 903. Circuitry 903 responds to the interrupt by reading the buffered textual information and associating the textual information with the fingerprint information. The associated fingerprint and text information, including by way of example account information, is stored in storage 1001. Software routines then retrieve the associated information for comparison and matching as previously described.

Figure 11:
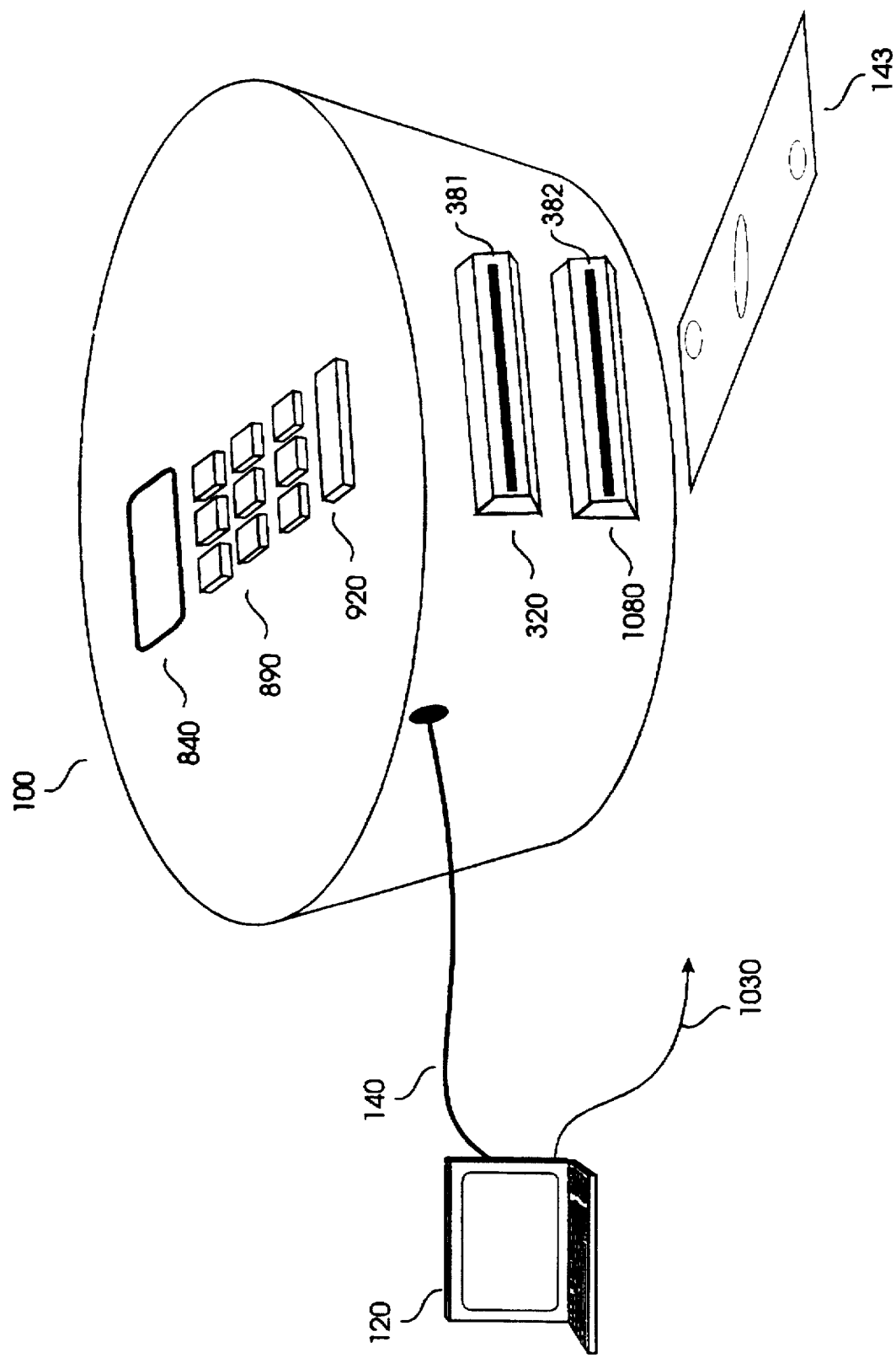
FIG. 11 is a perspective view of a cash donation, and an embodiment of an offering plate with a cash donation acceptor, a key pad for either associating a cash donation with a member's account or requesting change, and a bill dispenser.

FIG. 11 is a perspective view of an embodiment of offering plate 100 with a cash donation acceptor 320, and a key pad 890 that associates a cash donation with a member's account and allows a member to request change for cash donation 143. A member of a religious organization feeds in a cash donation 143 into slot 381 which forms part of the cash donation acceptor 320. The cash donation acceptor 320 takes in the cash donation 143. The cash donation acceptor 320 reads the denomination of the cash donation 143. The member can use key pad 890 in order to credit his account as described above for the full amount of cash donation 143. Alternatively, a member might use key pad 890 to request change for cash donation 143.

Figure 11A:
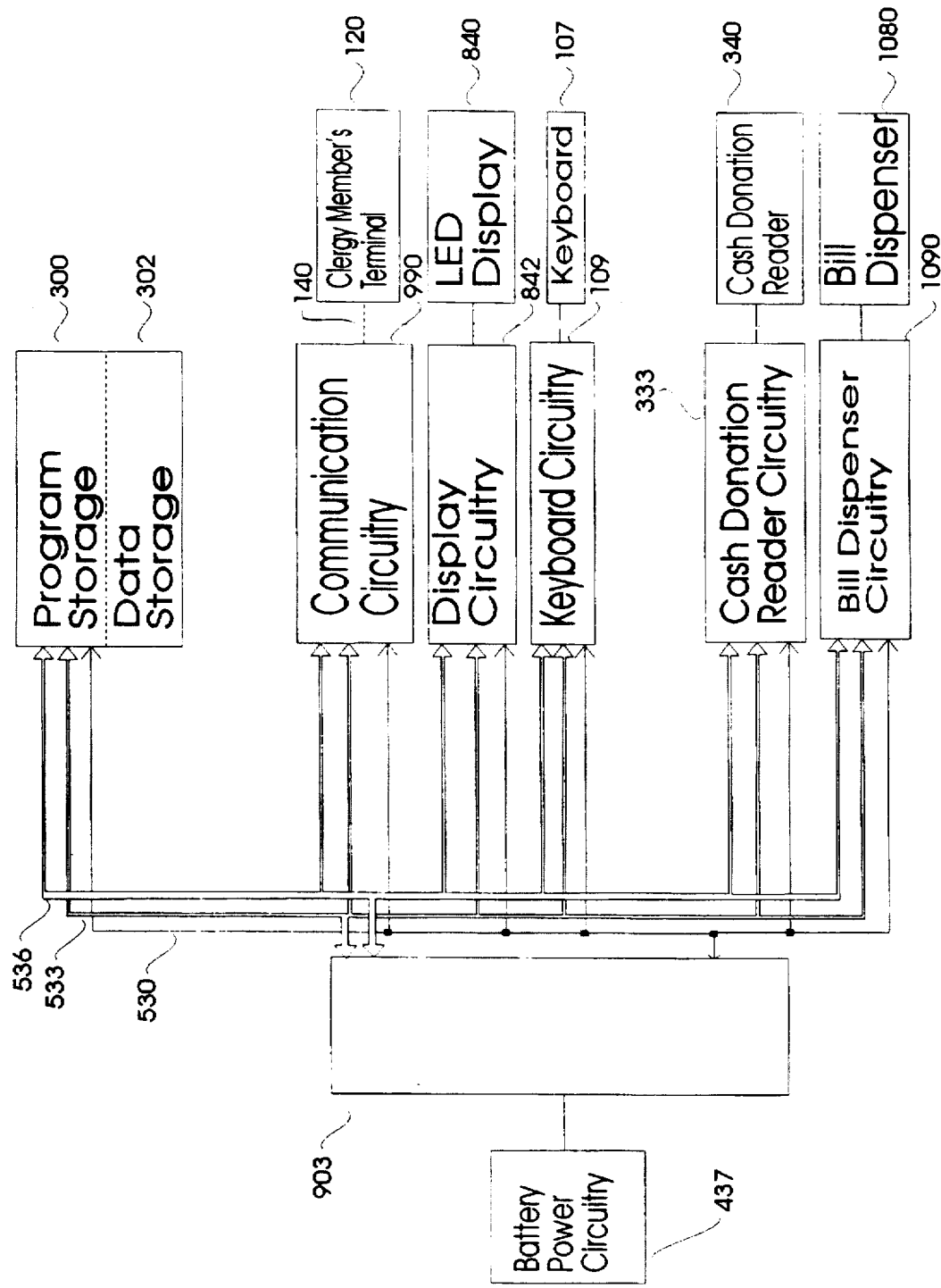
FIG. 11a is a schematic block diagram of one embodiment of an offering plate with a cash donation acceptor, a keyboard, a display, and a bill dispenser.

By way of example, the member inserts a cash donation 143 of one hundred dollars. The cash donation acceptor 320 verifies the authenticity of the one hundred dollar bill and communicates this information to a processing circuitry 903 (FIG. 11a). Software routines control processing circuitry 903. Processing circuitry 903 communicates information and a query to LED display 840. LED display 840 reveals text that asks the member if he wishes change. The member presses the entry key 920 or a key on keypad 890 representing a "yes" message. The member then uses key pad 890 to input the amount of change he requests, i.e. fifty dollars. Key pad 890 communicates the member's input to processing circuitry 903 via a software routine. Processing circuitry 903 receives information from the cash donation acceptor 320 regarding the size of the cash donation 143 made by the member. In response to information sent from the processing circuitry 903, bill dispenser 1080 then returns a fifty dollar bill to the member.

FIG. 11a is a schematic block diagram of one embodiment of an offering plate with a cash donation reader 340 and associated circuitry 333, a keyboard 107 and associated circuitry 109, a display 840 and associated circuitry 842, and a bill dispenser 1080 and associated circuitry.

Processing circuitry 903 and the associated circuitry additions are powered through power source 437 in this embodiment. Power source 437 is a battery power source. In another embodiment, where there an alternate power source is required due to the power demands of the circuitry, power source 437 might be a hardwired power source.

Processing circuitry 903 interfaces with cash donation reader 340 and associated circuitry 333 via an address bus 536, data bus 533, and control bus 530. Specifically, upon detection by the cash donation reader 340 that a cash donation (FIG. 11) is being given, cash donation reader circuitry 333 interrupts processing circuitry 903. Circuitry 903 responds to the interrupt by reading the buffered cash denomination information and verifying the bills authenticity. Circuitry 903 then stores the cash denomination information in storage 302. Processing circuitry 903 communicates with display 840 and related circuitry to display a request for whether the member would like to donate the entire cash donation or receive change. Upon detection by keyboard 107 that a key (FIG. 11) was entered requesting change, keyboard circuitry 107 interrupts processing circuitry 903. Circuitry 903 responds to the interrupt by reading the buffered keyboard information. If change was requested, circuitry 903 communicates with bill dispenser 1080 and associated circuitry 1090 to deliver a bill.

Figure 12:
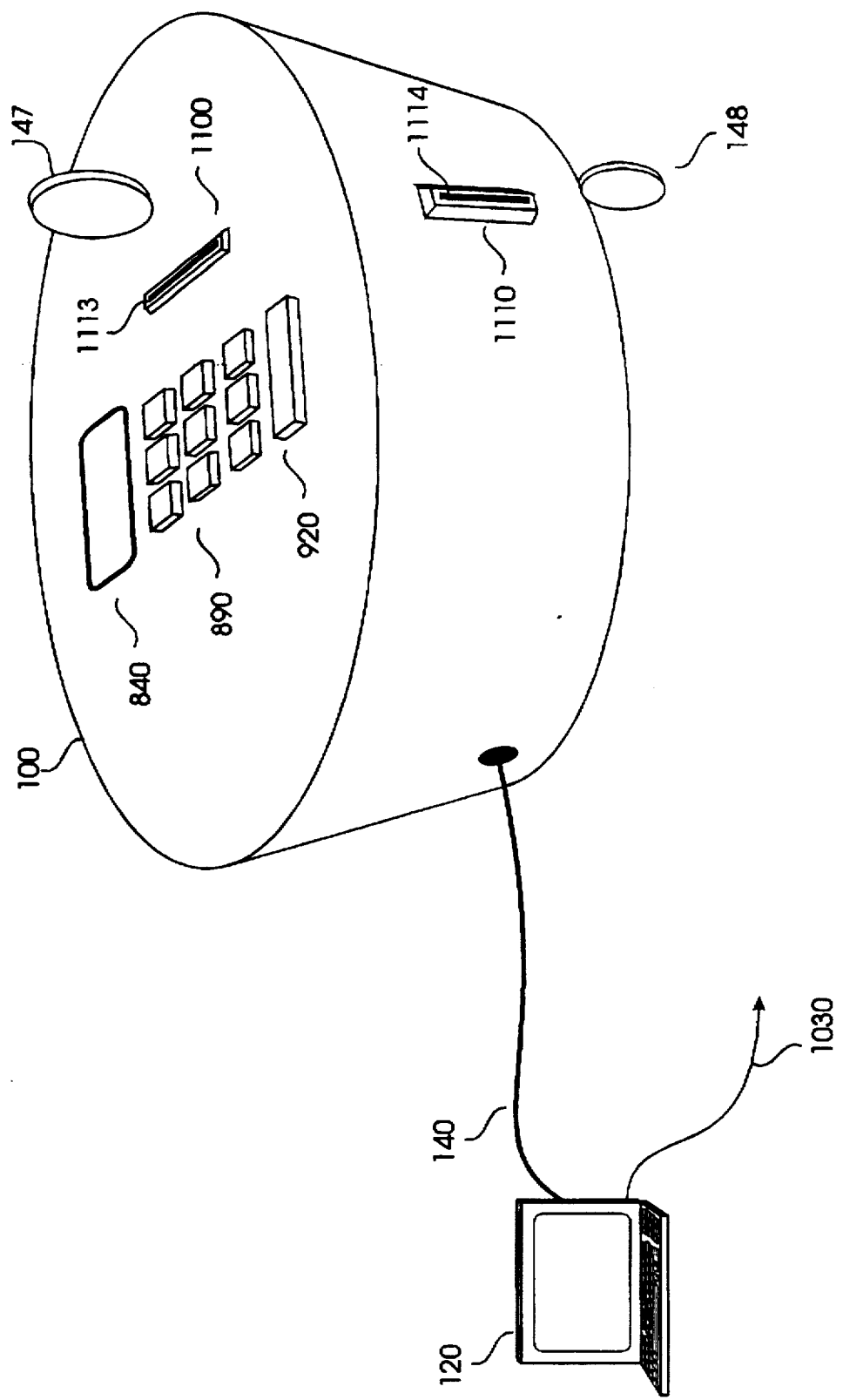
FIG. 12 is a perspective view of a donation in the form of a coin, change in the form of a coin, and an embodiment of an offering plate with a coin donation acceptor, a coin dispenser, and a key pad for associating the donation with an account of member of a religious organization.

FIG. 12 is a perspective view of an embodiment of offering plate 100 with a coin donation acceptor 1100. Coin donation acceptor 1100 is a device that determines the value of a coin donation, e.g. whether a one dollar or twenty five cent coin was donated. Numerous devices that determine the amount of a coin donation are commercially available. A member inserts a coin donation 147 into slot 1113 which forms a part of the coin donation acceptor 1100. As described above the member can then use key pad 890 to associate his coin donation 147 with his account and/or request change in the form of a coin 148. The coin donation acceptor 1100 takes in the coin donation 147 through slot 1113. The coin donation reader 1102 (FIG. 12a) reads the size of coin donation 147 and verifies the coins authenticity. The member can use key pad 890 in order to credit his account as described above with respect to FIG. 11. Alternatively, a member might use key pad 890 to request change for coin donation 147.

By way of example, the member inserts a coin donation 147 of one dollar. LED display 840 reveals text that asks the member if he wishes change. The member presses the entry key 920. The member then uses key pad 890 to input the amount of change he requests, i.e. fifty cents. As similarly described in FIG. 11, processing circuitry 903 communicates with coin donation acceptor 1100 regarding the size of coin donation 147 and with key pad 890 regarding the size of the change requested. In response to information sent from the processing circuitry 903, a coin dispenser 1110 then returns change in the form of a coin 148, i.e. a fifty cent piece to the member. The present invention contemplates that advantages of offering plate 100 with a coin donation collection/change feature will be readily apparent in countries that utilize coin denominations that are commonly donated at religious services.

Figure 12A:
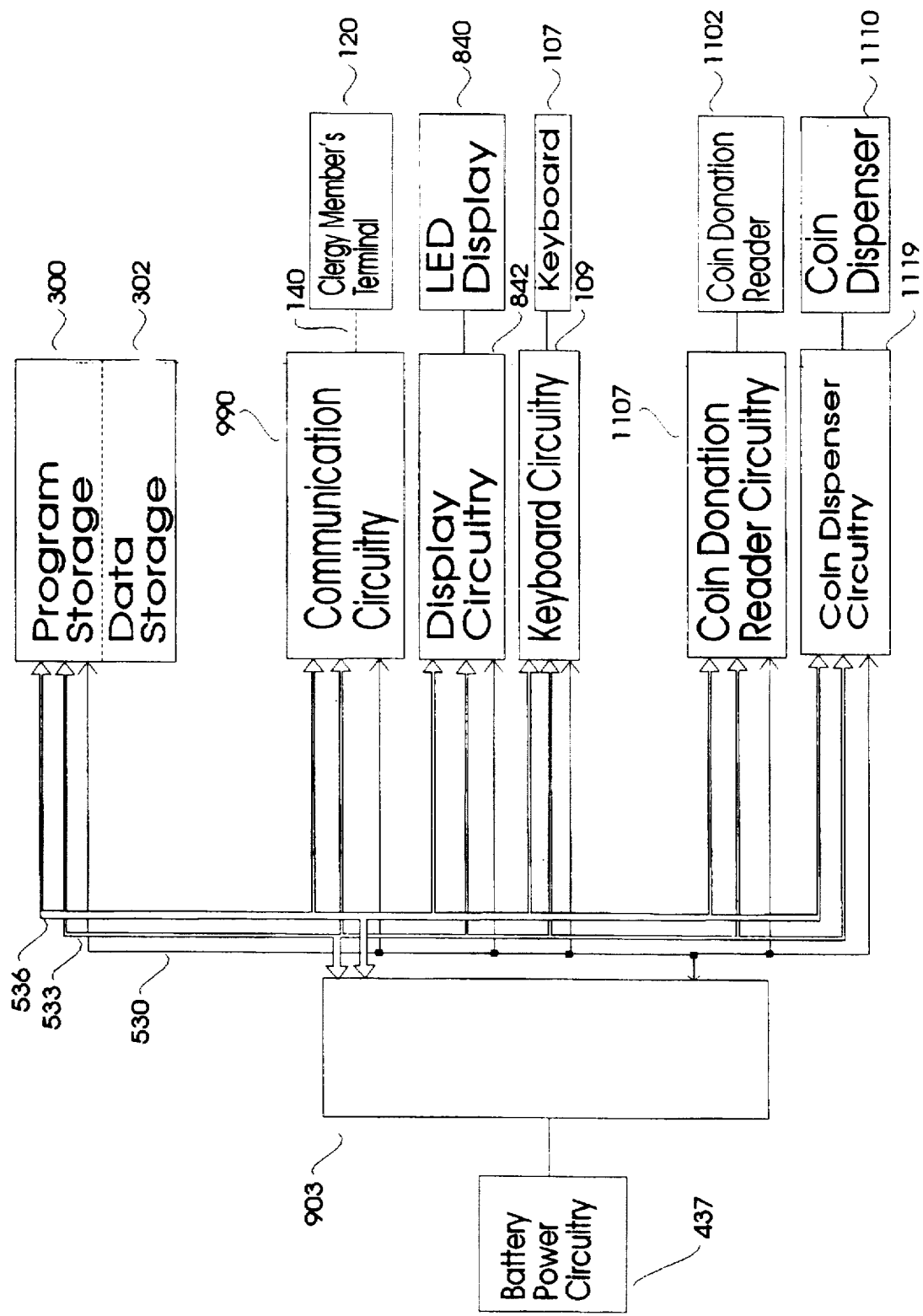
FIG. 12a is a schematic block diagram of one embodiment of an offering plate with a coin donation acceptor, a keyboard, a display, and a coin dispenser.

FIG. 12a is a schematic block diagram of one embodiment of an offering plate with a coin donation reader 1102 and associated circuitry 1107, a keyboard 107 and associated circuitry 109, a display 840 and associated circuitry 842, and a coin dispenser 1110 and associated circuitry 1119.

Processing circuitry 903 and the associated circuitry additions are powered through power source 437 in this embodiment. Power source 437 is a battery power source. In another embodiment, where an alternate power source is required due to the power demands of the circuitry, power source 437 might be a hardwired power source.

Processing circuitry 903 interfaces with coin donation reader 1102 and associated circuitry 1107 via an address bus 536, data bus 533, and control bus 530. Specifically, upon detection by the coin donation reader 1102 that a cash donation (FIG. 12) is being given, coin donation reader circuitry 1107 interrupts processing circuitry 903. Circuitry 903 responds to the interrupt by reading the buffered coin size information and verifying the coins authenticity. Circuitry 903 then stores coin denomination information in storage 302. Processing circuitry 903 communicates with display 840 and related circuitry to display a request for whether the member would like to donate the entire coin donation or receive change. Upon detection by keyboard 107 that a key (FIG. 12) was entered requesting change, keyboard circuitry 107 interrupts processing circuitry 903. Circuitry 903 responds to the interrupt by reading the buffered keyboard information. If change was requested, circuitry 903 communicates with coin dispenser 1110 and associated circuitry 1119 to deliver a coin.

Figure 13:
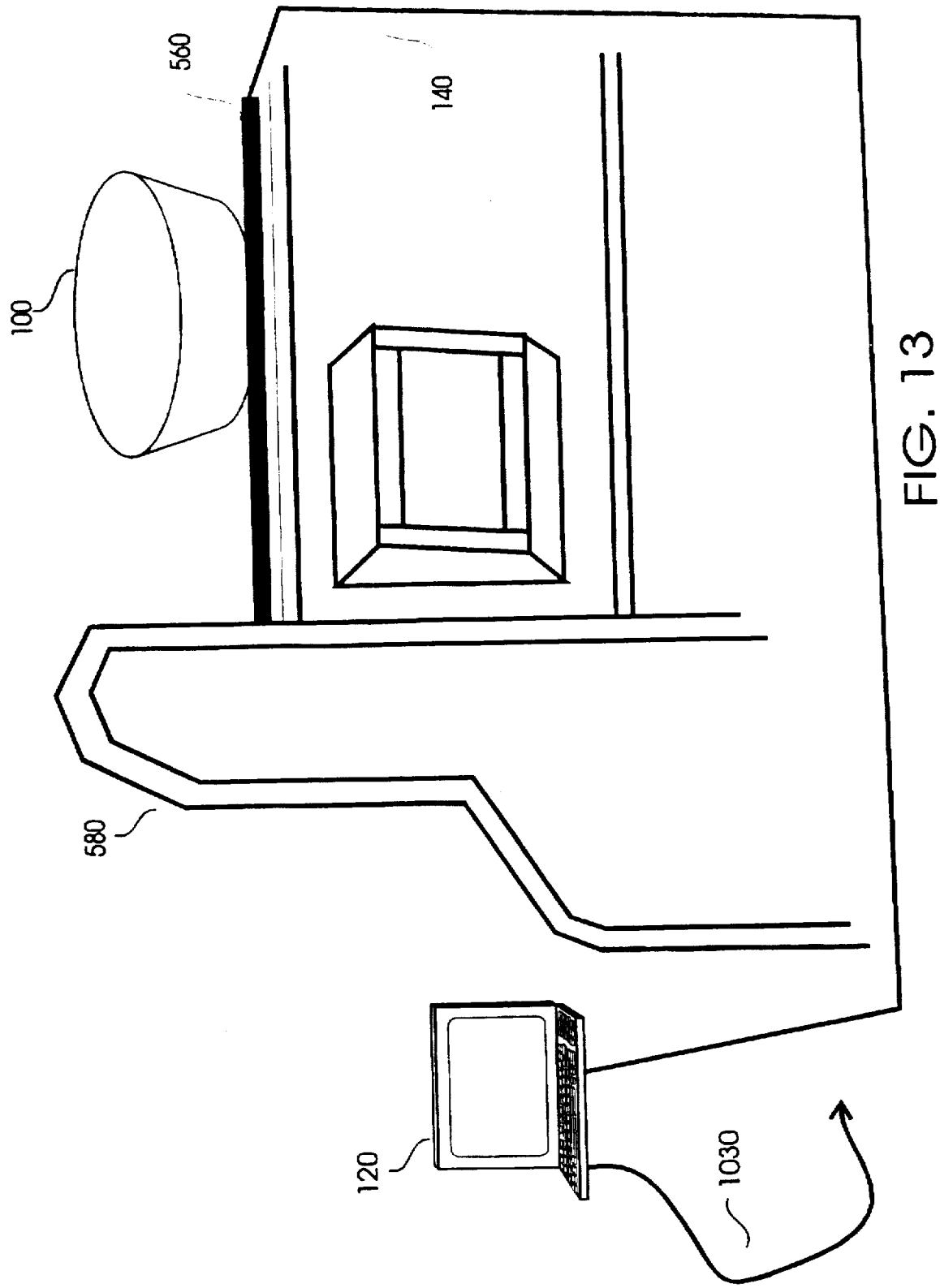
FIG. 13 is a perspective view of an embodiment of an offering plate of the present invention connected to a track that is connected to a pew, and a clergy member's terminal with an RF link to the offering plate.

FIG. 13 is a perspective view of an embodiment of an offering plate 100 connected to a track 560 that is connected to a pew 580. In this embodiment, offering plate 100 moves along track 560 from one end of pew 580 to the other end.

The present invention also contemplates that communication link 140 links offering plate 100 with the clergy member's terminal 120 via a communication link located within track 560.

Figure 14:
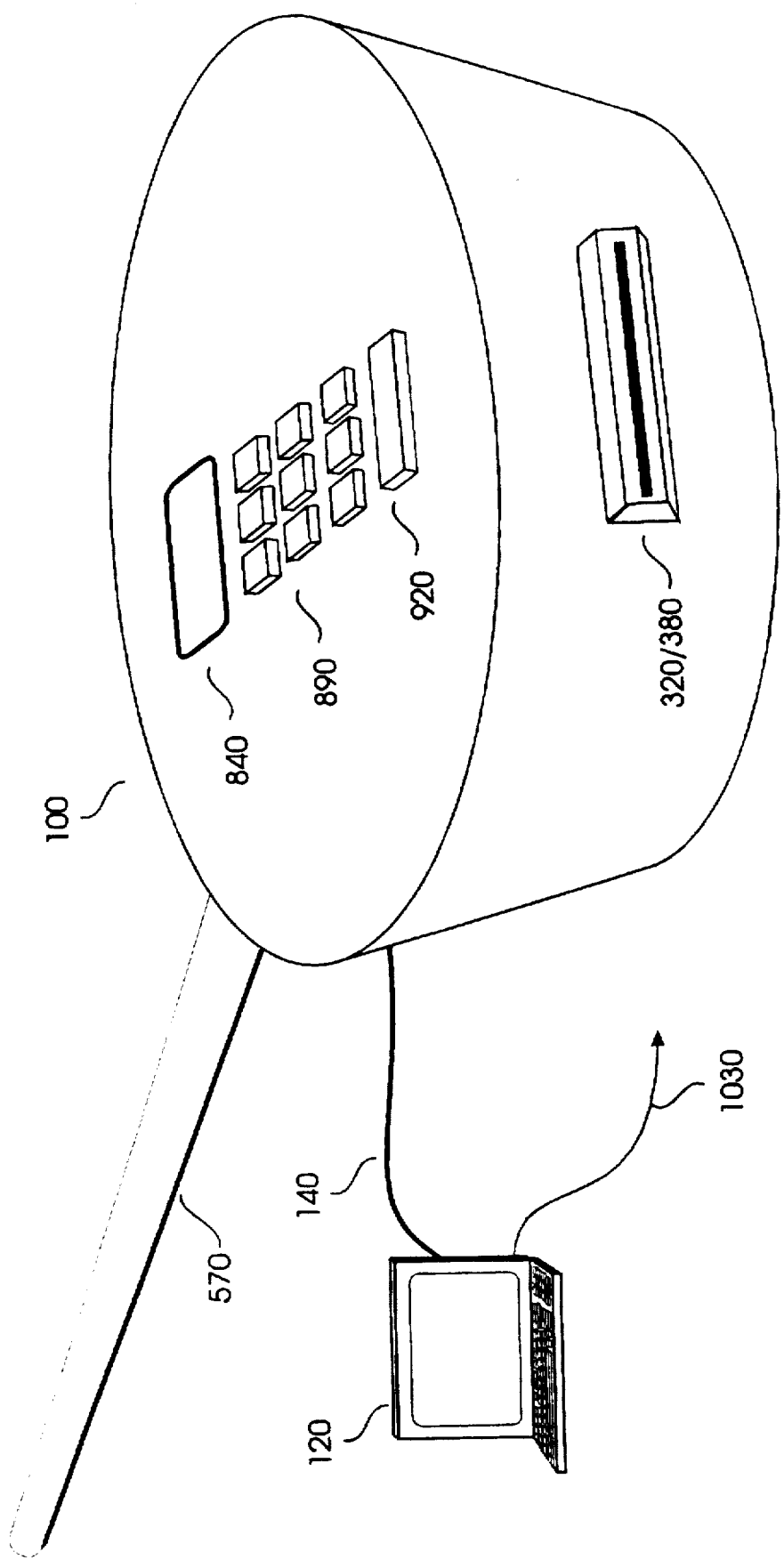
FIG. 14 is a perspective view of an exemplary embodiment of clergy member's terminal, and an offering plate of the present invention connected to a handle.

FIG. 14 is a perspective view of offering plate 100 connected to a handle 570. The present invention contemplates that offering plate 100 may be passed by ushers through each pew 580 rather than being mounted to a pew as shown in one embodiment or passed from attender to attender as in another embodiment. Communication link 140 may be an RF link or an infra-red link that communicates member account and donation information to clergy member's terminal 120 which then activates further processing via communication link 1030 as described above.

Figure 15:
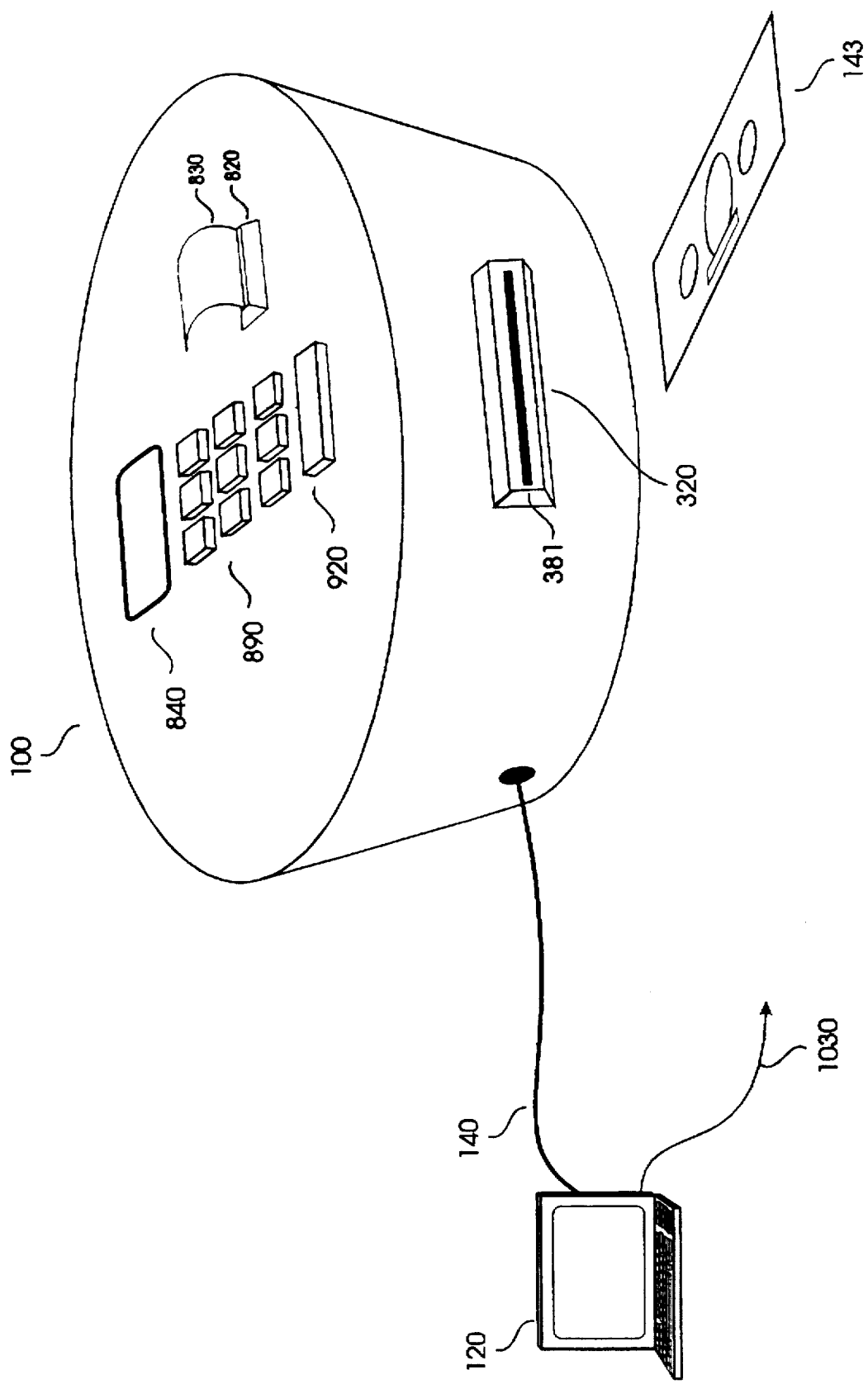
FIG. 15 is a perspective view of a cash donation, a receipt, a clergy member's terminal, and an embodiment of an offering plate with a receipt generator, a cash donation acceptor, a key pad, and a display.

FIG. 15 is a perspective view of a cash donation 143, a receipt 830, a clergy member's terminal 120, and an embodiment of an offering plate 100 with a receipt generator 820, a cash donation acceptor 320, a key pad 890, and a display 840. This embodiment has the features enumerated above in FIG. 1 and FIG. 3, with the addition of a receipt generator 820 at offering plate 100.

A member may wish to obtain receipt 830 directly after he has made a donation. After entering his donation, by way of example, a cash donation 143, display 840 displays a message asking the member is he wishes a receipt for his donation. The member presses a key representing yes on keypad 890. Receipt generator 820 prints receipt 830 for the member. The receipt contains the member's name, the amount of the donation, the date of the donation, and/or the collection for which the donation was given.

Figure 15A:
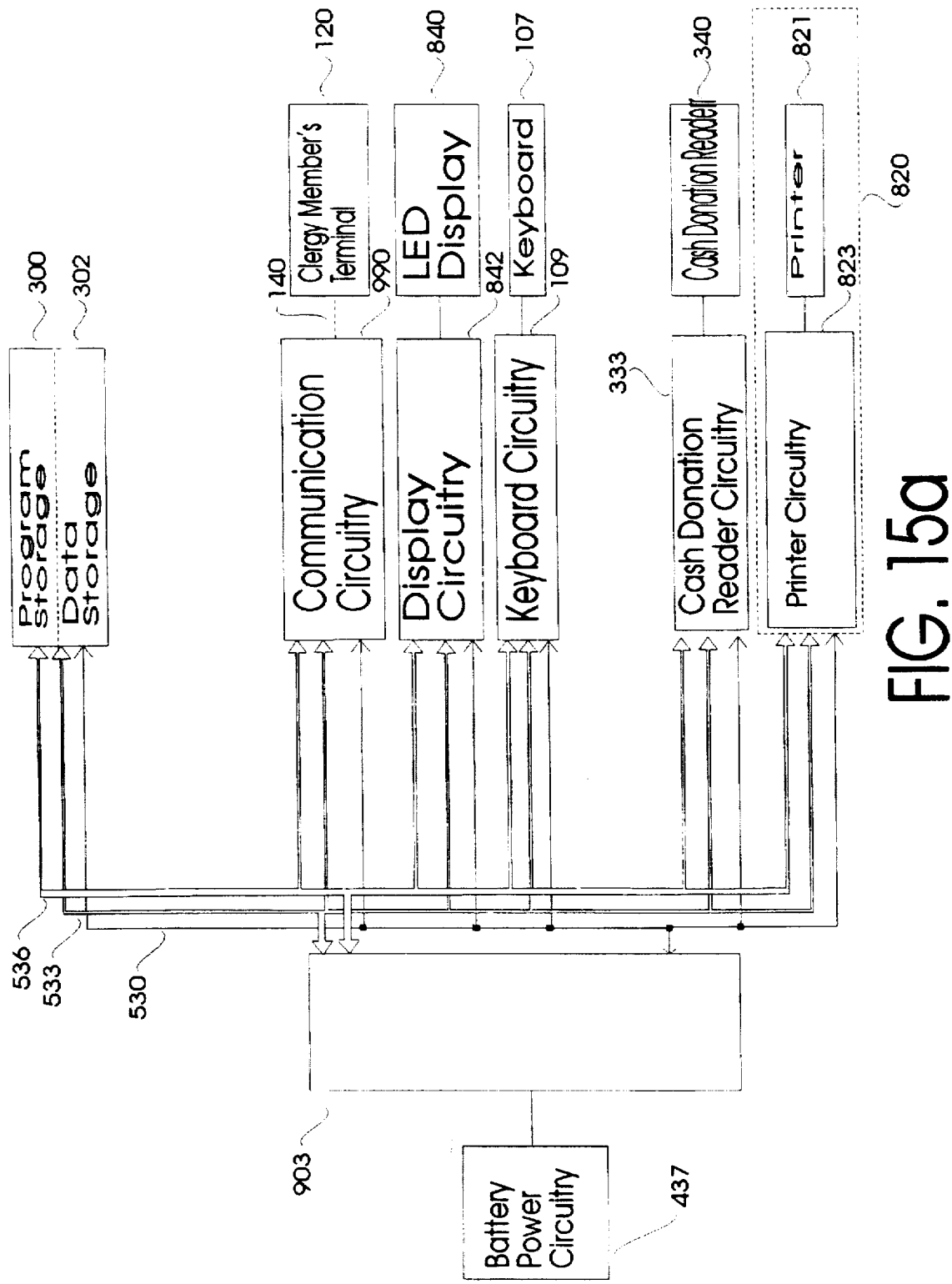
FIG. 15a is a schematic block diagram of an embodiment of an offering plate with a receipt generator, a cash donation acceptor, a display, and a keyboard, and a clergy member's terminal.

FIG. 15a is a schematic block diagram of an embodiment of an offering plate 100 with a receipt generator 820, a cash donation acceptor 320, a display 840, and a keyboard 107 and associated circuitry 109. This embodiment has the features described above for the various additions with the added addition of a receipt generator 820.

In this embodiment receipt generator 820 consists of a printer 821 and printer circuitry 823. By way of example, printer 821 may include a thermal printer. Where the power requirements of the printer require, battery power source 437 may be a hardwired power source as described above.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

I claim:

1. A method of simplifying, inducing and making relatively effortless for attendees to make successive monetary contributions during a contribution session or drive comprising:

providing the attendees with a portable, handheld, self-powered electronic contributions management terminal for making a plurality of monetary contributions thereon sequentially free of input of additional information and immediately recording data and information of each sequential monetary contribution each said electronic contributions management terminal having a routine for accepting a plurality of successive contributions free of any information unrelated to said contributions or said contributors;

each successive contributor making a monetary contribution designating a respective monetary amount in said terminal by manipulation of data entry operators the terminal and presenting to a card reader on said terminal a credit card or debit card having identification information identifying the respective contributor for reading by said card reader;

immediately recording in the contributions management terminal the designated monetary amount entry of the individual monetary contributions correlated to identification information on the card of the respective contributor; and, immediately storing for eventual off-loading the recorded monetary amount data and contributor information, and said electronic contributions management terminal providing for batch off-loading of said data and information whereby recordation of each of the contribution is uninterrupted by verification of validation and/or authorization.

2. The method of claim 1 in which the making of the monetary contributions is uninterrupted by requests for validation of authorization by signature.

3. The method in accordance with claim 1 in which said method is free of product or service information input recordation and processing.

4. The method in accordance with claim 1 in which said method is free of information inputs representative of products and purchase thereof.

5. The method in accordance with claim 1 in which said method is free of place of entry customer receipt processing.

6. The method in accordance with claim 1 in which said method is free of place of entry transaction approval processing.

7. The method in accordance with claim 1 in which said contributions management terminal is freely passed from one attendee to another attendee.

8. The method in accordance with claim 1 in which said contributions management terminal is passed from one attendee to another attendee without need of handing or positioning the terminal in any specific position during recordation of said contributions.

9. The method in accordance with claim 1 in which the steps of designating a respective monetary amount in said terminal by manipulation of data entry operators and recording in the terminal the designated monetary amount entry of the individual monetary contributions are effected free of a specific angular orientation of said contributions management terminal with respect to a respective attendee.

10. The method in accordance with claim 1 in which said step of providing further comprises freely passing a plurality of contributions management terminals among said attendees.

11. The method in accordance with claim 1 in which said method is free of signature input processing and recordation.

12. The method in accordance with claim 1 in which said routine is selected from the group consisting essentially of a software routine and a firmware routine.

13. A contributions management network to obtain monetary contributions from a plurality of contributors, comprising a portable, contributor data input dependant, non-contributor external data source independent, self-powered, hand-held contribution acceptance device sized and weighted for manual passing thereof between successive contributors and for receiving of contributions made on said contributions acceptance device passable manually from one potential contributor to another potential contributor, said contributions accepting device having a software routine for accepting a plurality of successive contributions free of any information unrelated to said contributions or said contributors, said contributions accepting device having a reader for reading indicia on a magetically striped or smart card record medium, means on said contributions acceptance device responsive to activation of entry keys for recording information corresponding to designated numerical amounts of respective contributions made by corresponding contributors identified by indicia of a respective record medium and, storage means on said contributions acceptance device for automatically storing information recorded of the numerical amounts of individual designated contributions correlated to the indicia read on said record medium corresponding to a respective contributor and information of the respective numerical amount of the respective contributor made for eventual batch off-loading thereof to a contributions management device whereby recordation of each of the contribution is uninterrupted by verification of validation and/or authirization; a contributions management device coactive with said contributions acceptance device for acceptance and storing the contributions off-loaded from said contributions acceptance device, said contributions management device having a software routine for receiving and storing contributions free of information unrelated to said contributions or said contributors from a contributions acceptance device; and, a communication link between said contributions management device and said contributions acceptance device for transmitting said off-loaded contributions from said contributions acceptance device to said contributions management device.

14. A portable, self-powered, handheld electronic contributions acceptance device passable manually from one contributor to another contributor for receiving contributions thereon, comprising a housing of said device sized and weighted for manual passing thereof between successive contributor, said device being contributor data input dependant and non-contributor external data source independent, and a routine for accepting a plurality of successive contributions free of information unrelated to said contributions or said contributors; a battery electrical energy source energizing circuits on which said routine is resident; a plurality of manually activated entry operators on said contributions acceptance device activated for designating numerical amounts of respective contributions made by respective contributors; a card reader for reading indicia on a smart card or magnetically striped card record medium identifying a respective contributor making a corresponding contribution using a respective card record medium for identification of the contributor; means on said device responsive to activation of said entry operators for recording information corresponding to designated numerical amounts of respective monetary numerical amounts of monetary contributions made by corresponding contributors identified by indicia of a respective card record medium; and, storage means for automatically storing information recorded of the numerical amounts of individual designated monetary contributions correlated to the indicia read on said card record medium corresponding to a respective contributor and information of the respective numerical amount of the respective contributor, and said contributions acceptance device providing for batch off-loading of said information from said contributions acceptance device whereby recordation of each of the contributions is uninterrupted by verification of validation and/or authorization.

15. A portable, self-powered, hand-held contributions acceptance device according to claim 14, including means for connecting to a link for off-loading said storage means after a multiplicity of contributions have been recorded in said contributions acceptance device.

16. A portable, self-powered, hand-held contributions receiving device according to claim 14, including a container of a size and shape for holding a multiplicity of cash or check contributions, said container having an opening thereon readily visible to said contributors for and positioned to permit deposit of said cash or check contributions into said container while simultaneously permitting optional use of said manually activated entry operators.

17. A portable, self-powered, hand-held contributions acceptance device according to claim 14, further including a container having a surface on which said terminal is mounted.

18. A portable, hand-held contributions acceptance device according to claim 14, including a card processor on said contributions acceptance device responsive to signals transmitted thereto from said card reader, said card processor having means for off-loading individual monetary contribution commitments to a funds processing network.

19. The device in accordance with claim 14 in which said contributions acceptance device is free of data entry components for entering data unrelated to said contributions.

20. The device in accordance with claim 14 in which said contributions acceptance device is free of a routine for processing data foreign to said contributions.

21. The device in accordance with claim 14 in which said contributions acceptance device is free of a multiplicity of data entry keys.

22. The device in accordance with claim 14 in which said device comprises a data input touch screen.

23. The device in accordance with claim 14 including a routine effective for displaying on multiple display screens solicitations of the entry of a contribution.

24. The device in accordance with claim 14 further comprising a routine for correlating respective contributions with recipient data selected from the group consisting of an individual who is deceased, a single recipient of a collection and a recipient selected from a plurality of recipients, to obtain correlated recipient data; means for temporarily storing correlated recipient data; and, means for transferring said correlated recipient data to a contributions management device.

25. The device in accordance with claim 14 further comprising means for correlating a respective contribution with a respective request for a contribution selected from the group consisting of a prayer, entreaty, and petition, to obtain a correlated request.

26. The device in accordance with claim 14 further including means for presenting on said contributions acceptance device symbols corresponding to operators for inducing the making of monetary contributions.

27. The device in accordance with claim 14 including means for presenting symbols corresponding to monetary values of an order inducing the making of contribution preferences of contributors, said values selected from the group consisting essentially of $1, $5, $10, $15, and $N+$5, in which N is an integer.

28. The device in accordance with claim 14 in which said contribution acceptance device comprises a touch screen capable for presenting a request soliciting the making of a contribution and permitting a contributor to designate a symbol corresponding to an operator representative of a monetary contribution amount.

29. The device in accordance with claim 14 further comprising means for presenting a request soliciting the making of a contribution and in which said request comprises options to enter contributions to more than one collection for which said contributions are being solicited; means for designating a corresponding collection option to obtain designated collection data; and, means for correlating said designated collection data with a respective contribution to obtain correlated contribution and collection data.

30. The device in accordance with claim 14 further comprising means for effecting a contribution session to obtain session information consisting essentially of contributions; and, means for periodically clearing said session information from said device.

31. The device in accordance with claim 14 in which said device has a user interface for permitting untrained users to enter respective contributions.

32. The device in accordance with claim 14 in which said routine is selected from the group consisting essentially of a software routine and a firmware routine.

33. A method of inducing and simplifying monetary contributions at contribution sessions and immediately recording thereof upon making of the contributions comprising:

providing individual potential contributors a contributor data input dependant, non-contributor external data source independent contributions acceptance device comprising a portable hand-held contributions management electronic terminal having its own electrical energy source and having a software routine for accepting a plurality of successive contributions free of information unrelated to said contributions or said contributors; passing said contributions acceptance device from one prospective individual contributor to another prospective individual contributor sequentially for individuals to make a respective contribution thereon and immediately record a designated individual contribution;

presenting to the hand-held terminal a magnetically striped or smart card record medium and reading electronically indicia thereon indicative of the card holder of the card corresponding to the designated contribution and recording in the electronic terminal information representative of said indicia correlated to said information representative of the contribution free of information unrelated to said contributions or said contributors; and the card medium constituting a card record medium issued by an organization and constituting pre-authorization by said organization for card record medium monetary transaction commitments made by a card record medium cardholder to be charged, to said organization for payment, whereby a multiplicity of successive individual contributions by corresponding contributor are readily recorded and stored;

entering manually information of a designated monetary contribution in the terminal by an individual contributor or an individual acting on behalf of an individual contributor; and, recording and storing for future batch off-loading in the terminal the information of each contribution made and the contributor thereof whereby recordation of each of the contributions is uninterrupted by verification of validation and/or authorization.

34. A method according to claim 33, further comprising establishing a wireless communication between the self-powered, hand-held contributions acceptance device and a contributions management device for off-loading information received and stored in said hand-held contributions acceptance device of a multiplicity of contributions, and recording the information at the contributions management device.

35. A method according to claim 33, in which said card record medium is a credit card.

36. A method according to claim 33, in which said record card medium is a debit card and in which said indicia to said card holder is coded.

37. A method according to claim 33, further comprising the step of transmitting a request for verification of authorizations of the multiplicity of monetary contributions after a religious service or a contribution session.

38. A method of simplifying and inducing the giving of monetary contributions by attenders during a contribution session comprising, receiving and immediately recording thereof upon receipt comprising, providing the attendees making monetary contributions with a portable contributor data input dependant, non-contributor external data source independent hand-held contributions acceptance device for making of record information of the contribution, said contributions acceptance device having a routine for accepting a plurality of successive contributions free of information unrelated to said contributions or said contributors, said contributions acceptance device having its own source of electric power and a plurality of entry operators manually operable for entering the amount of the contribution to be given, a reader on said contributions accepting device for reading a smart card or magnetically striped record corresponding to a cardholder giving the monetary contribution and having identification indicia on said record, the contributions acceptance device having means for making a visual display of the amount entered by manual operation of entry operators, and the contributions acceptance device having means for recording the amount of the contribution including means for storing the amount correlated to the identification indicia read on said record of the corresponding cardholder, said correlated amount and identification indicia read by said reader for eventual batch off-loading thereof whereby recordation of each of the contributions is uninterrupted by verification of validation and/or authorization.

39. The method of claim 38 in which the making of the monetary contributions is uninterrupted by requests for validation of authorization by signature.

40. A method according to claim 38, further comprising pre-authorizing a monetary contribution commitment amount prior to presenting to the contributions acceptance device the smart card or magnetically striped card record medium whereby the attendees making pre-authorized monetary commitment amount contributions present to the hand-held contributions accepting device said smart card or magnetically striped record medium to activate correlation of the monetary contribution amount with a respective cardholder's indicia and accelerate the contribution session.

41. A method according to claim 38, further comprising the step of forwarding records of the contributions to the corresponding attendees making respective contributions whereby the attendees use the records to substantiate tax deductions or contribution quotas.

42. A method according to claim 38, further comprising off-loading the attendees' correlated amounts and indicia to a card account processor after a plurality of religious service contribution sessions.

43. A method according to claim 38, further comprising the steps of entering and storing the attendees' correlated contribution amounts and indicia for a plurality of contribution sessions prior to interposing a request for authorizations for the attendees' contribution commitments.

44. A method according to claim 38, further comprising the steps of assembling monetary commitment amounts made by a respective attendee at a plurality of contribution sessions until the sum of the monetary commitment amounts reaches a threshold value, transmitting the group of monetary commitment amounts that have reached the threshold value to a card account processor for further processing.

45. The method in accordance with claim 38 in which a numerical value of the amount of each contribution is a volitional entry free of any input affecting the amount of the numerical value.

46. The method in accordance with claim 38 in which a numerical value of the amount of the contribution is a tithed amount.

47. The method in accordance with claim 38 in which a numerical value of the amount entry of each contribution is free of any other inputs affecting said numerical value of said amount entered on said device.

48. The method in accordance with claim 38 in which a numerical value of the amount entry of the individual monetary contributions does not change as a function of extraneous incremental inputs.

49. The method in accordance with claim 38 in which said identification indicia read by said reader on said terminal is free of correlation with non-related incremental inputs.

50. The method in accordance with claim 38 further comprising the step of visually presenting to prospective contributors a request for a contribution via multiple display screens soliciting the entry of a contribution on said means for making a visual display.

51. The method in accordance with claim 38 in which said amount is free of correlation to said identification indicia and free of correlation with non-related incremental inputs.

52. The method in accordance with claim 38 further comprising the steps of correlating respective contributions with recipient data, said recipient data being selected from the group consisting of an individual who is deceased, a single recipient of a collection and a recipient selected from a plurality of recipients, to obtain correlated recipient data; temporarily storing said correlated recipient data at said contribution acceptance device; transferring said correlated recipient data to a contributions management device; and processing said correlated recipient data.

53. The method in accordance with claim 38 further comprising the steps of correlating a respective contribution to a cause to which said respective contribution was designated to obtain cause correlated contribution data, communicating said cause correlated contribution data to a record generator located remotely geographically from a number of said contribution acceptance devices, generating a record at said record generator having thereon at least a portion of said cause correlated contribution data, and forwarding said record to a recipient of said record.

54. The method in accordance with claim 38 further comprising the steps of communicating a message expressing gratitude to a respective contributor for a corresponding contribution from a device other than said contribution acceptance device in response to a contribution entered at said contribution acceptance device for further processing thereof.

55. The method in accordance with claim 38 further including presenting a multi-lingual request for a contribution on said device.

56. The method in accordance with claim 38 further comprising correlating said contributions with respective account data.

57. The method in accordance with claim 38 further comprising correlating a respective contribution with a respective request for a contribution, said request for a contribution selected from the group consisting of a prayer, entreaty, and petition, to obtain a correlated request; and, processing said correlated request.

58. The method in accordance with claim 38 further comprising electronically determining whether or not a plurality of said contributions have reached a quota.

59. The method in accordance with claim 38 further comprising the step of automatically correlating a respective contribution with an account of a respective contributor making said contribution.

60. The method in accordance with claim 38 further comprising the step of creating statistical data indicators from said contributions, said statistical data indicators selected from the group consisting of an effectiveness of a request soliciting the making of a contribution, contribution habits of contributors, a number of contributors making contributions over a period of time, and an amount of contributions raised over time.

61. The method in accordance with claim 38 further comprising the steps of compiling statistical indicator data from a plurality of said contributions entered on said contribution acceptance devices; and, targeting a particular potential contributor with a subsequent request for a contribution as a function of said statistical indicator data, said potential contributor selected from the group consisting of a particular contributor, sub-group of contributors, and group of contributors with a request for a contribution, whereby said entity is targeted in an effort to maximize overall contributions.

62. The method in accordance with claim 38 further comprising automatically quantifying data related to a plurality of said contributions entered on said contribution accepting devices to obtain a quantified judgement indicator; and, modifying a subsequent request for a contribution in response to said quantified judgement indicator.

63. The method in accordance with claim 38 further comprising presenting a request soliciting the making of a contribution on said device and in which said request comprises a plurality of requests to make contributions to a plurality of collections for which said contributions are being solicited, and further comprising correlating respective contributions with the collections for which they are designated.

64. The method in accordance with claim 38 further comprising the step of determining the genuiness of said contribution.

65. The method in accordance with claim 38 further comprising tallying said contributions, said contributions selected from the group of contributions entered by respective individual contributors and contributions made by different contributors.

66. The method in accordance with claim 38 in which said contributions are selected from the group consisting of free will offerings and tithes.

67. The method in accordance with claim 38 further comprising executing a contribution session in which said request for a contribution is displayed for a time out period.

68. The method in accordance with claim 38 further comprising executing a contribution session to obtain session information consisting essentially of contributions and contributor information; and, periodically clearing said session information from a device selected from the group consisting of a contributions managing device and said contributions acceptance device.

69. The method in accordance with claim 38 further comprising accommodating the contribution preference of contributors by presenting on said contribution acceptance device a plurality of requests, said requests selected from the group consisting essentially of a request for a contribution of an order inducing the making of said contribution, and a request for the making of a contribution to a plurality of different causes.

70. The method in accordance with claim 38 further comprising grouping a plurality of respective contribution management devices with a plurality of respective said contribution acceptance devices, each said contribution management device communicating with at least one respective contribution acceptance device, to obtain a plurality of grouped contribution collecting systems; communicatively linking said grouped collecting systems, and sharing contribution data between said grouped collecting systems.

71. The method in accordance with claim 38 in which there are multiple collection options displayed on said device for which contributions are solicited during a contribution session and further comprising the step of designating a specific collection option on said device to which a respective contribution is designated during said contribution session.

72. The method in accordance with claim 38 further comprising the step of correlating a special prayer request data with a respective contribution data related thereto.

73. The method in accordance with claim 38 further comprising the step of sequentially communicating a multiplicity of said contributions from a plurality of contribution acceptance devices to a contributions management device, and communicating a multiplicity of said contributions from a plurality of contribution management devices to a central database for further processing, said contributions management devices located at geographically remote fund-raising organizations or sites designated by said fund-raising organizations.

74. A contributions management network to obtain monetary contribution commitments at contribution sessions from a plurality of attendees who are potential contributors, comprising a portable contributor data input dependant, non-contributor external data source independent, hand-held contributions acceptance device passable manually from one potential contributor to another potential contributor, said contributions acceptance device having a software routine for accepting a plurality of successive contributions free of information unrelated to said contributions or said contributors, said contributions acceptance device having its own source of electrical energy, a plurality of manually activated entry operators externally disposed on said device activated for designating and entering in said device numerical monetary amounts of respective monetary contributions made by respective contributors, a magnetically striped or smart card reader for reading indicia on a card record medium identifying a respective contributor making a corresponding contribution using a respective card record medium for identification of the contributor, said contributions acceptance device having means responsive to activation of said entry keys for recording information corresponding to designated numerical amounts of respective monetary numerical amounts of monetary contributions made by corresponding contributors identified by indicia of a respective card record medium and, said contributions acceptance device having storage means for automatically storing information recorded of the numerical amounts of individual designated monetary contributions correlated to the indicis read on said card record medium corresponding to a respective contributor and information of the respective numerical amount of the respective contributor made for eventual batch off-loading thereof whereby recordation of each of the contributions is uninterrupted by verification of validation and/or authorization; a contributions management device responsive to said contributions acceptance device for receiving and storing the information off-loaded from said contributions acceptance device; and, a communication link between said contributions management device and said contributions acceptance device for transmitting information from said contributions acceptance device to said contributions management device.

75. A contributions management network according to claim 74, including a communication link between said contributions management device and a funds processing network.

76. A contributions management network according to claim 75, including a communication link between said funds processing network and a contribution gathering organization's bank wherein said communication link is used to transmit monetary contribution information to a bank account product.

77. A contributions management network according to claim 74, including a means responsive to said contributions management terminal for providing records of monetary contribution transactions of the attendees.

78. The contributions management network in accordance with claim 74 in which said contribution acceptance devices are geographically remotely located and comprise input means, said input means selected from the group consisting of a keyboard and touch sensitive screen; at least one microprocessor; and, a display.

79. The network in accordance with claim 74 in which said contribution acceptance devices comprise input means selected from the group consisting of a keyboard and touch sensitive screen; at least one microprocessor; and, a display; and, said contribution management device comprising data input means, a plurality of microprocessors, and a display.

80. The network in accordance with claim 74 further comprising means for coding said contributions at said electronic contribution acceptance device to obtain coded contributions; and means for decoding said coded contributions at a device other than said electronic contribution acceptance device.

81. Apparatus for successively making contribution data inputs by a multiplicity of individual contributors in sequence comprising:

a portable, self-powered, contributor data input dependant, non-contributor external data source independent, electronic donations management terminal sized and weighted for manual passing thereof between successive contributors, having contribution input entry means, having a routine for accepting and recording a plurality of successive contribution inputs free of any information unrelated to said contributions or contributors, and having means for making of said successive contribution inputs uninterrupted by requests for verification of contributor credit, validation or approval of a successive individual contribution input, and said electronic donations management terminal providing for batch off-loading of said contributions whereby recordation of each of the contributions is uninterrupted by verification of validation and/or authorization.

82. The apparatus of claim 81 in which said input entry means is oriented on said device and with respect to said contributor to allow for entry of said contribution inputs by said contributor without repositioning of said terminal to permit entry thereof and in which the making of said successive contributions is uninterrupted by requests for verification of authorization by said electronic donations management terminal, whereby the speed within which successive contribution inputs are entered and recorded on said device is enhanced.

83. A contributions management terminal comprising a portable, self-powered, contributor data input dependant, non-contributor external data source independent, electronic donations management terminal sized and weighted for manual passing thereof between successive contributors, having contribution input entry means including a reader for reading indicia on a record medium of a contributor making a contribution, having means for automatically accepting, recording, and storing a sequence of data sets each consisting of information corresponding to the contribution of a respective contributor correlated with the indicia read from the record medium of the corresponding contributor free of any information unrelated to said contributions or contributors, and said electronic donations management terminal providing for batch off-loading of said contributions whereby recordation of each of the contributions is uninterrupted by verification of validation and/or authorization.

84. Apparatus for successively making contribution data inputs by a multiplicity of individual contributors comprising:

an intermediate data input transfer device independant, portable, self-powered, contributor data input dependant, non-contributor external data source independent, electronic donations management terminal sized and weighted for manual passing thereof between successive contributors having contribution input entry means, and having means for temporarily recording and storing successive contribution inputs entered by said successive contributors on said input entry means, and said electronic donations management terminal providing for batch off-loading of said contributions whereby recordation of each of the contributions is uninterrupted by verification of validation and/or authorization.

85. The apparatus of claim 84 further comprising means for making of said successive contribution inputs uninterrupted by requests for verification of contributor credit, validation or approval of a successive individual contribution input.

* * * * *